US005713012A

United States Patent [19]

Tanaka et al.

[11] Patent Number: 5,713,012

[45] Date of Patent: Jan. 27, 1998

[54] MICROPROCESSOR

[75] Inventors: Shigeya Tanaka, Hitachi; Takashi Hotta, Hadano; Shoji Yoshida, Hitachi; Kenji Jin; Koji Saito, both of Hadano, all of Japan

[73] Assignee: Hitachi, Ltd., Tokyo, Japan

[21] Appl. No.: 717,143

[22] Filed: Sep. 20, 1996

Related U.S. Application Data

[63] Continuation of Ser. No. 667,332, Jun. 20, 1996, abandoned, which is a continuation of Ser. No. 446,277, May 22, 1995, abandoned, which is a continuation of Ser. No. 183,844, Jan. 21, 1994, abandoned.

[30] Foreign Application Priority Data

Jan. 20, 1993 [JP] Japan .................................... 5-007795

[51] Int. Cl.$^6$ ........................................ G06F 9/40

[52] U.S. Cl. ........................................ 395/580

[58] Field of Search ................................ 364/DIG. 1 MS, 364/DIG. 2 MS; 395/376, 379, 381, 382, 387, 391, 580, 581, 582, 583, 800

[56] References Cited

U.S. PATENT DOCUMENTS

| | | | |
|---|---|---|---|
| 4,766,566 | 8/1988 | Chuang | 395/800 |
| 5,197,135 | 3/1993 | Eickemeyer et al. | 395/393 |
| 5,214,736 | 5/1993 | Vemiya et al. | 385/144 |
| 5,287,465 | 2/1994 | Kurosawa et al. | 395/391 |
| 5,287,467 | 2/1994 | Blaner et al. | 395/582 |
| 5,295,249 | 3/1994 | Blaner et al. | 395/389 |
| 5,303,356 | 4/1994 | Vassiliadis et al. | 395/585 |
| 5,337,415 | 8/1994 | DeLano et al. | 395/389 |

FOREIGN PATENT DOCUMENTS 2-130634 5/1990 Japan .

OTHER PUBLICATIONS

"A 100 MIPS, 64b Superscalar Microprocessor with DSP Enhancements", IEEE ISSCC Dig. Tech. pp. 100–101 (Feb. 1991).

*Primary Examiner*—Robert B. Harrell
*Attorney, Agent, or Firm*—Antonelli, Terry, Stout & Kraus, LLP

[57] ABSTRACT

A microprocessor has N processing units, a detector for detecting a branch instruction (k-th instruction) which comes first in the instruction sequence of N instructions, function logic for effecting control such that the first to the k-th instructions are executed with the (N–k+1)-th through the N-th processing units. However, when parallel processing is possible, the function logic operates such that the first through the N-th instructions are executed in sequential order by the first through the N-th processing units. On the other hand, wherein a branch instruction (k-th instruction) is included in the N sequential instructions, the function logic operates such that the first through the k-th instructions are parallelly executed by the (N–p+1)-th through the N-th processing units.

14 Claims, 39 Drawing Sheets

FIG. 2

| INSTRUCTION CATEGORY | EXAMPLE OF INSTRUCTION | OPERATION |
|---|---|---|
| LOAD GROUP | LOAD R(S1), disp, R(t) (CONTAINING FLOAD) | STORE TO THE CONTENT IN ADDRESS OF R(S1) + disp |
| STORE GROUP | STORE, R(S1), disp, R(t) (CONTAINING F, STORE) | STORE CONTENT OF R(t) TO ADDRESS OF R(S1) + disp |
| INTEGER CALCULATION GROUP | AND R(S1), R(S2), R(t) | (S1), LOGICAL SUM R(S2) → R(t) |
| | ADD R(S1), R(S2), R(t) | R(S1) + R(S2) → R(t) CARRY → PSW |
| | ADDC R(S1), R(S2), R(t) | R(S1) + R(S2) + PSW INTERNAL CARRY→ R(t) CARRY → PSW |
| BRANCH GROUP | BA disp, R(t) | PC + disp + 8 → TARGET PC PC + 8→ R(t) |
| | BR R(S1), disp, R(t) | R(S1) + disp→ TARGET PC PC + 8→ R(t) |
| | ADD Bcc R(S1), R(S2), R(t), disp | R(S1) + R(S2) → R(t) WHEN CALCULATION RESULT CONDITION IS SATISFIED PC + disp + 8 → TARGET PC |
| SYSTEM CONTROL GROUP | MTC R(S1), CR(t) | R(S1) → CR(t) |
| | MFC CR(S1), R(t) | CR(S1)→ R(t) |
| FADD GROUP | FADD FR(S1), FR(S2), FR(t) | FR(S1) + FR(S2) → FR(t) |
| FMUL GROUP | FMUL FR(S1), FR(S2), FR(t) | FR(S1) x FR(S2) → FR(t) |
| | FMUL FR(S1), FR(S2), FR(t) | FR(S1) x FR(S2) → FR(t) |
| MULTIPLY/ADD GROUP | FADD FR(S4/t), FR(3), FR(S4/t) | FR(S4/t) + FR(3) → FR(S4/t) |

FIG. 3

| | IF | D | E | T | N | W | Z |
|---|---|---|---|---|---|---|---|
| LOAD GROUP | READ-OUT INSTRUC-TION | INSTRUCTION DECODE READ-OUT REGISTER | ADDRESS CALCU-LATION | READ-OUT OPERAND | HIT JUDGEMENT | WRITE-IN REGISTER | – |
| STORE GROUP | ↑ | ↑ | ↑ | READ-OUT ADDRESS ARRAY | HIT JUDGEMENT | WRITE-IN MEMORY | – |
| INTEGER GROUP | ↑ | ↑ | PROC-ESSING | – | – | WRITE-IN PSW REGISTER | – |
| BRANCH GROUP BA | ↑ | INSTRUCTION DECODE ADDRESS CALCULATION | – | – | – | WRITE-IN RETURN ADDRESS REGISTER | – |
| BRANCH GROUP BR | ↑ | INSTRUCTION DECODE READ-OUT REGISTER | ADDRESS CALCU-LATION | – | – | ↑ | – |
| BRANCH GROUP ADDBcc | ↑ | INSTRUCTION DECODE ADDRESS CALCULATION | PROC-ESSING | CONDITION JUDGEMENT | – | ↑ | – |
| SYSTEM CONTROL GROUP MTC | ↑ | INSTRUCTION DECODE READ-OUT REGISTER | – | – | – | WRITE-IN CR REGISTER | – |
| SYSTEM CONTROL GROUP MFC | ↑ | INSTRUCTION DECODE | – | READ-OUT CR REGISTER | – | WRITE-IN REGISTER | – |
| FADD GROUP | ↑ | INSTRUCTION DECODE READ-OUT REGISTER | PROC-ESSING | PROCESSING | PROC-ESSING | PROC-ESSING | WRITE-IN REGISTER |
| FMUL GROUP | ↑ | ↑ | ↑ | ↑ | ↑ | ↑ | ↑ |
| MULTIPLY /ADD GROUP | ↑ | ↑ | ↑ | ↑ | ↑ | ↑ | ↑ |

| EP1 PROCESSING UNIT | EP2 PROCESSING UNIT | |
|---|---|---|
| LOAD ① | ADD ② | 1 |
| ADD ③ | LOAD ④ | 2 |
| × | ADD ⑤ | 3 |
| × | ADDC ⑥ | 4 |

4 CYCLES

FIG. 11

| EP1 INSTRUCTION REGISTER | EFFECTIVE-NESS | EP2 INSTRUCTION REGISTER | EFFECTIVE-NESS | TAO | SQF |
|---|---|---|---|---|---|
| FIRST INSTRUCTION | ○ | SECOND INSTRUCTION | ○ | 0 | 0 |
| FIRST INSTRUCTION | × | SECOND INSTRUCTION | ○ | 1 | 0 |
| FIRST INSTRUCTION | × | SECOND INSTRUCTION | ○ | 0 | 1 |
| FIRST INSTRUCTION | × | SECOND INSTRUCTION | ○ | 1 | 1 |

FIG. 12

PAIR OF INSTRUCTIONS

INSTRUCTION CACHE OUTPUT INFORMATION

| FIRST INSTRUCTION | SECOND INSTRUCTION | |
|---|---|---|
| INSTRUCTION 1 | INSTRUCTION 2 | 0 |
| INSTRUCTION 3 | INSTRUCTION 4 | 1 |
| INSTRUCTION 5 | INSTRUCTION 6 | 0 |
| INSTRUCTION 7 | INSTRUCTION 8 | 1 |

ACTUAL OPERATION AFTER EXECUTION SCHEDULING

| EP1 | EP2 | NUMBER OF CYCLE |
|---|---|---|
| INSTRUCTION 1 | INSTRUCTION 2 | 1 |
| × | INSTRUCTION 3 | 2 |
| × | INSTRUCTION 4 | 3 |
| INSTRUCTION 5 | INSTRUCTION 6 | 4 |
| × | INSTRUCTION 7 | 5 |
| × | INSTRUCTION 8 | 6 |

FIG. 13

| SECOND INSTRUCTION / FIRST INSTRUCTION | A | B | C | D | E | F | G | H | I | J |
|---|---|---|---|---|---|---|---|---|---|---|
| A | × | × | ○ | ○ | ○ | ○ | × | ○ | ○ | ○ |
| B | × | × | ○ | ○ | ○ | ○ | × | ○ | ○ | × |
| C | ○ | ○ | ○ | ○ | ○ | ○ | × | ○ | ○ | ○ |
| D | ○ | ○ | ○ | ○ | × | ○ | × | ○ | ○ | ○ |
| E | ○ | ○ | ○ | ○ | × | ○ | × | ○ | ○ | ○ |
| F | × | × | × | × | × | × | × | × | × | × |
| G | × | × | × | × | × | × | × | × | × | × |
| H | ○ | ○ | ○ | ○ | ○ | ○ | × | × | ○ | × |
| I | ○ | ○ | ○ | ○ | ○ | ○ | × | ○ | × | × |
| J | ○ | × | ○ | ○ | ○ | ○ | × | × | × | × |

A : LOAD GROUP INSTRUCTION

B : STORE GROUP INSTRUCTION

C : INTEGER CALCULATING GROUP AND INSTRUCTION

D : INTEGER CALCULATING GROUP ADD INSTRUCTION

E : INTEGER CALCULATING GROUP ADDC INSTRUCTION

F : BRANCH GROUP INSTRUCTION

G : SYSTEM CONTROL GROUP INSTRUCTION

H : FADD GROUP INSTRUCTION

I : FMUL GROUP INSTRUCTION

J : MULTIPLY/ADD GROUP INSTRUCTION

FIG. 19

ADD (20)

ADD Bcc (21) A

ADD (22)

ADD (23)

ADD (24)

ADD (25)

ADD (26)

ADD (27)

ADD (28)

ADD (29)

⋮

A ADD (50)

ADD (51)

ADD (52)

ADD (53)

ADD (54)

ADD (55)

| PREDICTED / ACTUAL | TAKEN | NOT TAKEN |
|---|---|---|
| TAKEN | 0 | 2 |
| NOT TAKEN | 2 | 0 |

(a) INTERRUPTION OCCURS IN INSTRUCTION A (b) INTERRUPTION OCCURS IN INSTRUCTION B (c) INTERRUPTION OCCURS IN INSTRUCTION A (d) INTERRUPTION OCCURS IN INSTRUCTION B (e) INTERRUPTION OCCURS IN INSTRUCTION A

| | | | |
|---|---|---|---|
| FADD ① | FR(9) | FR(10) | FR(11) |
| FMUL ② | FR(12) | FR(13) | FR(14) |
| FADD ③ | FR(14) | FR(15) | FR(16) |
| FMUL ④ | FR(17) | FR(18) | FR(19) |

| | | | |
|---|---|---|---|
| FADD ① | FR0 | FR1 | FR2 |
| FMUL ② | FR3 | FR4 | FR5 |
| FADD ③ | FR6 | FR7 | FR8 |
| FMUL ④ | FR2 | FR9 | FR10 |
| FADD ⑤ | FR8 | FR11 | FR12 |
| FMUL ⑥ | FR13 | FR14 | FR15 |

INSTRUCTION USING INTEGER REGISTER

| | | | | | |
|---|---|---|---|---|---|
| OP CODE | S1 | S2 | | | t |

INSTRUCTION USING FLOATING REGISTER

| | | | | | |
|---|---|---|---|---|---|
| OP CODE | t | S1 | | | S2 |

MULTIPLY/ADD INSTRUCTION

| | | | | | |
|---|---|---|---|---|---|
| OP CODE | t1 | S1 | S3 | S4/t2 | S2 |

OPERATION FMUL $S1 \times S2 \rightarrow t1$
FADD $S3 + S4 \rightarrow t2$

FIG. 39

| POSITION OF BRANCH INSTRUCTION | PROCESSING UNIT FOR EP1 | PROCESSING UNIT FOR EP2 | PROCESSING UNIT FOR EP3 | PROCESSING UNIT FOR EP4 |
|---|---|---|---|---|
| FIRST INSTRUCTION | ——— | ——— | ——— | FIRST INSTRUCTION |
| SECOND INSTRUCTION | ——— | ——— | FIRST INSTRUCTION | SECOND INSTRUCTION |
| THIRD INSTRUCTION | ——— | FIRST INSTRUCTION | SECOND INSTRUCTION | THIRD INSTRUCTION |
| FOURTH INSTRUCTION | FIRST INSTRUCTION | SECOND INSTRUCTION | THIRD INSTRUCTION | FOURTH INSTRUCTION |

MICROPROCESSOR

This application is a continuation of application Ser. No. 08/667,332 filed Jun. 20, 1996 which is a continuation application of Ser. No. 08/446,277 filed May 22, 1995 which is a continuation of Ser. No. 08/183,844, filed Jan. 21, 1994, all of which are now abandoned.

BACKGROUND OF THE INVENTION

The present invention relates to a microprocessor, and more particularly to a microprocessor having means for processing a plurality of instructions with high speed from a total system point of view by distributing given instructions to given processing units.

A so-called super scalar type microprocessor has been recently drawing attention. The processor parallelly reads out a plurality of instructions, and decodes and executes the instruction parallelly. A typical example of the super scalar type microprocessor is a two instruction parallel processing device. The two instruction parallel processing device processes two instructions per machine cycle, therefore, the CPI (cycle per instruction) is 0.5. On the other hand, since a conventional microprocessor, other than the super scalar type microprocessor, processes one instruction per cycle at most, then its CPI is 1. This means that the super scalar type microprocessor which possess two instructions in parallel is expected to have a maximum performance capacity which is two times larger than the conventional processor.

However, in a practical computing program, there are some cases where parallel processing cannot be executed even when a super scalar type microprocessor is used. A case where an n-th instruction and an (n+1)-th instruction cannot be parallelly executed will be explained in detail. When the target register of the n-th instruction and the source register of the (n+1)-th instruction are the same register, the (n+1)-th instruction must be executed after the n-th instruction has been executed. The reason is that the data which is used by the (n+1)-th instruction is the executed result of the n-th instruction. Further, the same is true where the carry information produced by the n-th instruction is used in the (n+1)-th instruction. That is, when the result of a first instruction to be parallelly processed is used in the following instruction to be parallelly processed, the parallel processing cannot be executed.

Such a case where instructions cannot be parallelly processed is referred to as a contention between instructions. When a contention occurs, a hardware controls the sequential processing of the two instructions which are in contention.

An embodied example of this problem is described in a paper concerning a super scalar type microprocessor reported by The National Semiconductor Corporation at ISSCC '91 (Ran talmudi et al. "A 100 MIPS, 64b Superscalar Microprocessor with DSP Enhancements", in ISSCC Dig. Tech. Papers, pp 100–101 (February 1991)).

There is also an example where, in order to improve the processing capability for a set of instructions to be executed one instruction per one machine cycle, a plurality of processing units are parallelly operated, which is described in Japanese Patent Publication No. 02-130634 (1990).

Generally, the relationship between the volume of hardware used and the ability for effecting parallel processing is a trade-off. A microprocessor, especially the type of microprocessor widely used today, is of one-chip structure. It is ideal that a microprocessor capable of executing two instructions in parallel may be formed in a one-chip structure.

However, increasing complexity in the hardware makes its chip size large, accordingly causing increased electric power consumption and cost.

Therefore, in said Japanese Patent Publication No. 02-130634 (1990), a part of the hardware concerning a shift instruction is deleted taking the trade-off relation between processing the instruction and the complexitity of the hardware into consideration.

Among a set of the instructions used in microprocessors, an instruction causing the type of contention described above is an instruction concerning branching. Such instructions are inevitably used in a computer program and the frequency of appearance thereof is high, for example approximately 20~25%. Therefore, in order to execute parallel processing effectively, it is necessary to execute instruction processing concerning branching taking the required hardware, especially the limitation in processing units, into consideration.

In the conventional technology, however, there has been a lack of consideration as to the sequence of a branch instruction and the other instructions, and as to the arrangement of the processing units parallelly executing instructions with respect to the internal structure of the individual processing units.

Further, for instructions other than a branch instruction, there is also a lack of consideration as to the sequence of the instruction executed in one cycle and the instruction executed in plural cycles for a set having an instruction executed in one cycle and an instruction executed in plural cycles together, and as to the arrangement of the processing units parallelly executing instructions with respect to the internal structure of the individual processing units.

SUMMARY OF THE INVENTION

An object of the present invention is to provide a microprocessor which has a function to execute parallel processing on a branch instruction and another instructions, or on an instruction executed in one cycle and an instruction executed in plural cycles, with minimum hardware and high efficiency.

The object of the present invention can be attained by providing a microprocessor having read means for reading out N, in number, successive instructions, parallel processing detection means for detecting whether or not said N read-out instructions are capable of being proccessed in parallel, and N processing units to execute said N read-out instructions parallelly, wherein only the N-th processing unit of said processing units has function logic to execute a branch instruction and an instruction which is incapable of being parallelly executed. The microprocessor further comprises branch instruction detecting means for parallelly detecting a branch instruction or an instruction which is incapable of being parallelly executed (k-th instruction), which comes first in the instruction sequence of said N read-out instructions, to determine whether or not said N read-out instructions can be executed, and function logic means for controlling the executing sequence such that said N instructions are parallelly executed with the first through the N-th processing units when said N read-out instructions are capable of being executed parallelly, and for changing the executing sequence such that the first through the k-th instructions are parallelly executed with the (N−k+1)-th through the N-th processing units when either a branch instruction or an instruction incapable of being parallelly executed is included in the k-th sequential order of said N read-out instructions.

Further, the microprocessor comprises means for switching the processed result of said N-th processing unit to an address of the instruction to be executed next when the instruction is a branch instruction.

Explaining more in detail, the object of the present invention can be attained by providing a microprocessor having read means for reading out two successive instructions, parallel processing detection means for detecting whether or not said two read-out instructions are capable of being processed in parallel, and two processing units to execute said two read-out instructions parallelly, wherein only the second processing unit of said processing units has function logic to execute a branch instruction and instruction which is incapable of being parallelly executed. The microprocessor further comprises branch instruction detecting means for parallelly detecting whether or not the first instruction of said two read-out instructions is a branch instruction, or an instruction which is incapable of being parallelly executed, to determine whether or not said two read-out instructions can be executed, and function logic means for controlling the executing sequence such that said two instructions are parallelly executed with the first and the second processing units when said two read-out instructions are capable of being executed parallelly, and for changing the executing sequence such that said branch instruction is the executed with the second processing unit when either a branch instruction or an instruction which is incapable of being parallelly executed is included in the k-th (k=1, 2) sequential order of said two read-out instructions.

Further, the microprocessor comprises means for switching the processed result of said second processing unit to an address of the instruction to be executed next when the instruction is a branch instruction.

Furthermore, the object of the present invention can be attained by providing a microprocessor having read means for reading out N, in number, successive instructions, parallel processing detection means for detecting whether or not said N read-out instructions are capable of being processed in parallel, and, N processing units to execute said N read-out instructions parallelly, wherein only the N-th processing unit of said processing units has function logic to execute an instruction being executed in plural cycles. The microprocessor further comprises plural cycle executing instruction detecting means for parallelly detecting an instruction to be executed in plural cycles (p-th instruction), which first comes in the instruction sequence of said N read-out instructions, to determine whether or not said N read-out instructions can be executed, and function logic means for the executing sequence such that said N instructions are parallelly executed with the first through the N-th processing units when said N read-out instructions are capable of being executed parallelly, and for the executing sequence such that the first through the p-th instructions are parallelly executed with the (N−p+1)-th through the N-th processing units when an instruction to be executed in plural cycles is included in the p-th sequential order of said N read-out instructions.

Explaining more in detail, the object of the present invention can be attained by providing a microprocessor having read means for reading out two successive instructions, parallel processing detection means for detecting whether or not said two read-out instructions are capable of being processed in parallel, and two processing units to execute said two read-out instructions parallelly, wherein only the second processing unit of said processing units has function logic to execute an instruction to be executed in plural cycles. The microprocessor further comprises plural cycle executing instruction detecting means for parallelly detecting whether or not the first instruction in the instruction sequence of said two read-out instructions is an instruction to be executed in plural cycles to determine whether or not said two read-out instructions can be executed, and function logic means for controlling the executing sequence such that said two instructions are parallelly executed with the first and the second processing units when said two read-out instructions are capable of being executed parallelly, and for changing the executing sequence such that an instruction to be executed in plural cycles is executed with the second processing unit when the instruction to be executed in plural cycles is included in the p-th (p=1, 2) sequential order of said two read-out instructions.

Still further, the object of the present invention can be attained by providing a microprocessor having read means for reading out N, in number, successive instructions, parallel processing detection means for detecting whether or not said N read-out instructions are capable of being processed in parallel, and N processing units to execute said N read-out instructions parallelly, wherein only the N-th processing unit of said processing units has function logic to execute a branch instruction, an instruction which is incapable of being parallelly executed and an instruction to be executed in plural cycles. The microprocessor further comprises branch instruction or plural cycle executing detecting means for parallelly detecting a branch instruction (k-th instruction) or an instruction which is incapable of being parallelly executed (k-th instruction) or an instruction to be executed in plural cycles (p-th instruction) which first comes in the instruction sequence of said N read-out instructions to determine whether or not said N read-out instructions can be executed, and function logic means for controlling the executing sequence such that said N instructions are parallelly executed with the first through the N-th processing units when said N read-out instructions are capable of being executed parallelly, and for controlling the executing sequence such that the first through the k-th instructions are parallelly executed with the (N−k+1)-th through the N-th processing units when either a branch instruction or an instruction which is incapable of being parallelly executed is included in the k-th sequential order of said N read-out instructions, and for changing the executing sequence such that the first through the p-th instructions are parallelly executed with the (N−p+1)-th through the N-th processing units when an instruction to be executed in plural cycles is included in the p-th sequential order of said N read-out instructions.

Explaining more in detail, the object of the present invention can be attained by providing a microprocessor having read means for reading out two successive instructions, parallel processing detection means for detecting whether or not said two read-out instructions are capable of being processed in parallel, and two processing units to execute said two read-out instructions parallelly, wherein only the second processing unit of said processing units has function logic to execute a branch instruction and an which is incapable of being parallelly executed and an instruction to be executed in plural cycles. The microprocessor further comprises branch instruction or plural cycle executing instruction detecting means for parallelly detecting whether or not the first instruction of said two read-out instructions is a branch instruction or an instruction which is incapable of being parallelly executed, or whether or not the first instruction in the instruction sequence of said two read-out instructions is an instruction to be executed in plural cycles to determine whether or not said two read-out instructions can be executed, and function logic means for controlling the executing sequence such that said two instructions are parallelly executed with the first and the second processing units when said two read-out instructions are capable of being executed parallelly, for controlling the executing sequence such that said branch instruction is executed with the second processing unit when either a branch instruction or an instruction which is incapable of being parallelly executed is included in the k-th (k=1, 2) sequential order of said two read-out instructions, and for changing the executing sequence such that an instruction to be executed in plural cycles is executed with the second processing unit when the instruction to be executed in plural cycles is included in the p-th (p=1, 2) sequential order of said two read-out instructions.

The function logic to process the instruction which is incapable of being processed parallelly and so on may be provided in a processing unit before the last processing unit as well as the last processing unit.

Therefore, the object of the present invention can be attained by providing a microprocessor having read means for reading out N, in number, successive instructions, parallel processing detection means for detecting whether or not said N read-out instructions are capable of being processed in parallel, and, N processing units to execute said N read-out instructions parallelly, wherein at least the n-th processing unit among said processing units having sequential numbers equal to or larger than n (n≠1) has function logic to execute a branch instruction and an instruction which is incapable of being parallelly executed. The microprocessor further comprises branch instruction detecting means for parallelly detecting a branch instruction (k-th instruction) or an instruction which is incapable of being parallelly executed (k-th instruction), which first comes in the instruction sequence of said N read-out instructions, to determine whether or not said N read-out instructions can be executed, and function logic means for controlling the executing sequence such that said N instructions are parallelly executed with the first through the N-th processing units when said N read-out instructions are capable of being executed parallelly, and for changing the executing sequence such that the first through the (k−1)-th instructions are executed with the processing units having the same sequential numbers and the k-th instruction is executed with the processing unit having a sequential number equal to or larger than n when either a branch instruction or an instruction which is incapable of being parallelly executed is included in the k-th sequential order of said N read-out instructions.

Further, the object of the present invention can be attained by providing a microprocessor having read means for reading out N, in number, successive instructions, parallel processing detection means for detecting whether or not said N read-out instructions are capable of being processed in parallel, and, N processing units to execute said N read-out instructions parallelly, wherein at least the n-th processing unit among said processing units having sequential numbers equal to or larger than n (n≠1) has function logic to execute an instruction to be executed in plural cycles. The microprocessor further comprises plural cycle executing instruction detecting means for parallelly detecting an instruction to be executed in plural cycles (p-th instruction), which first comes in the instruction sequence of said N read-out instructions, to determine whether or not said N read-out instructions can be executed, function logic means for controlling the executing sequence such that said N instructions are parallelly executed with the first through the N-th processing units when said N read-out instructions are capable of being executed parallelly, and for changing the executing sequence such that the first through the (p−1)-th instructions are executed with the processing units having the same sequential numbers and the p-th instruction is executed with the processing units having sequential numbers equal to or larger than n when an instruction to be executed in plural cycles is included in the p-th sequential order of said N read-out instructions.

The object of the present invention can be attained by providing a microprocessor having read means for reading out N, in number, successive instructions, parallel processing detection means for detecting whether or not said N read-out instructions are capable of being processed in parallel, and, N processing units to execute said N read-out instructions parallelly, wherein at least the n-th processing unit among said processing units having sequential numbers equal to or larger than n (n≠1) has function logic to execute a branch instruction, an instruction which is incapable of being parallelly executed and an instruction to be executed in plural cycles. The microprocessor further comprises branch instruction detecting means for parallelly detecting a branch instruction (k-th instruction) or an instruction which is incapable of being parallelly executed (k-th instruction) or an instruction to be executed in plural cycles (p-th instruction), which comes first in the instruction sequence of said N read-out instructions, to determine whether or not said N read-out instructions can be executed, and function logic means for controlling the executing sequence such that said N instructions are parallelly executed with the first through the N-th processing units when said N read-out instructions are capable of being executed parallelly, and for changing the executing sequence such that the first through the (k−1)-th instructions are executed with the processing units having the same sequential numbers and the k-th instruction is executed with a processing unit having a sequential number equal to or larger than n when either a branch instruction or an instruction which is incapable of being parallelly executed is included in the k-th sequential order of said N read-out instructions, and for changing the executing sequence such that the first through the (p−1)-th instructions are executed with the processing units having the same sequential numbers and the p-th instruction is executed with the processing units having sequential numbers equal to or larger than n when an instruction to be executed in plural cycles is included in the p-th sequential order of said N read-out instructions.

In the present invention, when it is judged with the parallel processing detecting means that parallel processing is possible, the function logic means controls the first through the N-th processing units such as to execute each corresponding instruction in accordance with the sequential order of the instruction execution from the first through the N-th instructions. When the parallel processing detecting means detects a first branch instruction (k-th instruction) in the instruction sequence of the N instructions read out at one time, the parallel processing detecting means controls the function logic means so as to execute the first through the k-th instructions with the (N−k+1)-th through the N-th processing units.

On this occasion, when only the N-th processing unit has the functional logic to execute a branch instruction of the k-th instruction and there is provided switching means to switch the result of the branch instruction as a new instruction, the first through the k-th instructions including the branch instruction may be effectively executed in parallel with only a slight increase in hardware.

In addition to this, when the parallel processing detecting means detects a first instruction to be executed in plural cycles (p-th instruction) in the instruction sequence of the N instructions read out at one time, the parallel processing detecting means controls the function logic means so as to execute the first through the p-th instructions with the (N−p+1)-th through the N-th processing units.

On this occasion, when only the N-th processing unit has the functional logic to execute the instruction to be executed in plural cycles, the instruction to be executed in plural cycles may be effectively executed parallelly with only slightly increase in hardware.

BRIEF DESCRIPTION OF THE DRAWINGS

FIG. 2 is a table showing an example of an instruction set executed with a super scalar type microprocessor in accordance with the present invention.

FIG. 3 is a table showing operation of a single instruction of the super scalar type microprocessor in FIG. 1.

FIG. 11 is a table showing the relationship between the SQF 850 and the control signal TAO masking thereon, the distribution of instructions to the EP 1 instruction register 808 and the EP 2 instruction register 809, and the effectiveness or ineffectiveness of each instruction.

FIG. 12 is a diagram showing how the EP 1 instruction and the EP 2 instruction are actually processed in a program having both parallel processing and sequential processing.

FIG. 13 is a table showing an example of the dependence relationship in instructions judged by the function MDP 805 checking whether or not parallel processing is possible.

FIG. 19 is a diagram of a program having a conditional branch instruction.

FIG. 39 is a table showing a relationship between position of a branch instruction in instruction sequence and processing units.

DETAILED DESCRIPTION OF THE PREFERRED EMBODIMENTS

Referring to FIG. 1~FIG. 39, embodiments of microprocessors having a plural instruction parallel processing mechanism in accordance with the present invention will be described hereinafter.

Figure 1:
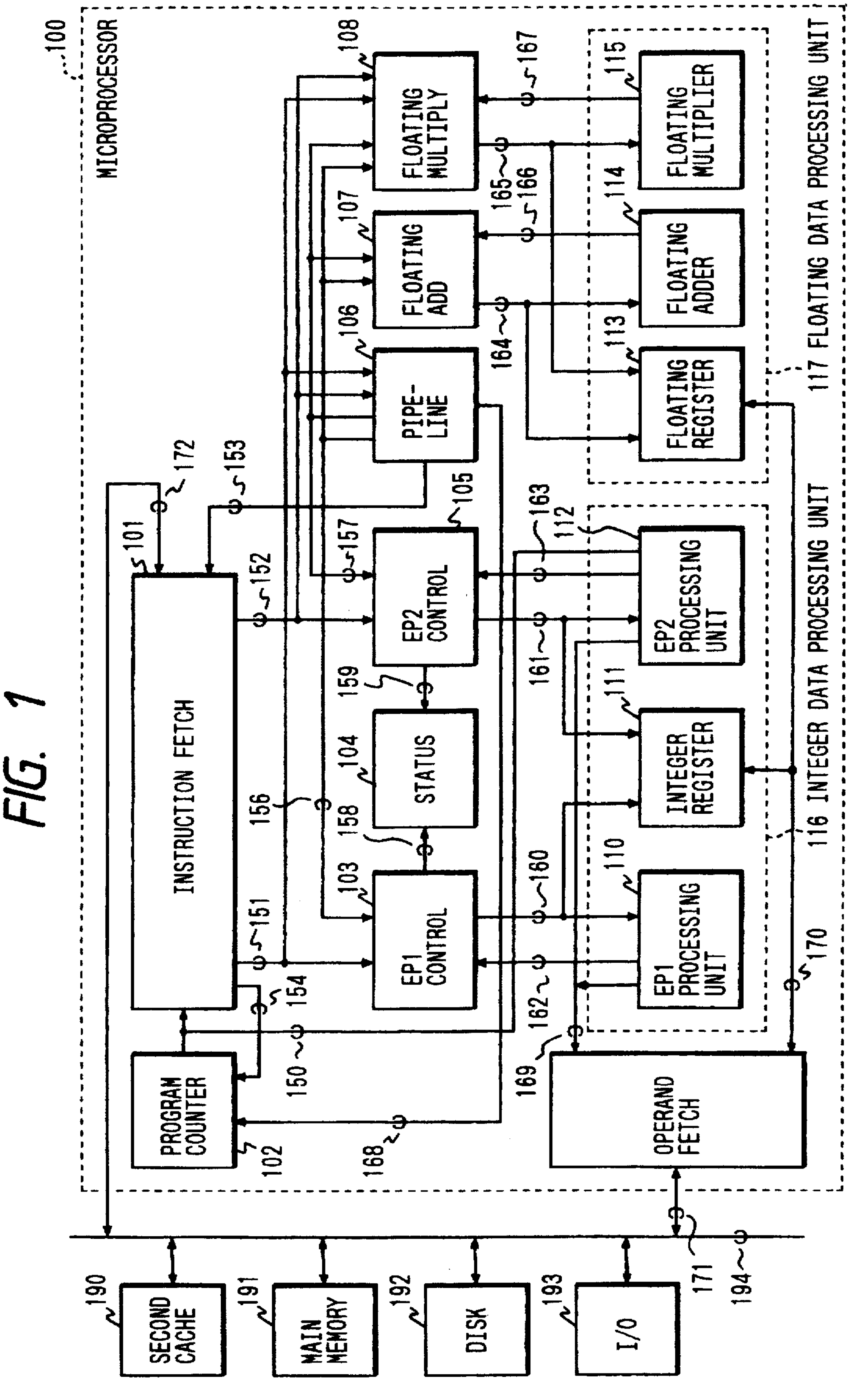
FIG. 1 is a block diagram showing the total structure of a super scalar type microprocessor capable of parallelly processing two instructions in accordance with the present invention and a connection relation thereof with external units.

FIG. 1 is a block diagram showing the overall structure of a super-scalar type microprocessor executing two instructions with parallel processing and showing the connecting relationship with its external units. The super-scalar type microprocessor 100 comprises an instruction fetch unit 101, a program counter control unit 102, an EP (element processor) 1 control unit 103, a status control unit 104, an EP 2 control unit 105, a pipe-line control unit 106, a floating adder control unit 107, a floating multiplier control unit 108, an operand fetch unit 109, an integer calculating data processing unit 116 and a floating data processing unit 117.

Further, the integer calculating data processing unit 116 comprises an EP 1 processing unit 110, an integer register unit 111, an EP 2 processing unit 112, and the floating data processing unit 117 comprises a floating register unit 113, a floating adder 114, and a floating multiplier 115.

Main buses connecting individual blocks are an instruction address bus BCA 150, an EP 1 operation code bus 151 transferring a first of two instructions to be parallelly executed to an individual control unit, an EP 2 operation code bus 152 transferring a second of two instructions to be parallelly executed to an individual control unit, an operand fetch address bus BDA 169, a bus BMW 170 transferring operand data to an individual data processing units, a bus connecting as an interface between the operand fetch unit 109 and the externals, and a bus 171 connecting as an interface between the instruction fetch unit 101 and the externals.

The processor 100 is connected through a bus 194 to a second cache memory 190, a main memory 191, a disk 192 and various kinds of I/O 193.

FIG. 2 is a table showing an example of a set of instructions to be executed by an embodiment of a super-scalar type micro-processor in accordance with the present invention. This set of instructions all have a fixed instruction length of 32 bits and are arranged in 4 byte boundary. The set of instructions may be divided roughly as follows: LOAD group instructions, STORE group instructions, integer calculating group instructions, branch group instructions, system control group instructions, FADD (floating add) group instructions, FMUL (floating multiply) group instructions, and add and multiply group instructions. All instructions, excluding LOAD group instructions, STORE group instructions and branch group instructions, are instructions between registers. Incidentally, this set of instructions is illustrated only to explain the embodiment; the present invention is, therefore, not limited by the set of instructions.

FIG. 3 is a table showing the operation of a super-scalar type micro-processor for a single instruction. In the case of FIG. 3, all instructions excluding floating calculating instructions of the super scalar microprocessor 100 are constructed with pipe-lines of six stages. In this patent specification, each of the stages are designated as IF (instruction fetch), D (decode), E (execute), T (test), N (null) and W(write), as shown in FIG. 3.

Returning to FIG. 1, an explanation of the most fundamental execution of an integer processing instruction with the embodiment will be given.

In stage IF, the instruction fetch unit 101 reads out two instructions, the addresses of which are specified by the program counter control unit 102. The program counter control unit 102 increments the count by two counts per cycle, such as PC+2→PC, and outputs the address to the instruction address bus 150. The instruction fetch unit 101 reads out an even instruction and an odd instruction following thereto from the address of the instruction address bus 150 to store the even to the first instruction register and to store the odd to the second instruction register. Incidentally, the details of the individual registers are explained later referring to FIG. 10.

On an occurrence of branching, the program counter control unit 102 processes a branch address to output to the instruction address bus 150. The instruction fetch unit 101 reads out the two instructions of 8 bytes even when the branch destination address is an even address or an odd address by neglecting the lowermost one bit of the instruction address bus 150.

In stage D, the first instruction of the two instructions read-out in the stage IF is transferred to the EP 1 control unit 103 through the EP 1 operand bus 151, and the second instruction is transferred to the EP 2 control unit 105 through the EP 2 operand bus 152. The EP 1 control unit 103 decodes the first instruction output into the EP 1 operand bus 151, and transfers a required register read-out designation to the integer register unit 111 through a signal line 160. According to the designation, the required register content is transferred to the EP 1 processing unit 110. Parallel to this operation, the EP 2 control unit decodes the second instruction output in the EP 2 operand bus 152, and transfers a required register read-out designation to the integer register unit 111 through a signal line 161. According to the designation, the required register content is transferred to the EP 2 processing unit 112.

In stage E, the EP 1 processing unit 110 executes processing using the data read out in the EP 1 control unit 110. Parallel to this operation, the EP 2 processing unit 112 executes a calculation using the data read out in the EP 2 control unit.

In stages T and N, the instructions in LOAD group instructions and in STORE group instructions are effective, but the instructions in the integer group processing instructions are ineffective. Therefore, all the integer group processing instructions may be written in the next stage W, then the control of an exception processing may be simplified.

Lastly, in stage W, the EP 1 control unit 103 designates to write the result of the EP 1 processing unit 110 into the write-in register designated by the first instruction. According to the designation, the register unit 111 writes the processed result of the EP 1 processing unit 110 to the designated register. Parallel to this operation, the EP 2 control unit 111 designates to write the result of the EP 2 processing unit 105 into the write-in register designated by the second instruction. According to the designation, the register unit 112 writes the processed result of the EP 2 processing unit 112 to the designated register.

Figure 4:
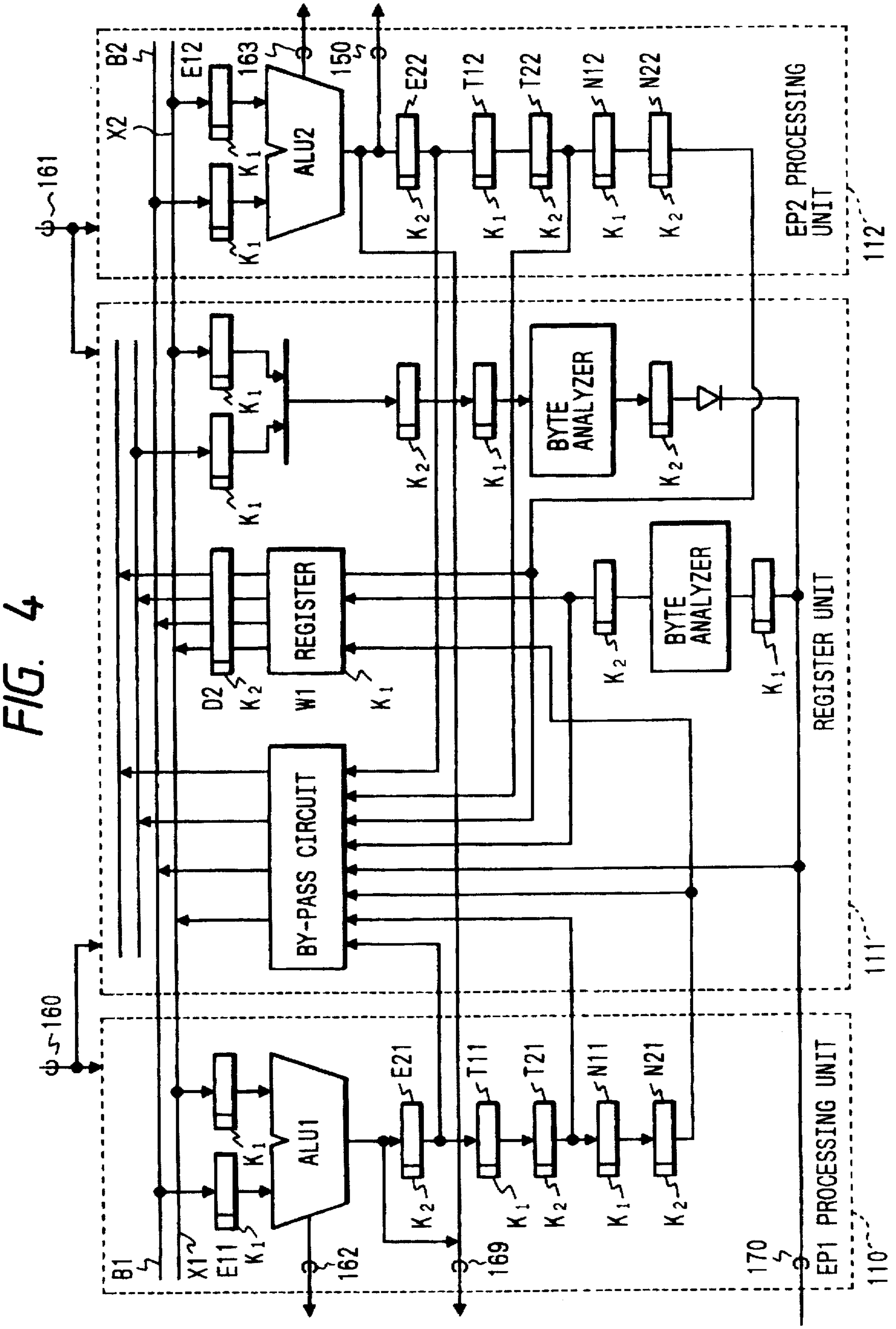
FIG. 4 is a block diagram showing an example of the structure of the integer calculating data processing unit 116 of FIG. 1.

FIG. 4 is a block diagram showing an example of the structure of the integer calculating data processing unit 116. In stage D, according to the first instruction control signal transferred to the signal line 160, source register data specified in the EP 1 instruction register is transferred to an ALU 1 in the EP 1 processing unit through a bus B 1 and a bus X 1. The ALU 1 in the EP 1 processing unit processes the data in stage E. The calculation result is, in stages T and N, transferred through temporary latches for pipe-line timing adjust T11, T12, N11 and N21, and, in stage W, written in the register unit 111.

Similarly, in stage D, according to the second instruction control signal transferred to the signal line 161, source register data specified in the EP 2 instruction register is transferred to an ALU 2 in the EP 2 processing unit through a bus B 2 and a bus×2. The ALU 2 in the EP 2 processing unit processes the data in stage E. The calculation result is, in stages T and N, transferred through temporary latches for pipe-line timing adjust T12, T22, N12 and N22, and, in stage W, written in the register unit 111.

In order to execute all steps described above with pipe-line processing, the register unit 111 employed has four ports for read out and three ports for write in.

In the integer calculating data processing unit 116 in FIG. 4, a by-pass circuit is provided in order to make the processing speed high by by-passing data to an input bus when a calculating result is, for example, required to be used in the next cycle, since the calculating result exists in the stage E. In a case other than this case, it is possible to provide various kinds of by-pass circuits to effect a by-pass similar to the above case when a result is required to be used before writing it to the register unit 111.

Figure 5:
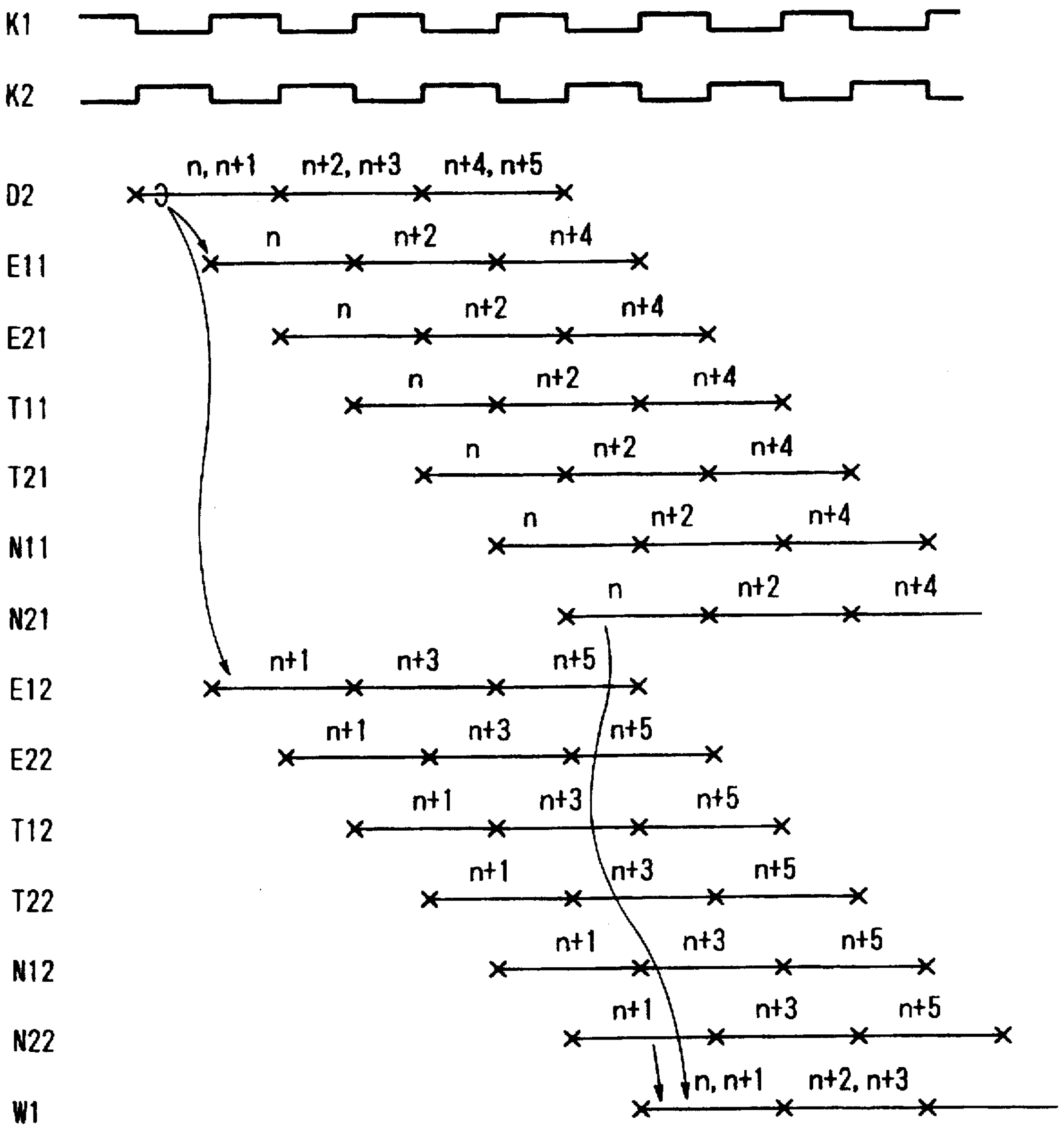
FIG. 5 is a time chart for a case where two instructions are executed by parallel processing.

FIG. 5 is a time chart for a case where a pair of instructions are executed by parallel processing. Herein, it is shown that processing for an N-th instruction and an (N+1)-th instruction are executed at the same time. And, a pair of instructions are executed by pipe-line processing in every machine cycle. The super scalar type microprocessor in the embodiment 100 reads out two instructions parallelly, and the first instruction is executed with the EP 1 processing unit and the second instruction is executed with the EP 2 processing unit parallelly, and then the results are written at the same time.

Figure 6:
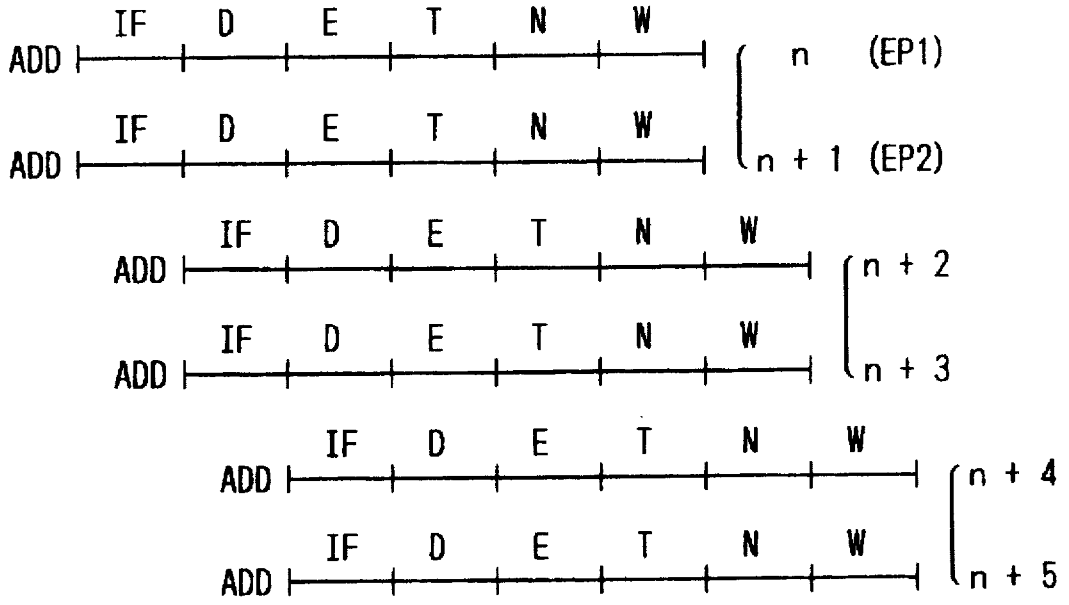
FIG. 6 is a simple pipe-line flow chart re-written from the time chart of FIG.5 where integer calculation group instructions are continuously processed.

FIG. 6 is a simple pipe-line flow chart which is rewritten from the time chart of FIG. 5 for a case where a pair of instructions are executed by parallel processing. In this case, two instructions are processed every machine cycle. In FIG. 6, the upper line of a pair of lines shows the processing by the EP 1 control unit and the lower line shows the processing by the EP 2 control unit. Hereinafter, simple pipe-line flow charts of this kind are used. Since it is easy for those skilled in the art to analogize the structure of the logic from the simple pipe-line flow charts, detailed time charts are omitted.

Figure 7:
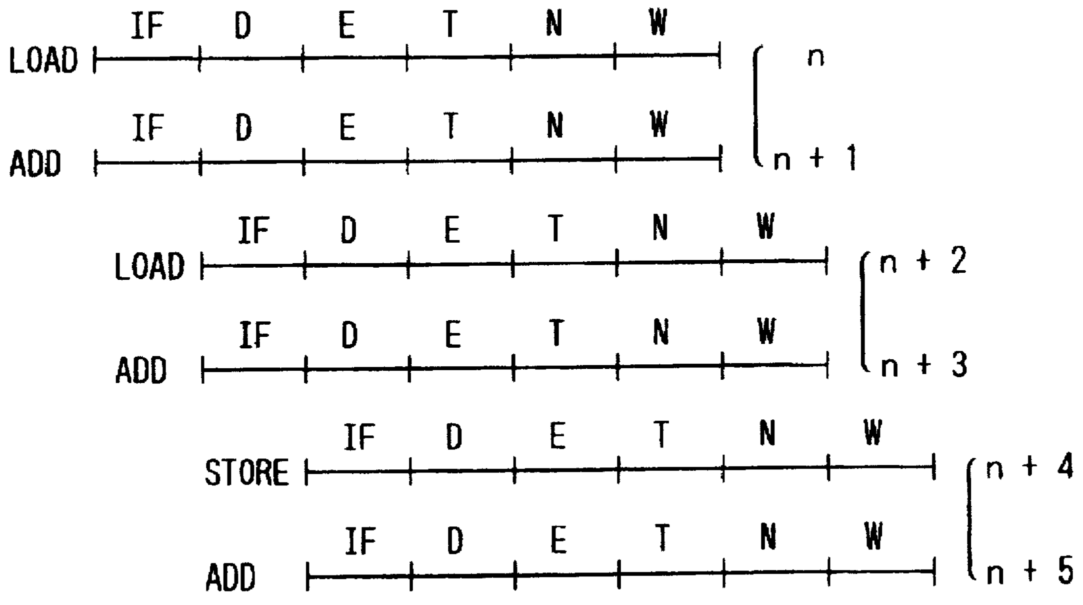
FIG. 7 is a pipe-line flow chart for a case where a first instruction, LOAD instruction and STORE instruction, and a second instruction, integer calculation group instruction, are continuously processed.

FIG. 7 is a pipe-line flow chart showing a case where a first instruction of a LOAD instruction and a STORE instruction and a second instruction of integer calculating instruction are sequentially processed. As shown in FIG. 3, the address of the LOAD instruction is calculated in stage E. Explaining more in detail, the address for operand fetch is calculated in the ALU 1 in FIG. 4, and the result is output to the operand fetch address bus 196. The operand fetch unit 109 fetches an address specified by the address in stage T, and the operand data is output through the operand data bus 170.

Since recent microprocessor technology includes use of an internal data cache memory, such a structure of pipe-lines is feasible. In stage N, a hit judgement is executed on whether or not the operand fetch is correctly executed. When the LOAD instruction needs to be processed by byte-wise units, the byte processing is executed in this stage N as shown in FIG. 4. In stage W, the register number stored in the LOAD instruction is specified to the register unit 111. The register unit 111 writes the data in a specified register. When a miss is the result of the hit judgement, the operation of the pipe-lines are stopped until the correct value is received by stopping the system clock or the like similar to the general micro processor. Therein, an explanation of the operation upon occurrence of a miss is omitted since it is out of the scope of the present invention.

Although FIG. 7 is a pipe-line flow chart showing a case where both of the LOAD instructions are executed by the EP 1 control unit 103, in the embodiment, the EP 2 control unit 105 may execute the LOAD instructions. In this case, the ALU 2 in FIG. 4 processes the address for operand fetch, and the result is output to the operand fetch address bus 169. The processes after this are the same as in the case of the EP 1 control unit 103.

Incidentally, when the first instruction and the second instruction, are both LOAD instructions or are a LOAD instruction and a STORE instruction, parallel processing is impossible. The reason is that the operand fetch unit 109 in FIG. 1 is able to process either the first instruction or the second instruction. In other words, this limitation is caused by the fact that the operand fetch unit has only one port. However, by accepting this limitation, the operand fetch unit 109 may be simplified in its function and be miniaturized. Since, taking the frequency of instruction appearance into consideration, an operand fetch unit having one port may still attain sufficient performance, the structure shown in FIG. 1 is acceptable when the cost performance is more significant than the trade-off between performance and hardware volume.

One advanced structure of the embodiment may be considered, wherein the operand fetch address bus 169 in FIG. 4 is altered to provide two buses for the ALU 1 and the ALU 2 independently, the operand fetch unit 109 is also connected with the two independent buses, and the two buses for the operand data bus 170 are connected thereto corresponding to each address to permit writing into the register unit 111 individually.

When this structure is employed, the operand fetch unit 109 becomes complicated and the register unit 111 needs eight ports by increasing one port. However, an operand fetch unit 109 having two independent ports leads to the ability to execute parallel processing of LOAD and STORE instructions or a pair of STORE instructions, which leads to improved processing performance in some kinds of computer programs.

Further, another advanced structure of the embodiment may be considered, wherein, when either a LOAD instruction or a STORE instruction is parallelly processed with another instruction, the sequence of instructions is scheduled with a compiler, such that the LOAD or the STORE instruction is always arranged to come to either the first instruction or the second instruction. By doing so, the LOAD instruction or the STORE instruction is executed with only one of either the EP 1 control unit 103 or the EP 2 control unit 105. Then the other control unit can be miniaturized to the extent of the part corresponding to processing the LOAD instruction or the STORE instruction. When, for example, in a pair of instructions capable of parallel processing, a LOAD instruction or STORE instruction is scheduled to come only to the second instruction, the output from the ALU 1 to the operand fetch address bus 169, and the control concerning the LOAD instruction and the STORE of the EP 1 control unit, are not required, which makes the structure of the processor simple.

Figures 8, 9:
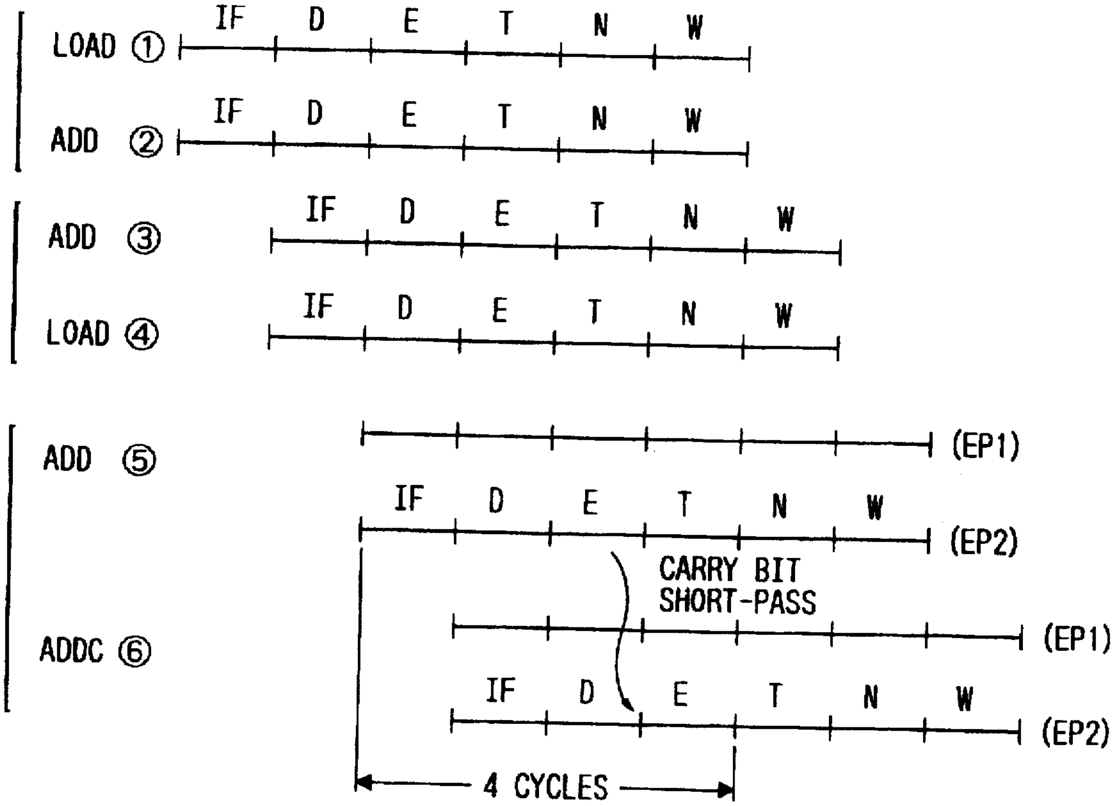
FIG. 8 is a pipe-line flow chart showing processing in the embodiment of FIG. 1, for a program including LOAD(1), ADD(2), ADD(3), LOAD(4), ADD(5), ADD(6).
FIG. 9 is a table simply expressing which processing unit is used for executing an instruction in each of the machine cycles in FIG. 8.

FIG. 8 is a pipe-line flow chart showing the processing of the program LOAD(1), ADD(2), ADD(3), LOAD(4), ADD (5), ADD(6) in the embodiment of FIG. 1. The first pair of instructions LOAD(1) and ADD(2) and the next pair of instructions ADD(3) and LOAD(4) are capable of being processed in parallel. However, ADD(5) and ADD(6) are incapable of being processed in parallel. The reason is that the carry information in the calculated result of ADD(5) is used as an input data in the next instruction ADD(6). The example is of carry information in the PSW (program status word). As another example, parallel processing is also impossible when the register for writing-in data of a first instruction is identical with the register for reading-out data of a second instruction.

In such a case where parallel processing is essentially impossible, the microprocessor according to the embodiment firstly executes, in FIG. 8, ADD(5) with the EP 2 control unit, and in the next cycle ADD(6) is executed with the EP 2 control unit. Processing one of one machine cycle as in this manner is called sequential processing.

FIG. 9 is a table showing, for easy understanding, which processing units in FIG. 8 are used for executing the instructions in each machine cycle.

In order to execute processing effectively as described above, it is necessary that the instruction fetch unit 101 has a function judging whether or not parallel processing is possible according to the combination of instructions and a function judging which processing unit is to be used to execute the processing. In the super scalar type microprocessor of this embodiment, the instruction fetch unit 101 carries out an executing scheduling of instructions which are essentially incapable of being processed in parallel. The structure and the operation of the instruction fetch unit 101 will be described below.

Figure 10:
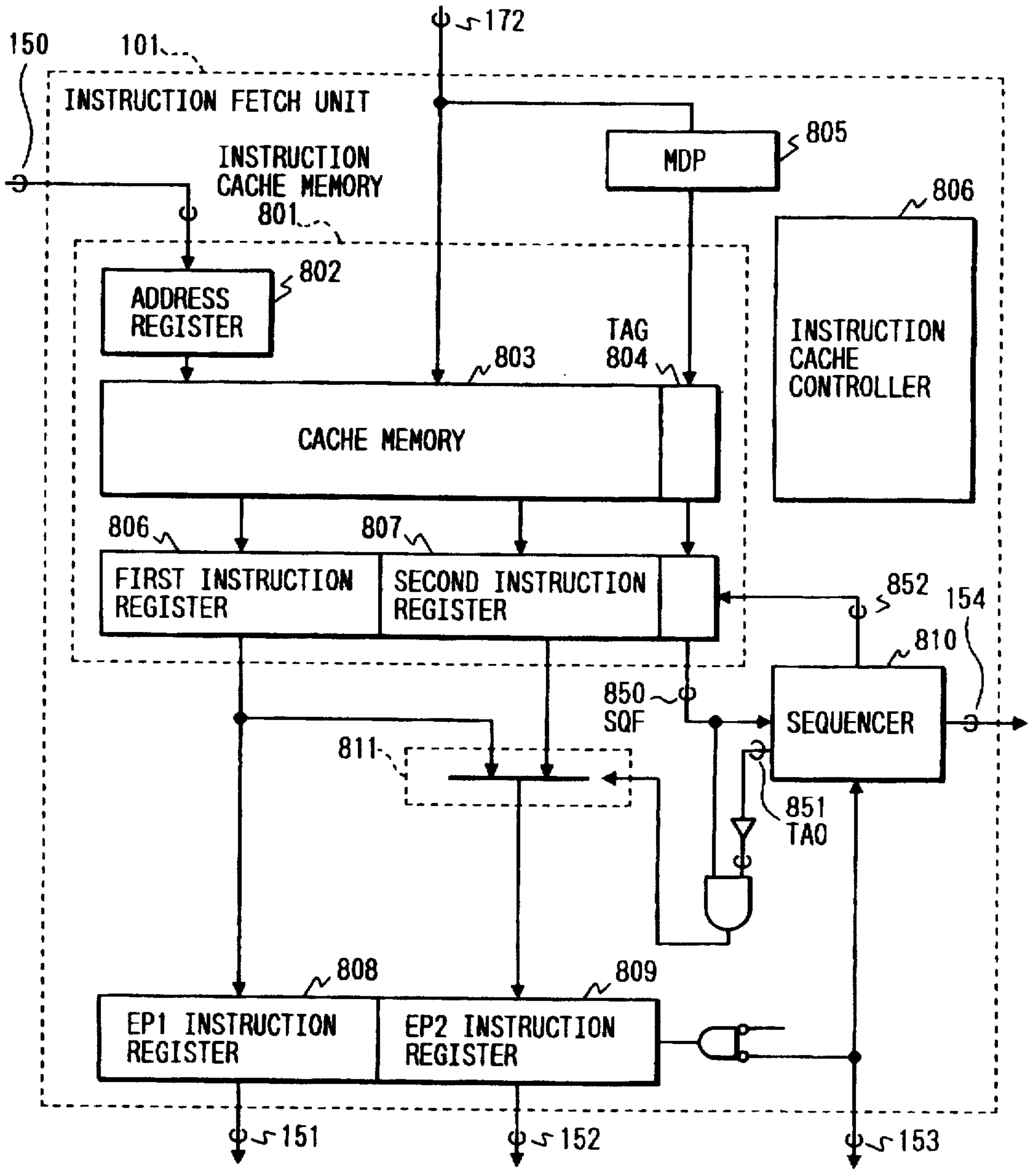
FIG. 10 is a block diagram showing an example of the structure of an instruction fetch unit 101 in an embodiment of the present invention.

FIG. 10 is a block diagram showing an example of the structure of the instruction fetch unit 101 in this embodiment. The instruction fetch unit 101 comprises an instruction cache memory 801, an MDP 805 detecting whether or not two instructions can be parallelly processed, an EP 1 instruction register 808, an EP 2 instruction register 809, a sequencer 810 for scheduling the execution of instructions, function logic 811 for selecting either a first instruction or a second instruction, and an instruction cache controller 812. The instruction cache memory 801 contains an address register 802, a cache memory 803, an information TAG 804 individually added to each pair of instructions, a first instruction register 806, and a second instruction register 807. The main control signals are a contention bit SQF (sequential flag) 850, a control signal TAO 851 for masking the SQF 850 read out from the cache memory 801, which signal TAO 851 is a control signal from the sequencer 810, and a control signal MCCRE 852 for holding the first instruction register 806 and the second instruction register 807 which are output registers of the cache memory 801.

The super scalar type microprocessor is a two instruction parallel processor employing a fixed pairing type memory with an 8 byte boundary. The fixed pairing type memory with 8 byte boundary limits the two objective instructions for parallel processing to the two instructions in the 8 byte boundary. Setting this limitation leads to the following effects.

The causes of occurrence of contention, which shows whether or not parallel processing is possible, include a cause due to contention of instructions and a cause due to contention of registers or the like. The cause due to contention of registers or the like depends on the hardware and occurs due to miniaturization of hardware. The cause of the occurrence of contention between instructions exists in the essential problem of parallel processing and is inevitable. When the parallel processing is limited to the two instructions in the 8 byte boundary, the judgement on the contention condition between the two instructions is possible when the program instructions are stored. Taking advantage of this fixed pairing, the information concerning concentration between instruction is detected when the instructions are transferred from the main memory to the instruction cache. By detecting the contentional relationship between the two instruction and by providing individual fields for every two instructions, when parallel processing is possible, 0 is stored therein, and when sequential processing is to be executed, 1 is stored therein. Therefore, when the instruction caches are read out, the contention information is also read out at the same time.

The advantages of this type of operation are that the information concerning a contentional relationship between two instructions always exists correctly and there is no need to check the contentional relationship every time, which leads to high speed processing.

Firstly, the operation in a case where a pair of instructions exist in the instruction cache will be described. A first instruction and a second instruction, which are read out from the memory at a specified instruction address and have an instruction executing sequence, and are associated with SQF information, are stored in the first instruction register 806 and the second instruction register 807. The sequencer 810 controls storing into the EP 1 instruction register 808 and the EP 2 instruction register 809 by using the SQF 805 information read out together with the instructions and the information TAO 851 from the sequencer. The instruction stored in the EP 1 instruction register 808 is executed with the EP 1 processing unit 110, and the instruction stored in the EP 2 instruction register 809 is always executed with the EP 2 processing unit 112.

<A Case Where Parallel Processing is Possible>

When SQF=0, a first instruction is stored in the EP 1 instruction register 808 and a second instruction is stored in the EP 2 instruction register 809.

<A Case Where Parallel Processing is Impossible>

When SQF=1, in the first cycle, the function logic 811 for selecting instructions is controlled such that a first instruction is stored both in the EP 1 instruction register 808 and in the EP 2 instruction register 809. In order to avoid disappearance of the second instruction, the control signal MCCRE 852 for the output latch of the instruction cache is negated so as to temporarily store both the first instruction and the second instruction. At this time, the instruction stored in the EP 1 instruction register 808 is made ineffective with hardware and only the instruction stored in the EP 2 instruction register 809 is made effective.

In the next cycle, the sequencer 801 makes the SQF signal ineffective by setting TAO=1. The program control unit controls the instruction address so as to output the same address again since the instruction address needs to specify the next instruction. Thus, the EP2 instruction register 809 will now receive and store the second instruction and hardware will again render the EP1 instruction register 808 ineffective.

FIG. 11 is a table showing the relationship between the control signal SQF 850 and the control signal TAO masking function, the distribution of instructions to the EP 1 instruction register 808 and the EP 2 instruction register 809, and the effectiveness or ineffectiveness of each instruction.

In the sequential processing, in the first cycle, the first instruction is stored in the EP 2 instruction register 809, and in the successive cycle the second instruction is stored in the EP 2 instruction register 809. That is, both of the first instruction and the second instruction are executed with the EP 2 processing unit 112 through the EP 2 instruction register 809. The control is carried out as described above, the instructions such as ADD(5) and ADD(6) in FIG. 8 and in FIG. 9 may be sequentially processed.

Another important thing concerning the instruction fetch unit is the operation when receiving a branch instruction. The branch instruction is able to jump either to the first instruction or to the second instruction, though, the jumping destination is within the 8 byte boundary. A case where a jumping destination address and the parallel processing control described above overlap will be described next.

The sequencer controls the operation such that TAO=0 when jumping to the first instruction takes place. This operation may be the same processing for a program with sequential addresses.

On the other hand, the sequencer controls the operation such that TAO=1 when jumping to the second instruction takes place. Thus, as shown in FIG. 11, the first instruction is stored in the EP 1 instruction register 808 and the second instruction is stored in the EP 2 instruction register 809 regardless of the control signal SQF. The instruction stored in the EP 1 instruction register 808 is made ineffective by the hardware. Therefore, the instruction fetch unit 111 also having a jumping destination control for a branch instruction always operates correctly and does not cause any penalty due to branching.

FIG. 12 is a diagram showing how the EP 1 instruction and the EP 2 instruction are actually processed. When the content of the first instruction register 806 and the content of the second instruction register 807, which are output from the instruction cache memory 801, and the contention bit SQF 850 are in the condition shown in the upper part of FIG. 12, the EP 1 instruction and the EP 2 instruction are actually processed as shown in the bottom part of FIG. 12. Herein, the mark x indicates that the instruction is made ineffective.

The instruction 1 and the instruction 2 are parallelly processed since the contention bit is SQF=0. The instruction 3 and the instruction 4 are sequentially processed since the contention bit is SQF=1. In other words, the EP 2 processing unit 112 first executes the instruction 3 and in the successive cycle executes the instruction 4. The instruction 5 and the instruction 6 are parallelly processed since the contention bit is SQF=0. The instruction 7 and the instruction 8 are sequentially processed since the contention bit is SQF=1. In other words, the EP 2 processing unit 112 first executes the instruction 7 and in the successive cycle executes the instruction 8. In such a manner, by using the information obtained by checking independently for each set of instructions on whether or not parallel processing in the 8 byte boundary is possible, an efficient executing scheduling can easily be produced.

Next, the operation in the event of a cache miss, that is, when a pair of instructions does not exist in the instruction cache memory 801, will be described.

In an initial period of operation of a super scalar type microprocessor (such as after the power source switches on, after resetting, after switching a task etc.), the cache memory generally does not have any pairs of instructions. In stage IF, although instructions are fetched from the instruction address which stores a start address for the program, no instruction exists in the cache memory. Therefore, the super scalar type microprocessor transfers an instruction row of several bytes—dozens of bytes from the main memory and stores them into the instruction cache memory, and then restarts processing.

The super scalar type microprocessor 100 according to this embodiment executes the same processing as the conventional one as far as the processing until the instruction row is transferred from the main memory 191 into the cache memory 801. What is different from a usual super scalar type microprocessor is that the super scalar type processor 100 comprises a function MDP 805 which checks whether or not a pair of instructions in the 8 byte boundary can be parallelly processed.

FIG. 13 is a table showing an example of a dependence relationship between instructions judged by the function MDP 805 checking whether or not parallel processing is possible. Providing that the two instructions in the 8 byte boundary are a first instruction and a second instruction, in FIG. 13 the classifications in FIG. 2 are placed on both the horizontal axis and the vertical axis, and the possible processing for all combinations are displayed. Therein, the mark O indicates that parallel processing is possible and the mark x indicates that sequential processing is required.

The cases where parallel processing is impossible will be summarized below. The combinations of the first instruction and the second instruction of a LOAD group instruction A—LOAD group instructions A, LOAD instruction A—STORE group instructions B, STORE group instruction B—LOAD group instructions A, STORE group instruction B—STORE group instructions B, are incapable of being processed in parallel since the operand fetch unit 109 has only one port.

The combinations of the first instruction and the second instruction of integer calculating group ADD instruction D—integer calculating group ADDC instruction E, integer calculating group ADDC instruction E—integer calculating group ADDC E, are essentially incapable of being processed in parallel since the combinations include a first instruction which is an instruction to specify the PSW (processor status word) and a second instruction which is an instruction using the PSW.

The combinations of the first instruction and the second instruction of STORE group instructions B—multiplying and adding group instructions J, multiplying and adding group instructions J—STORE group instruction B, are incapable of being processed in parallel since the floating register unit 113 has only four ports, which means that a multiplying and adding instruction and an FSTORE instruction are incapable of being processed in parallel. However, an integer STORE instruction and a multiplying and adding instruction are capable of being processed in parallel.

The combinations of the first instruction and the second instruction of FADD group instructions H—FADD group instructions H, FMUL group instructions I—FMUL group instructions I, multiplying and adding group instruction J—multiplying and adding group instruction J, are incapable of being processed in parallel since the processing unit for floating adding and the processing unit for multiplying have only one port each. When these units can be provided with two ports each from a hardware point of view, this limitation may be removed and parallel processing is possible.

The combinations, where the first instruction is a branch instruction and the second instruction is any instruction, are incapable of being processed in parallel. Although parallel processing of a branch instruction F and the preceding instruction is effective, parallel processing of a branch instruction and an instruction in a delayed slot is low in performance. The details of this will be described later. Therefore, sequential processing is executed when the first instruction is a branch instruction F, and parallel processing may be executed when the second instruction is a branch instruction.

As the result, the hardware portion for branch instruction processing of the EP 1 processing unit may be eliminated when only the result of the EP 2 processing unit is connected so as to be capable of switching to the instruction address. The switching means is the instruction address bus 150 in FIG. 1. By deleting the hardware portion for branch instruction processing from the EP 1 processing unit, the super scalar type microprocessor can be miniaturized.

When there is a system control instruction G either in the first instruction or the second instruction, parallel processing is impossible. System control instruction G has a small frequency of appearance, changes the statement of the processor in some time and has a small possibility of being capable of parallel processing. Therefore, system control instruction G is sequentially processed. In order to improve performance, the system control instruction G may be modified such that parallel processing is executed only when it is the second instruction, like the branch instruction F.

The register contention of instructions, which is one of the purposes of function MDP 805 checking whether or not parallel processing is possible, will be described next. This function is the same both for integer calculation and floating point calculation. Explaining more in detail, the first condition: all targets for the first instruction=all sources for the second instruction;

the second condition: all targets for the first instruction= all targets for the second instruction. When the first condition and/or the second condition is satisfied, sequential processing is executed. And, when both are not satisfied, parallel processing is executed. In this embodiment, interrupt processing control may be simplified by introducing the second condition.

In the second condition, a pair of NOP (no operation) instructions cannot be parallelly processed. In this case, as an alternation of the embodiment, the parallel processing of a pair of NOP instructions may be excluded from the second condition as an exception.

When parallel processing is impossible as the result of detecting the conditions of the function MDP 805 checking whether or not parallel processing is possible, the TAG 804 is set to 1 for each pair of instructions. The operation of the processor after re-starting is the same as the case where instructions exist as described above.

One of the main advantages of the instruction fetch unit in the embodiment is that all instructions to be executed are executed with the EP 2 processing unit for sequential processing. In order to decrease the hardware volume by taking the trade-off between hardware volume and performance improvement into consideration, the portions of the hardware in the EP 1 processing unit which can be eliminated are deleted. The instruction which cannot be executed with an EP 1 processing unit being some portions thereof deleted may be executed with the EP 2 processing unit in such a manner that, for example, the check function MDP 805 checks whether or not a branch instruction exists, and, when the instruction of this kind occurs, the check function MDP 805 sets the contention bit such that SQF=1.

Further, by providing hardware always outputting 1 when a designation is input thereto from an external pin or a diagnostic register in the check function MDP 805, a super scalar type microprocessor which always sequentially processes instructions can be obtained. This function is useful for self diagnosis of the super scalar type microprocessor and for debugging.

Although the instruction fetch unit 101 in this embodiment fetches instructions from the cache memory 803 with a logic address, the present invention can be applied to a structure which fetches instructions with a physical address by using an address conversion unit. Further, as the structure of the cache memory 803, direct map and two way set associative types have been proposed, and all of those are also applicable to the present invention.

A hierarchical system having a primary cache memory 803 and a secondary cache memory 190, may also be provided wherein a check function MDP 805 is inserted between transfer of instructions between the primary cache memory 803 and the secondary cache memory 190 and the TAG 804 may be provided only in the primary cache memory 803, or a check function MDP 805 is inserted between the secondary cache memory 190 and the main memory 191 and the TAG 804 may be provided both in the primary cache memory 803 and the secondary cache memory 190. Further, the TAG 804 may be installed in the main memory 191. When a program is installed in the main memory 191, the TAG 804 is transferred to the main memory 191 through the check function MDP 805.

As a high speed processing method at the time of a cache miss, although a stream method where a missed instruction is by-passed and is being written in the cache memory 803, can be considered, a check function MDP 805 is also required in this by-pass circuit.

By sacrificing performance a little, the TAG 804 may be set to 1 unconditionally only when a missed instruction passes through the by-pass circuit. By doing so, passing through the check function MDP 805 can be avoided with the by-pass circuit.

Back to operation of the super scalar type microprocessor 100 according to the present invention and referring to FIG. 14 through FIG. 22, the operation which occurs when a branch instruction is detected will be described. A branch instruction has a delay branch function which is common in RISC systems. Delay branch is a method where the instruction next to a branch instruction is executed after the branch instruction has been executed, and then the branch destination instruction is executed. Delay branch is a method of suppressing a disturbance of the pipe-lines. The slot executing the instruction next to the branch instruction is referred to as a delay slot.

Figure 14:
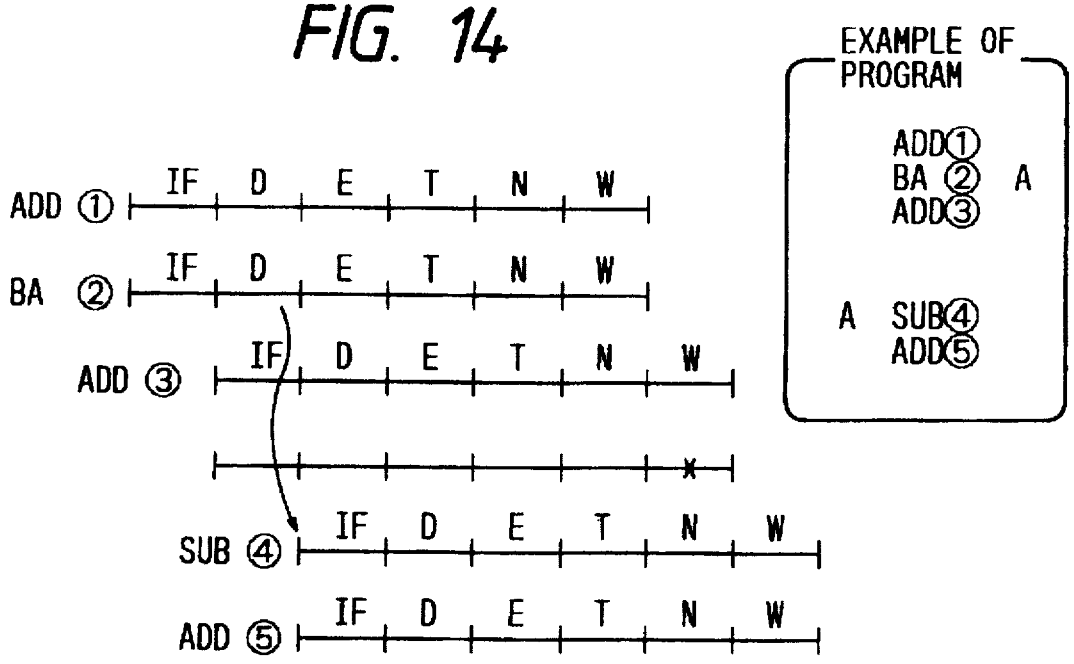
FIG. 14 is a pipe-line flow chart of a branch instruction.

FIG. 14 is a pipe-line flow chart of a branch instruction BA (branch and piping) existing as a second instruction of the pair. Therein, the first instruction is ADD(1) and the second instruction is BA(2), which are parallelly processed. ADD(3) is an instruction processed in a delay slot. The BA instruction as shown in FIG. 3, has address calculation executed in stage D. For this reason, as shown in FIG. 14, SUB(4), which is a of the branch destination, and ADD(5) are parallelly executed in the cycle next to the delay slot. Therefore, the branch instruction is executed without an empty cycle. Although there is one delay slot here, it is possible to provide two delay slots to execute branching more efficiently, since this embodiment has two hardware devices for effecting parallel processing.

Figure 15:
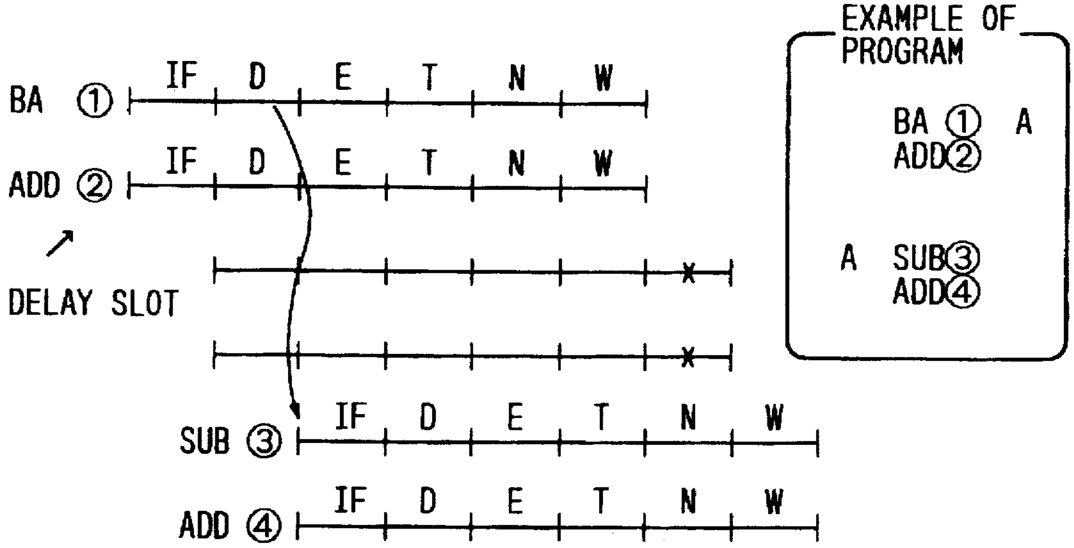
FIG. 15 is a pipe-line flow chart showing an operation in a case where the first instruction is a branch instruction BA.
Figure 16:
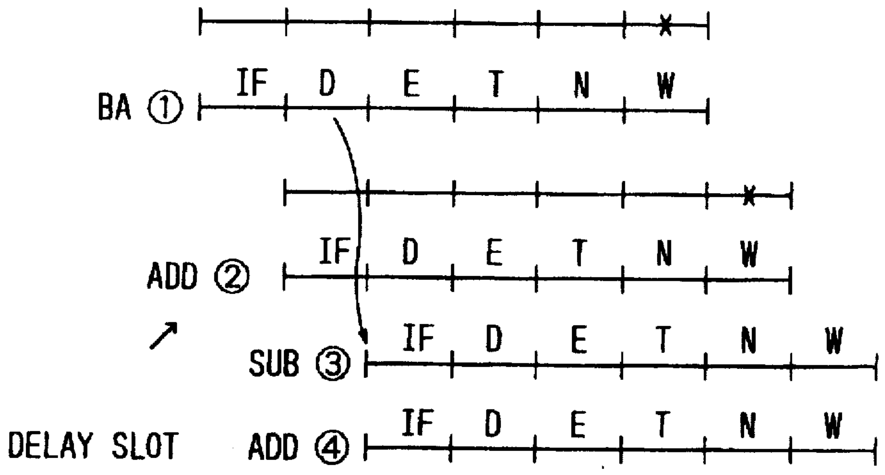
FIG. 16 is a pipe-line flow chart showing an operation in a case where the first instruction is a branch instruction BA.

FIG. 15 and FIG. 16 are pipe-line flow charts showing the operation when a branch instruction BA exists as the first instruction of the pair. FIG. 15 shows a case where BA(1) and ADD(2), which is an instruction in the delay slot, are parallelly processed. And, FIG. 16 shows a case where these instructions are sequentially processed. In these cases, three cycles are required until ADD(3) is executed in both cases. The instruction fetch unit 101 in the embodiment operates such as to sequentially process the combination of instructions containing a branch of the first instruction side as shown in FIG. 16. Therefore, it is sufficient for a branch instruction always to control only the EP 2 control unit 105 and the hardware in the EP 1 control unit 103 corresponding to a branch instruction can be eliminated. Incidentally, when control is performed as shown in FIG. 15, the EP 1 control unit 103 is required to have hardware to process the branch instruction. On the other hand, three delay slots may be provided.

Figure 17:
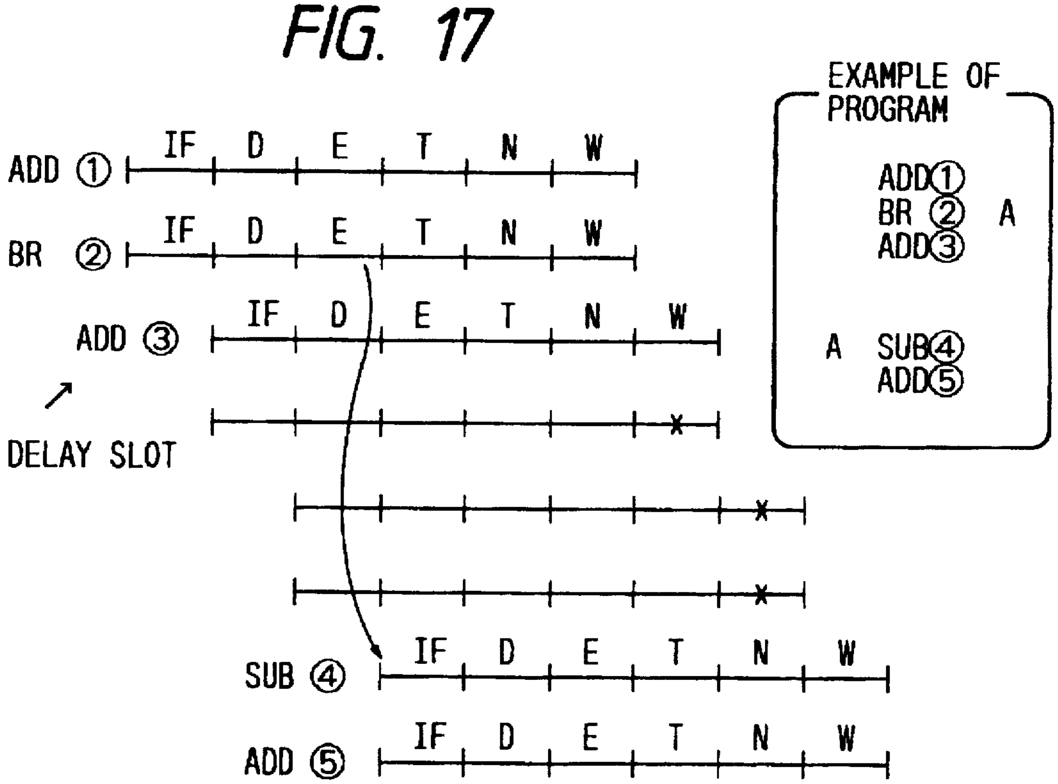
FIG. 17 is a pipe-line flow chart showing an operation in a case where both the first instruction and the second instruction have branch instructions.
Figure 18:
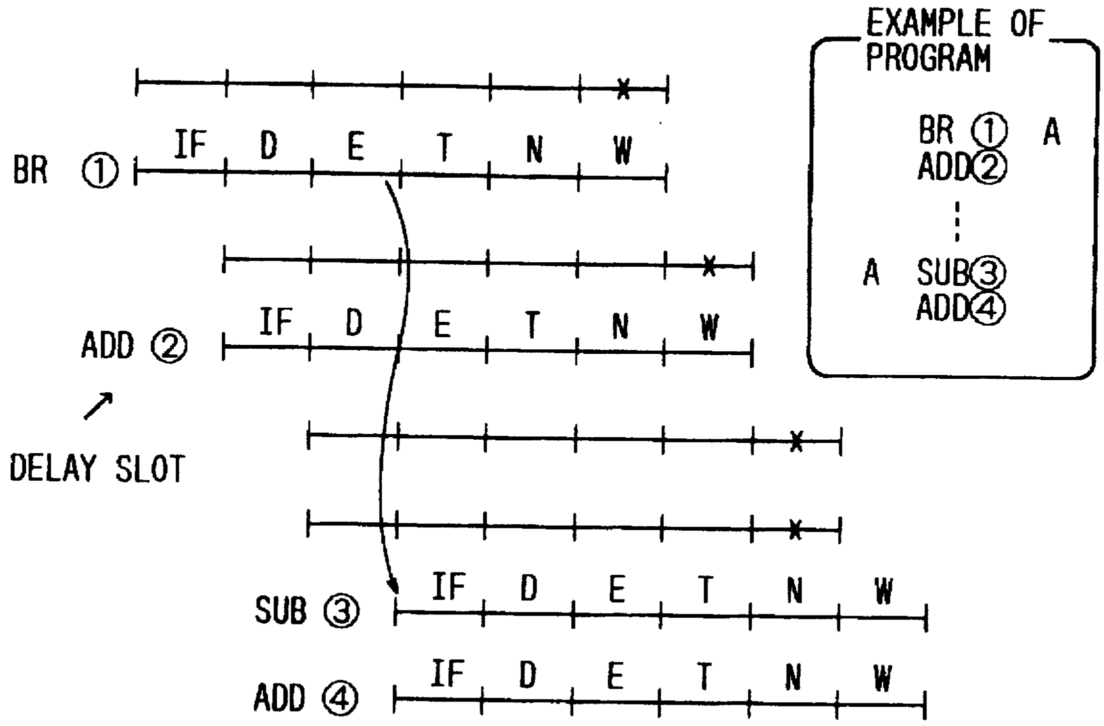
FIG. 18 is a pipe-line flow chart showing an operation in a case where both the first instruction and the second instruction have branch instructions.

FIG. 17 and FIG. 18 are pipe-line flow charts showing operations when both a second instruction and a first instruction are branch instructions. The branch instruction, as shown in FIG. 3, reads out a register in the stage D and processes an address with the EP 2 processing unit. The calculated address is output onto the address bus 150. Therefore, the instruction at the address of the branch destination is fetched in stage T in the BR instruction. In the cycle next to the BR instruction a delay slot is executed; in the following cycle no instruction is executed; and, in the next cycle, the instructions of the branch destination is executed. Therefore, as shown in FIG. 17, the BR instruction has a one cycle penalty. FIG. 18 shows the same case as in FIG. 16 where sequential processing is executed, since the first instruction in a branch instruction. Here, the executing cycles become the same even when the BR(1) and the ADD(2) institutions are parallelly processed.

FIG. 19 shows a program including a conditional branch instruction. The relationship between a conditional branch instruction and the pipe-line operation will be described referring to this figure. Generally, a conditional branch instruction executes a branch when a certain condition is satisfied (TAKEN), and executes the instructions of the successive sequential addresses when the condition is not satisfied (NOTTAKEN).

In order to execute the conditional branch instruction with high speed, processing is executed with a predicted condition until the branch instruction judges the actual condition. When the predicted condition is proved wrong, the predicted instructions by the predicted condition are made ineffective. In the embodiment, the prediction is switched depending on whether or not jumping to the address of the branch destination is made after the jumping condition judgement. Explaining more in detail, when jumping is made after the jumping condition judgement, a NOTTAKEN prediction control is executed, and when jumping is made before the jumping condition judgement, a TAKEN prediction control is executed.

Figure 20:
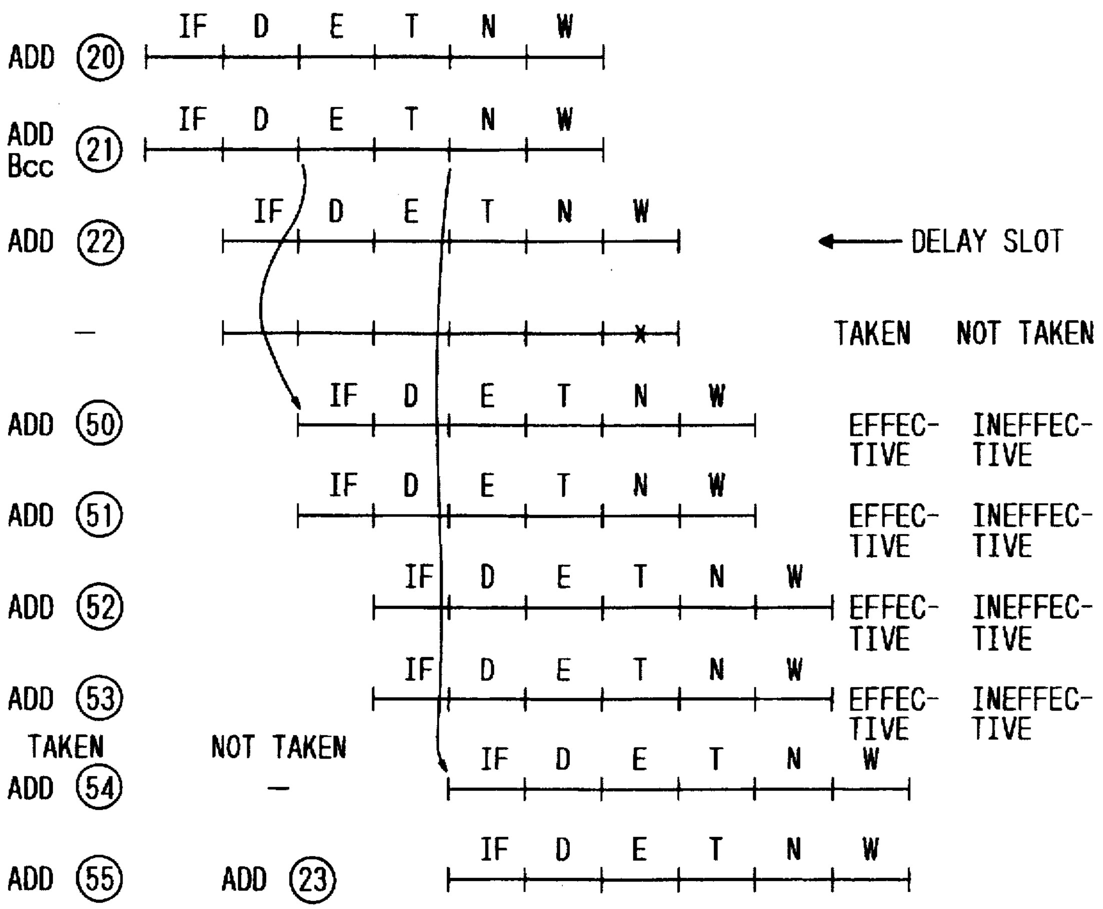
FIG. 20 is a pipe-line flow chart showing the operation in a case where a branch instruction predicts TAKEN.

FIG. 20 is a pipe-line flow chart showing the operation in a case where a branch instruction predicts TAKEN. ADDBcc(21) is a conditional branch instruction, and ADD (22) is an instruction executed in a delay slot. Since this conditional branch predicts TAKEN, the instruction (50) in the branch destination is executed in the next cycle like a BA instruction. Since the actual condition judgement of the conditional branch instruction is executed in stage T, the instructions (50) through (53) are started to be executed according to the prediction. When the predicted condition is proved right with execution of the actual judgement in stage T, the instructions (54) and (55) are executed in the following stages. Therein, the nine instructions up to ADD (55) are executed in five cycles. On the other hand, when the predicted condition is proved wrong, the instructions (50), (51), (52) and (53) having been started to be executed with prediction are made ineffective and ADD (23) is executed in the following stage. Therein, the four instructions up to ADD (23) are executed in five cycles.

Figures 21, 22:
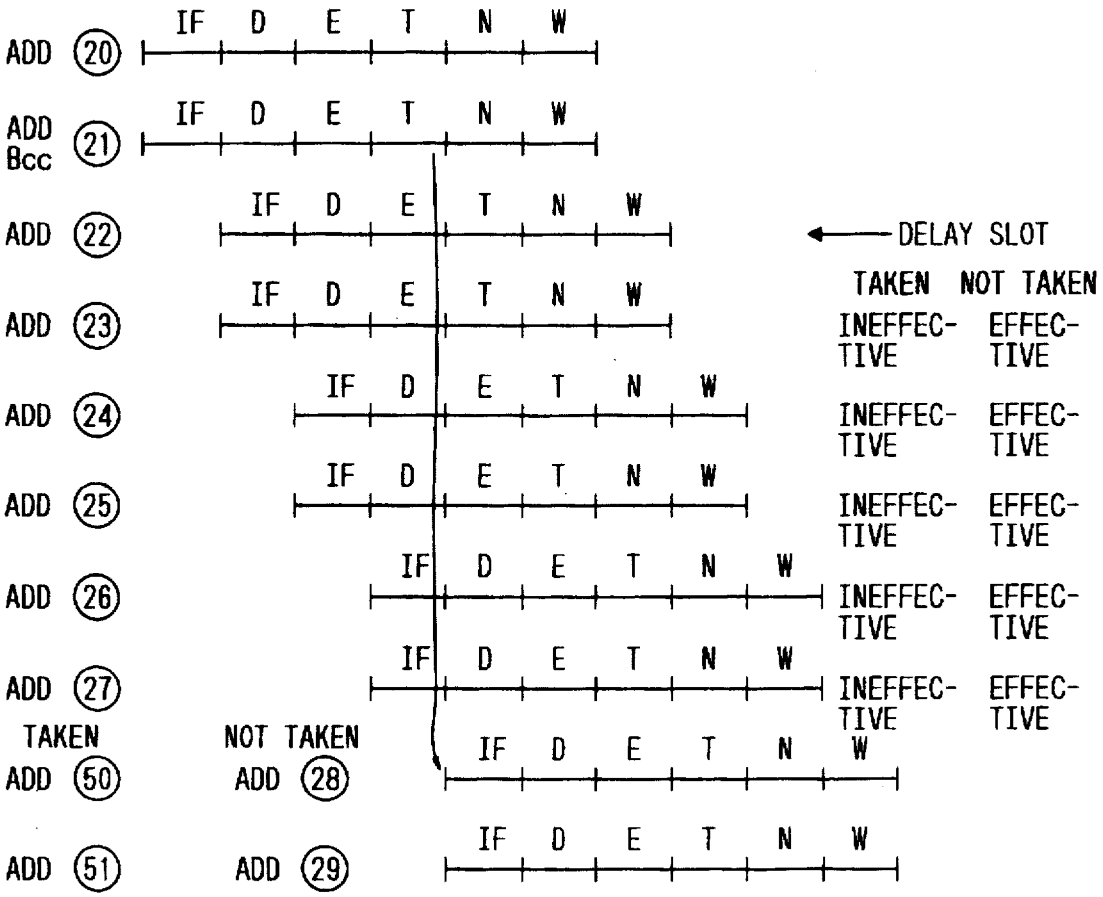
FIG. 21 is a pipe-line flow chart showing the operation in a case where a branch instruction predicts TAKEN.
FIG. 22 is a pipe-line flow chart showing the operation in a case where a branch instruction predicts NOTTAKEN.

FIG. 21 is a pipe-line flow chart showing the operation in a case where a branch instruction predicts NOTTAKEN. Since this conditional branch predicts NOTTAKEN, the successive instructions are executed according to the prediction. When the predicted condition is proved right with execution of the actual judgement in stage T, the instructions (28) and (29) are executed in the following stages. Therein, the ten instructions up to ADD (29) are executed in five cycles. On the other hand, when the predicted condition is proved wrong, the instructions (23), (24), (25), (26) and (27) which have been started to be executed according to the prediction are made ineffective, and ADD (50) is executed in the following stages. Therein, the five instructions up to ADD (50) are executed in five cycles.

FIG. 22 is a table showing a relationship between prediction and actual operation. In the case where the prediction is TAKEN, when the actual condition is TAKEN, that is, the prediction is proved right, the penalty due to ineffectiveness is zero. When the actual condition is NOTTAKEN, that is, the prediction is proved wrong, the penalty due to ineffectiveness is two cycles. Further, in the case where the prediction is NOTTAKEN, when the actual condition is TAKEN, that is, the prediction is proved wrong, the penalty due to ineffectiveness is two cycles. When the actual condition is NOTTAKEN, that is, the prediction is proved right, the penalty due to ineffectiveness is zero.

Although in FIG. 20 and FIG. 21, description is made for a case where a conditional branch instruction is the second instruction, processing is sequentially executed when a conditional branch instruction is the first of the same manner as in a case of an unconditional branch instruction. The explanation of this processing is deleted since it may be easily understood from the principles which apply to an unconditional branch instruction.

Although a description has been made above concerning a branch instruction with a delay branch function, branch processing for a branch instruction without a delay branch function may be efficiently executed by executing the same control as described above.

Back to the operation of the processor in the embodiment, the operation of a floating instruction will be explained referring to FIG. 1, FIG. 3, FIG. 23, FIG. 24 and FIG. 25.

A FADD instruction is fetched in stage IF and is transferred to the floating adding control unit 107 through the EP 1 operand bus 151 or the EP 2 operand bus 152 in stage D. The floating adder control unit 107 decodes the instruction and outputs a designation to read out the necessary register to the floating register unit 113 through the control line 164. The content of the necessary register is transferred to the floating adder 114. Then, the calculation is executed in four stages E, T, N and W. The floating adder control unit 107 designates the floating register unit 113 to write the result of the floating addition in the register specified by the FADD of the final stage Z. And, when a register contention, which is described later, does not exist, the FADD instruction executes the instruction with one cycle pitch.

Next, the operation of a FMUL instruction will be described. The FMUL instruction is fetched in stage IF and is transferred to the floating multiplier control unit 108 through the EP 1 operand bus 151 or the EP 2 operand bus 152 in stage D. The floating multiplier control unit 108 decodes the instruction and outputs a designation to read out the necessary register to the floating register unit 113 through the control line 165. The content of the necessary register is transferred to the floating multiplier 115. Then, the calculation is executed in four stages E, T, N and W. This is the same as in the FADD instruction. The floating multiplier control unit 108 designates the floating register unit 113 to write the result of floating addition in the register specified by the FMUL of the final stage Z. And, when a register contention, which is described later, does not exist, the FMUL instruction executes the instruction with one cycle pitch.

The data types of the FADD instruction and the FMUL instruction are checked according to the IEEE standard. Therefore, the information is transferred to each of the control units 107 and 108 from the floating adder 114 and the floating multiplier 115 through the signal lines 166 and 167.

A floating calculating unit has a large portion of hardware in a chip according to the present technology, and has only one set of calculation. However, the structure employed here is such that the instruction either from the EP 1 instruction register or the EP 2 instruction register may be executed in order to process instructions in parallel with other instructions.

Figure 23:
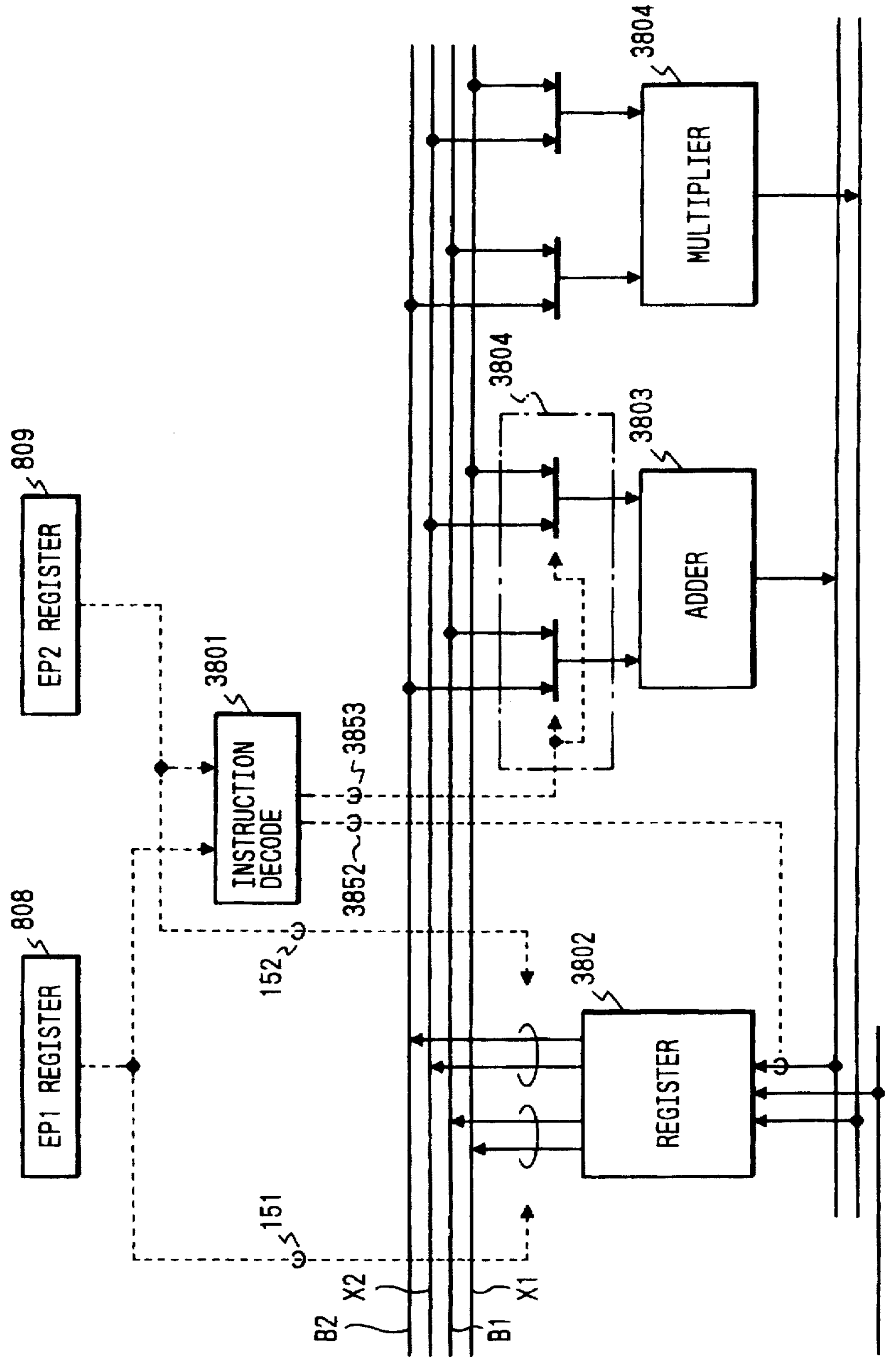
FIG. 23 is a diagram showing a relationship among the EP 1 instruction register 808 and the EP 2 instruction register 809, and floating data processing parts.

FIG. 23 is a diagram showing a relationship among the EP 1 instruction register 808 and the EP 2 instruction register 809, and floating data processing parts.

When the EP 1 instruction register 808 receives a FADD instruction, the EP 1 instruction register 808 causes calculating input data for the FADD instruction to be read out from the register 3802 to buses B1 and X1. An instruction decoder 3801 detects the existence of an effective FADD of the EP 1 instruction register 808, and switches the bus selecting logic 3805 positioned between the adder 3803 and the buses B1 and X1. The adder 3803 fetches the data from the buses B1 and X1, and executes the operation specified by the FADD instruction in the EP 1 instruction register 808.

When the EP 2 instruction register 809 receives a FADD instruction, the EP 2 instruction register 809 causes the calculating input data of the FADD instruction to be read out from the register 3802 to buses B2 and X2. The instruction decoder 3801 detects existence of an effective FADD of the EP 2 instruction register 809, and switches the bus selecting logic 3805 positioned between the adder 3803 and the buses B2 and X2. The adder 3803 fetches the data from the buses B2 and X2, and executes the operation specified by the FADD instruction in the EP 2 instruction register 809.

The operation concerning execution of a FMUL instruction is omitted, since the operation thereof using the multiplier 3804 is the same as above.

Such operation in the floating operating unit according to the present invention is especially useful when a chip may have only a small number of operating unit sets due to taking possession of a large portion of hardware.

Figure 24:
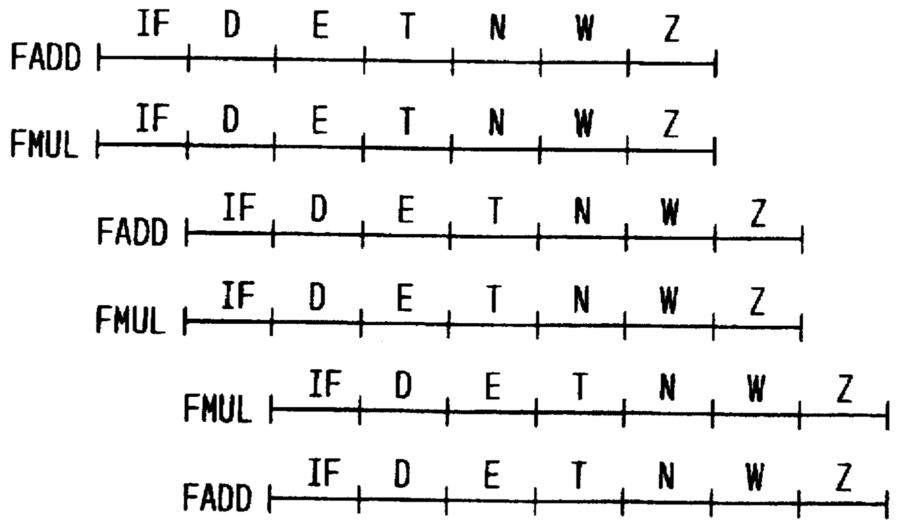
FIG. 24 is a pipe-line flow chart showing an example of continuous processing of an FADD instruction and an FMUL instruction.

FIG. 24 is a pipe-line flow chart showing an example of continuous of processing of an FADD instruction and an FMUL instruction in parallel. An FADD instruction or an FMUL instruction is capable of being processed in parallel with an integer calculating instruction as shown in the instruction combinations in FIG. 13.

Figure 25:
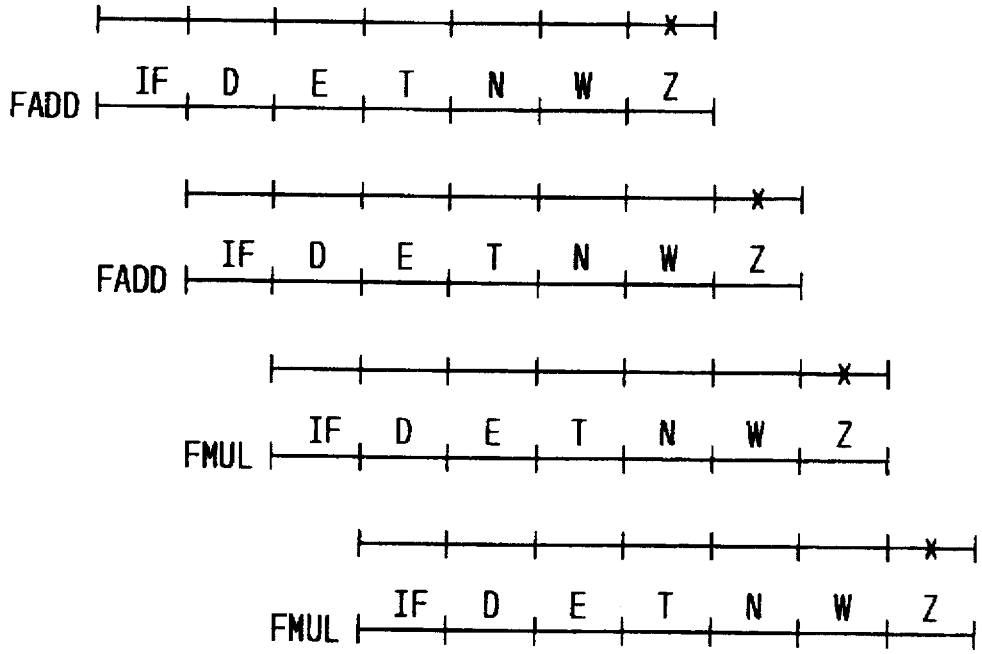
FIG. 25 is a pipe-line flow chart showing an operation when a row of floating calculating instructions are executed.

FIG. 25 is a pipe-line flow chart showing an operation for executing a instruction sequence row of a FADD instruction, a FADD instruction, a FMUL instruction, and a FMUL instruction. A set of FADD instructions or a set of FMUL instructions are sequentially processed since the processor in the embodiment has only one calculating unit, and such processing is carried out under control of the instruction fetch unit 101, as shown in FIG. 25.

When there are two sets of two processing systems for FADD instructions and FMUL instructions, parallel processing may be executed without any problem. However, since a processing system for a FADD instruction and a FMUL instruction needs a large hardware, there is provided, in this embodiment, a structure having only one processing system for a FADD instruction and a FMUL instruction. For this reason, sequential processing has to be adopted, which is a special characteristic of this embodiment.

Figure 26:
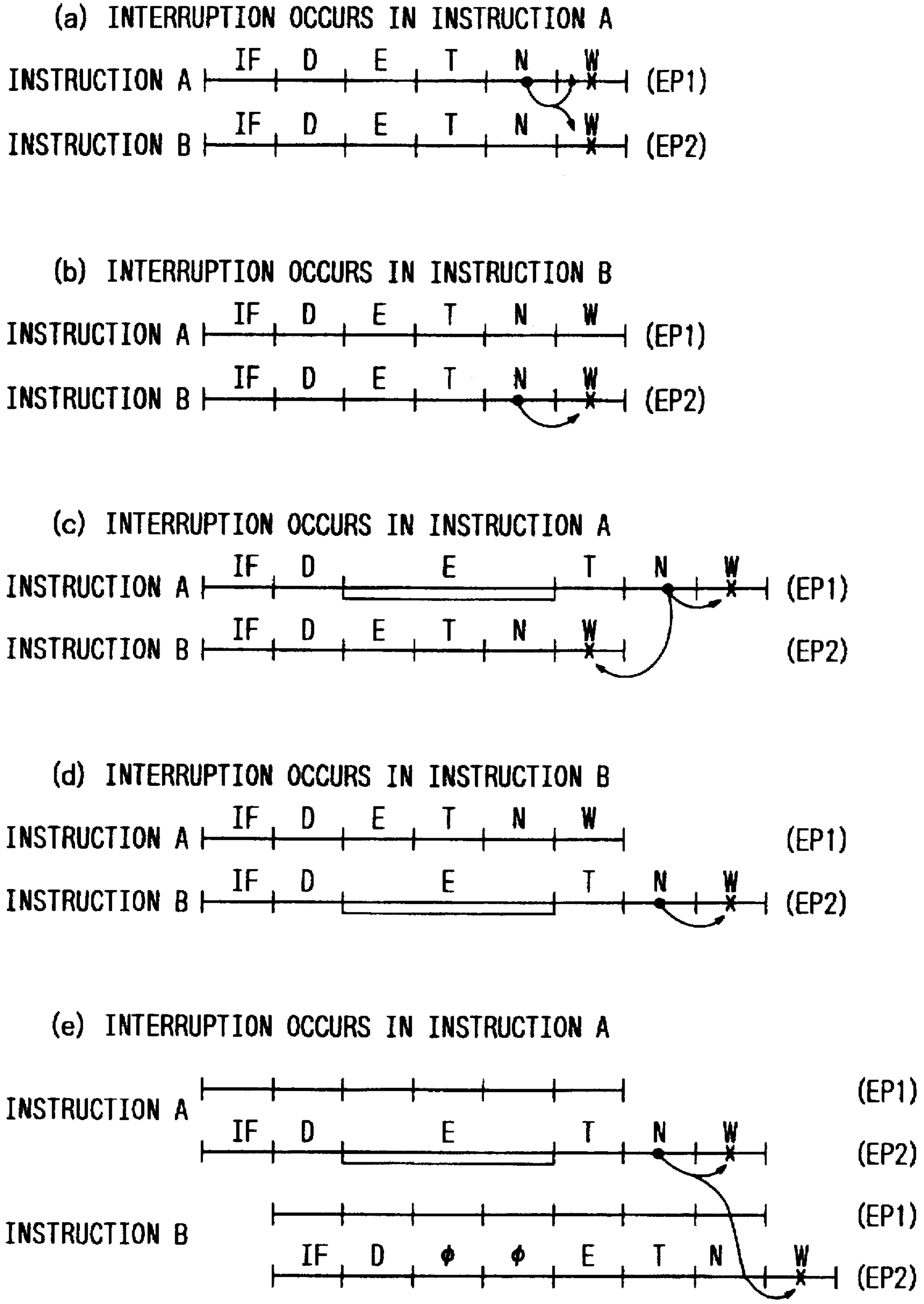
FIG. 26 is a pipe-line flow charts showing parallel processing of a super scalar type microprocessor having a set of instructions including plural cycle executing instructions.

FIG. 26 is a pipe-line flow chart showing parallel processing of a super scalar type microprocessor having a set of instructions including plural cycle executing instructions. In the above embodiments, instructions executed by one cycle pitch have been referred to. The plural cycle executing instruction, in FIG. 26, is an instruction having a cycle time for executing the instruction which is long, and so an instruction next to the instruction needs to wait during execution of the plural cycle executing instruction. Such an instruction is often used in a CISC type processor. Such instructions are instruction executed with a microprogram, a multiplying instruction for an integer, a dividing instruction for an integer and the like, and instruction repeating operation of a certain hardware n times to obtain a correct value and so on.

FIG. 26(*a*) and FIG. 26(*b*) show parallel processing and interruption of instructions A and B which are capable of being executed in one cycle. In the case of FIG. 26(*a*), an interruption occurs in the instruction A which has an earlier instruction executing order, and executions of that instruction and the instruction B next thereto are suppressed. In the case of FIG. 26(*b*), an interruption occurs in the instruction B which has a later instruction executing order, and the earlier instruction A is executed, while that of the instruction in question is suppressed.

FIG. 26(*d*) shows an example of parallel processing containing a plural cycle executing instruction which requires three cycles in stage E of instruction B. The instructions A and B are executed by parallel processing. When an interruption occurs in the instruction B, the instruction A continues to be processed since the instruction A has an earlier executing order than the instruction B, and execution of the instruction B is suppressed.

FIG. 26(*e*) shows a case where the instruction A is a plural cycle executing instruction and a preceding instruction as compared with the instruction B. When a plural cycle instruction is the first instruction of a pair as shown in the embodiment, parallel processing is prohibited. In other words, the processing is executed with the contention bit SQF 850=1. The instructions A and B are sequentially processed. The EP 2 processing unit executes the instruction A and the instruction B is kept waiting in stage D after next cycle until the instruction A finishes its calculation.

Incidentally, when parallel processing is not employed, the instruction B finishes being executed as shown in FIG. 26(*c*) or the instruction B is kept waiting in order to meet with the instruction A, which makes control complex.

When a plural cycle executing instruction is in the first instruction, sequential processing makes the execution and interrupt control of an instruction set including a plural cycle executing instruction simple. Further, the plural cycle executing instruction is executed only with the EP 2, and so improvement in performance may be efficiently achieved with a small volume of hardware.

Another method of hardware support to execute a plural cycle executing instruction is that an instruction to be executed in plural cycles is divided into numbers of instructions capable of being executed in one cycle, and the combination of the instructions realizes the same function as obtained by executing the plural cycle executing instruction.

For example, the instruction set of Hewlett Packard Co. includes a Divide Step instruction and a Decimal Correct instruction. Integer dividing or decimal calculation can be achieved by repeating these instructions or by combining these instructions with other instructions. Therein, these instructions appear only when such a special calculation occurs and have a dependence relationship with the instructions positioned before and after. Therefore, the relationship between these instructions and parallel processing is such that, when processing is executed sequentially, only the second processing unit has the function to execute these instructions which miniaturizes a super scalar type microprocessor.

Referring to FIG. 27 through FIG. 34, an explanation will be made next on pipe-line control of instruction contention in a super scalar type microprocessor in accordance with the present invention.

Figure 27:
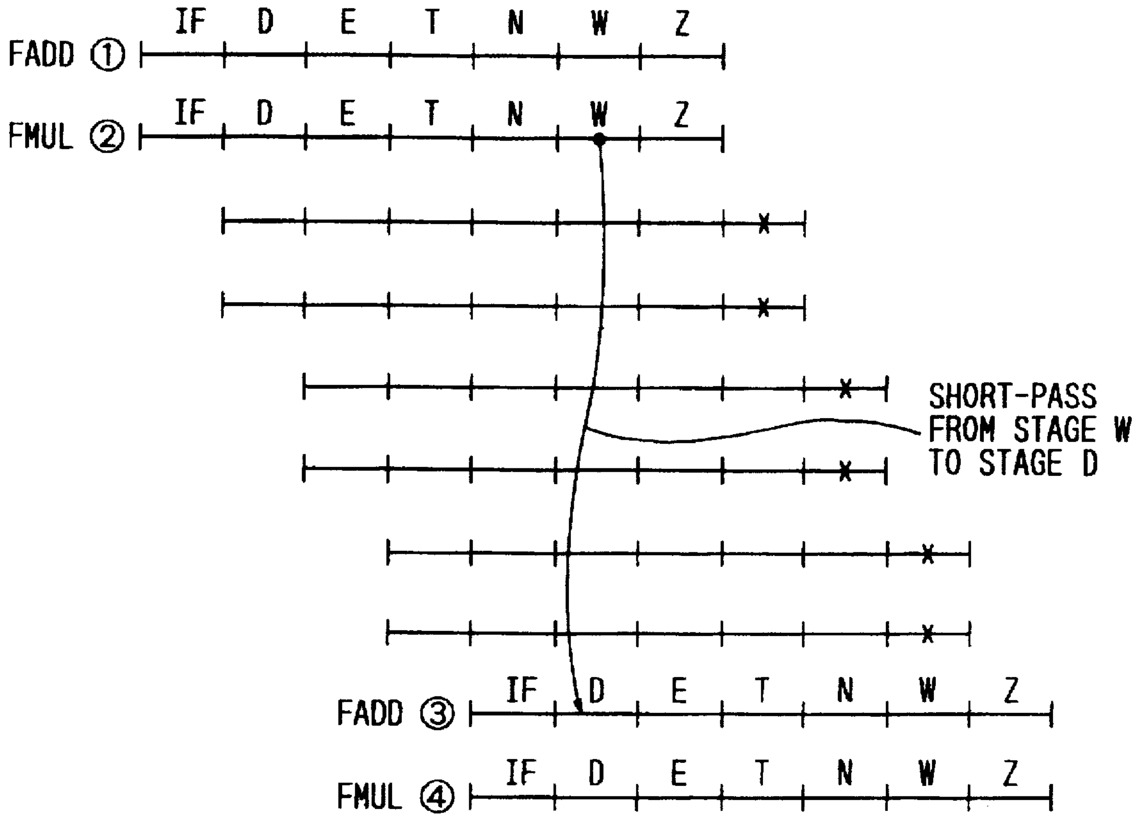
FIG. 27 shows a case where the calculated result of FMUL(2) is used as input information in FADD(3).

FIG. 27 shows a case where the calculated result of FMUL(2) is used as input information for FADD(3). In this program, FMUL(2) executes floating multiplying of the contents of the register 12 and the register 13, and stores the result into the register 14. On the other hand, FADD(3), the next instruction, executes floating adding of the contents of the register 14 and the register 15, and stores the result into the register 16. Therein, the register 14 has to store the result obtained by the execution of the FMUL instruction. The FMUL instruction itself requires four cycles for calculating. Although the by-pass from stage W to stage D is supported with hardware in this structure, FADD(3), the next instruction, has to keep waiting until the fourth cycle of FMUL(2).

Figure 28:
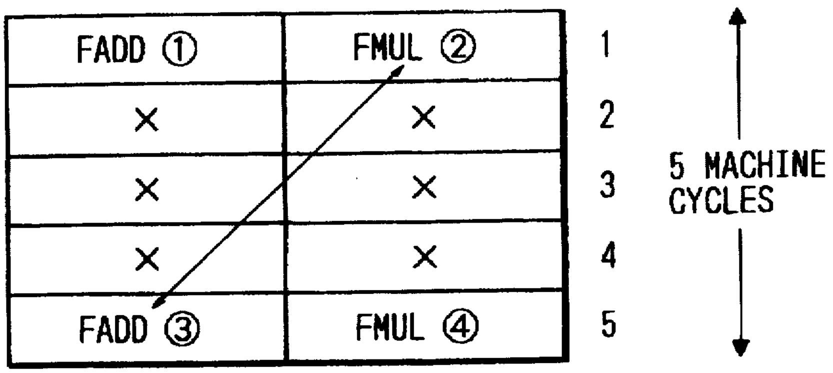
FIG. 28 is a diagram showing the states of processing in FIG. 27.

FIG. 28 is a diagram showing these states so as to be easily understood. When FMUL(2) and FADD(3) are in 8 byte boundary, processing is sequentially executed, and FADD(3) is kept waiting until the fourth cycle of FMUL(3).

Figure 29:
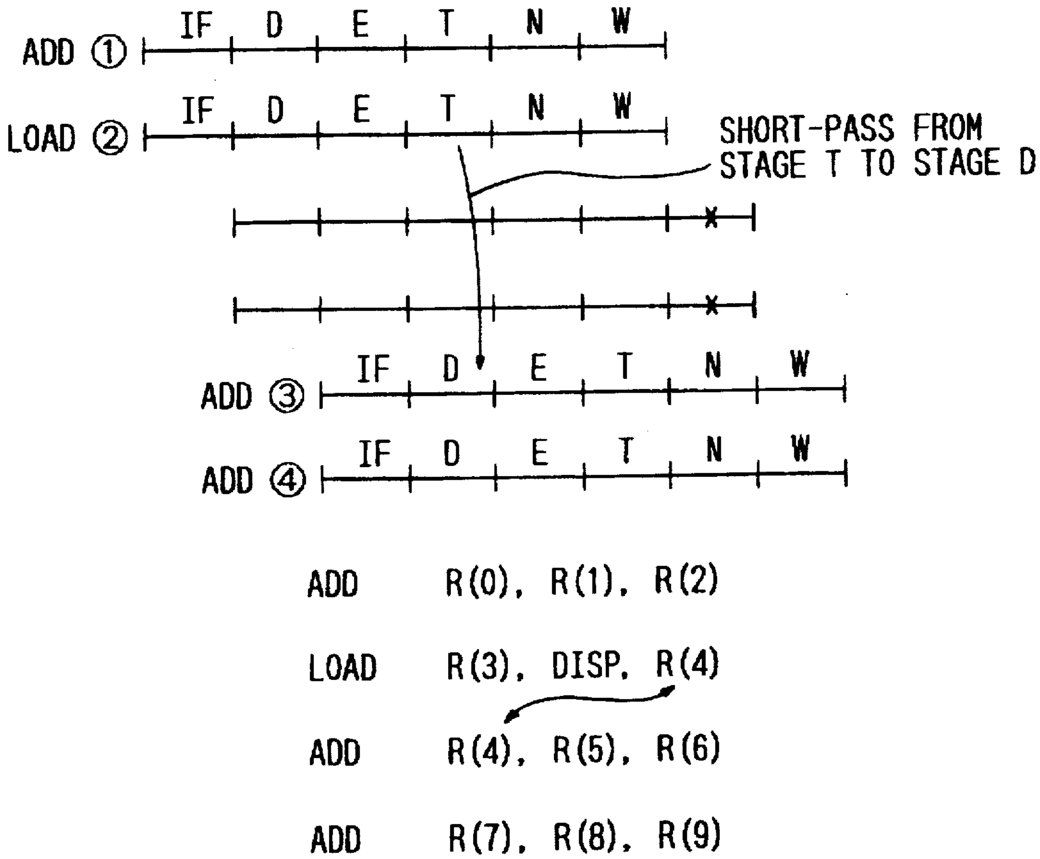
FIG. 29 is a chart showing an example where the data loaded by a LOAD instruction is taken by an instruction just next to the LOAD instruction.
Figure 30:
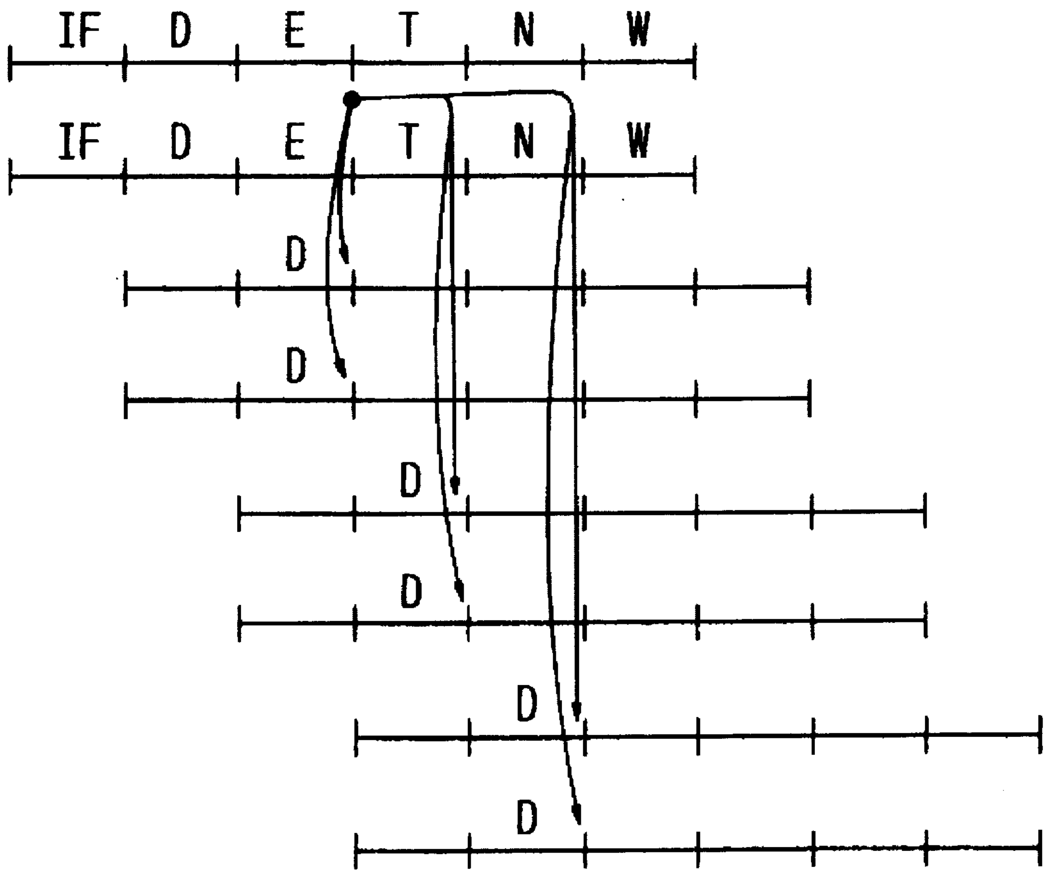
FIG. 30 is a pipe-line flow chart showing data by-pass having the integer register unit 111 in the super scalar type microprocessor of an embodiment in accordance with the present invention.

FIG. 29 is a chart showing an example where the data loaded by a LOAD instruction is taken by an instruction just next to the LOAD instruction. The super scalar type microprocessor in the embodiment comprises a data by-pass as shown in FIG. 30 in an integer register unit 111, and one instruction is executed in one machine cycle. In integer calculation, generally, pipe-line processing between instructions is sufficiently executed with sequential processing, and does not require additional pipe-line control. Therein, by-passing from stage E to stage D is, however, impossible, since the data of the LOAD instruction is read out in stage T through a BMW 170. Therefore, a by-pass from stage T to stage D is used. Therein, the pipe-line control unit 106 checks whether or not the contention of a register exists between cycles with the next ADD(3), and executes processing after one cycle waiting when the contention exists.

Figure 31:
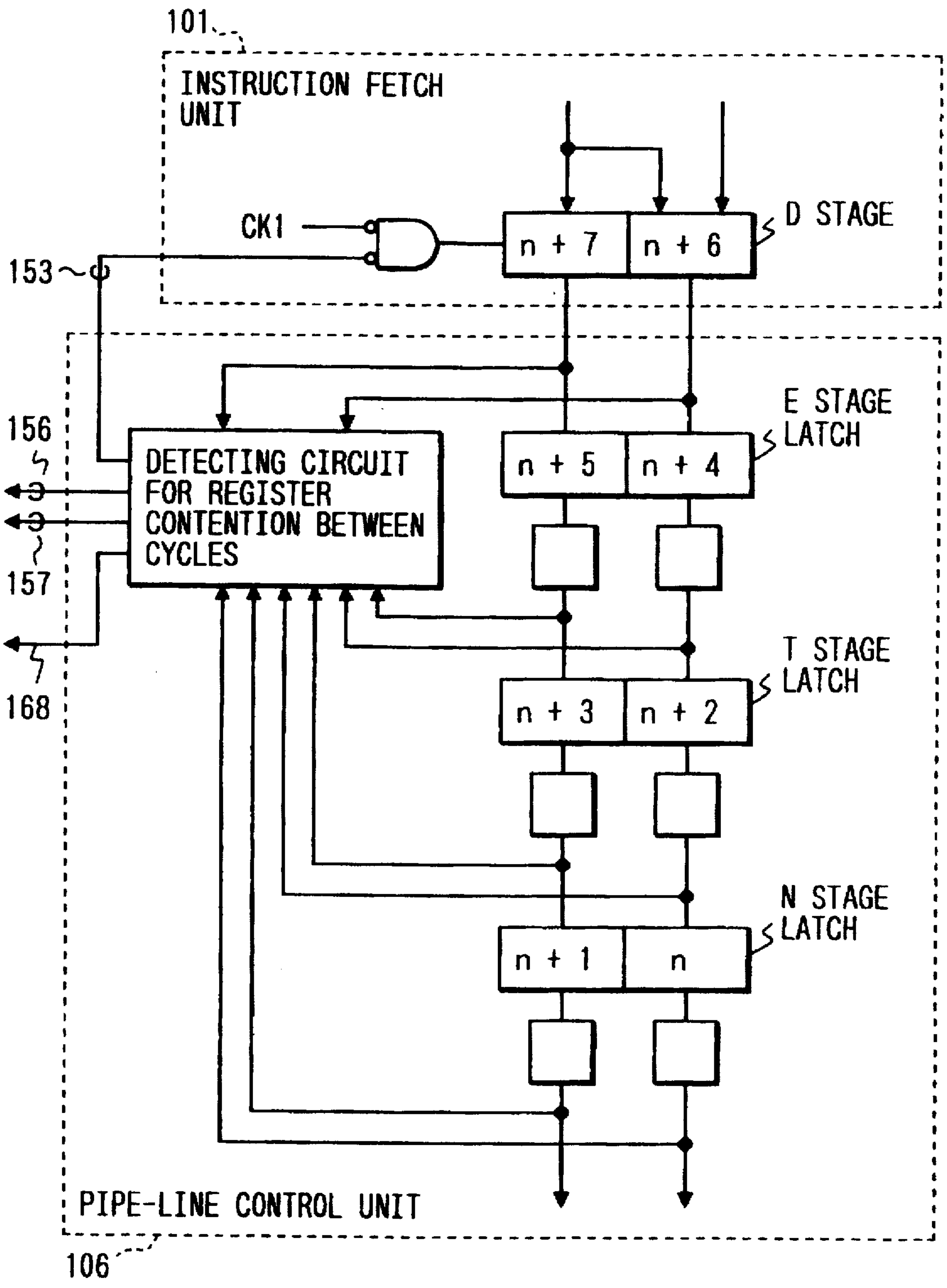
FIG. 31 is a block diagram showing the pipe-line control unit 106 in further detail.

FIG. 31 is a block diagram showing the pipe-line control unit 106 further in detail. The pipe-line control unit 106 leaves the information on the execution of instructions of each of the EP 1 and the EP 2 in stage E, stage T and stage N, and always compares the individual information with the instructions of the EP 1 and the EP 2 in stage D using the detecting circuit for register contention between cycles. When it is a condition to open the pipe-line, the of stage D is temporary stored in a latch in stage D, and leaves in stage D in the next cycle. An ineffective instruction is input in stage E. In stages T and N, an effective instruction progresses step by step. Therefore, one negated portion (stage E) is left between the instruction left in stage D and the instruction progressing in stages T and N. By repeating the operation, three ineffective cycles at maximum are produced as shown in FIG. 31.

Explaining the example of FIG. 27 more in detail, at first the instructions (1) and (2) exist in stage E, and the instructions (3) and (4) exist in stage D. This condition is the same as that of processing sequential instructions. The pipe-line control unit 106 judges the occurrence of contention between the register of the of stage D on the EP 2 side and the register of the of stage E on the EP 1 side, and negates the inable signal in stage D. In the next cycle, the instructions (1) and (2) exist in stage T, and the instructions (3) and (4) exist in stage D. Thereat, stage E is negated.

The pipe-line control unit 106 judges the occurrence of a contention between the register of the instruction in stage D on the EP 2 side and the register of the instruction in stage T on the EP 1 side, and negates the inable signal in stage D. In the next cycle, the instructions (1) and (2) exist in stage N, and the instructions (3) and (4) exist in stage D. Thereat, stages E and T are negated.

Further, the pipe-line control unit 106 judges the occurrence of a contention between the register of the of stage D on the EP 2 side and the register of the of stage N on the EP 1 side, and negates the inable signal in stage D. In the next cycle, the instructions (1) and (2) exist in stage W, and the instructions (3) and (4) exist in stage D. Thereat, stages E, T and N are negated.

Furthermore, in the next cycle, the pipe-line control unit 106 confirms that contention does not occur, and asserts the inable signal in stage D. In the next cycle, the instructions (1) and (2) exist in stage Z, and the instructions (3) and (4) exist in stage E.

The super scalar type microprocessor in the embodiment produces three ineffective cycles with such operation.

Similarly, in the case of FIG. 29, the pipe-line control unit 106 leaves the information in individual stages on the load instruction and executes checking every cycle, then produces one ineffective cycle.

Figure 32:
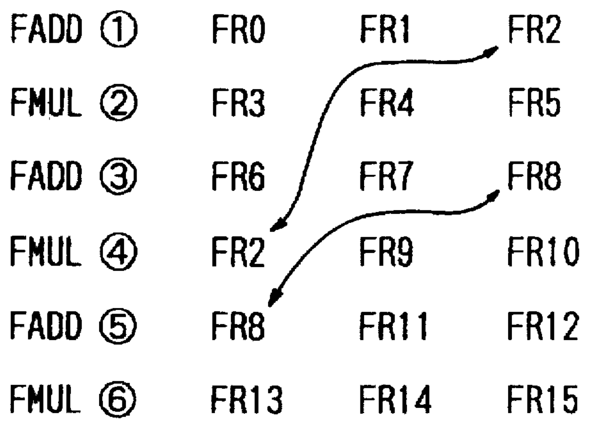
FIG. 32 is a graph showing a further example of the pipe-line control in detail.

FIG. 32 is a diagram showing a further example of the pipe-line control in detail. The example is a case where there is a contention between the write-in register of the FADD(1) and the read-out register of the FMUL(4) and a case where there is a contention between the write-in register of the FADD(3) and the read-out register of the FMUL(5).

Figure 33:
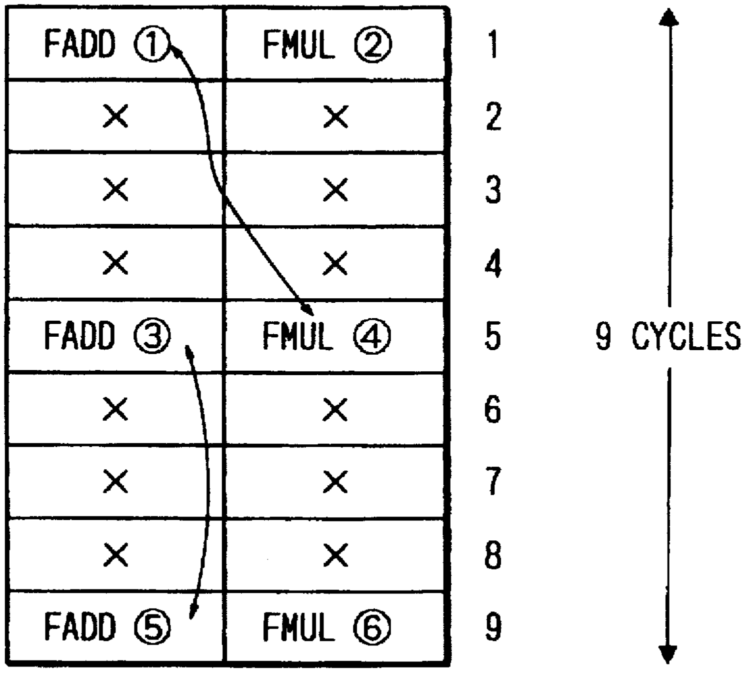
FIG. 33 is a diagram simply illustrating a program as an operation in correspondence with the control method.

FIG. 33 is a diagram simply illustrating this program as an operation in correspondence with the control method described above. In this embodiment, when a contention takes place in either of two instructions in the same cycle and a different stage from stage D, the of stage D is kept waiting. Therefore, three ineffective cycles are inserted between FADD(1) and FMUL(4), and three ineffective cycles are also inserted between FADD(3) and FMUL(5). With the result that six instructions are executed with nine cycles.

As an alternative, a structure is employed, wherein it is separately detected for the instructions in stage D and in the same cycle whether or not either the instruction in the EP 1 side or the instruction of the EP 2 side contends with the instructions already progressing (in stage E, stage F, stage G). When the instruction of the EP 1 side contends, both of the two instructions in stage D are kept waiting as well as in the embodiment. However, when only the instruction of the EP 2 side contends, only the instruction of the EP 2 side is kept waiting, and so a fine control can be realized.

Figures 34, 35:
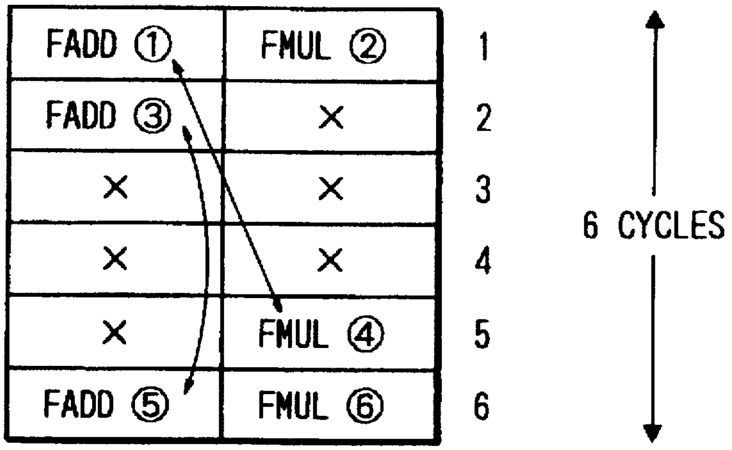
FIG. 34 is a diagram explaining pipe-line flow and operation in a register contention case with other cycles and illustrating the detailed operation of the program, as an example, in FIG. 32.
FIG. 35 is a diagram explaining parallel processing of multiply/add instruction and showing instruction formats of typical instructions.

FIG. 34 is a diagram illustrating the detailed operation of the program, as an example, shown in FIG. 32. The instruction FADD(1) and the instruction FMUL(2) are parallelly processed. In the next cycle, although FADD(3) and FMUL (4) enter in stage D, FADD(3), an instruction of the EP 1, has no register contention. On the other hand, FMUL(4), the instruction of the EP 2, has register contention. The instruction FADD(3) is executed in the next cycle, and only FMUL(4) is kept waiting for four cycles due to the relation with FADD(1). Next, although FADD(5) and FMUL(6) enter in stage D, FADD(3) and FMUL(5) already differ by three cycles and then no register contention occurs. Further, FMUL(6) is capable of being processed in parallel since no register contention occurs. With such a fine control, the six instructions in FIG. 32 can be processed with an executing time of six cycles.

Figure 36:
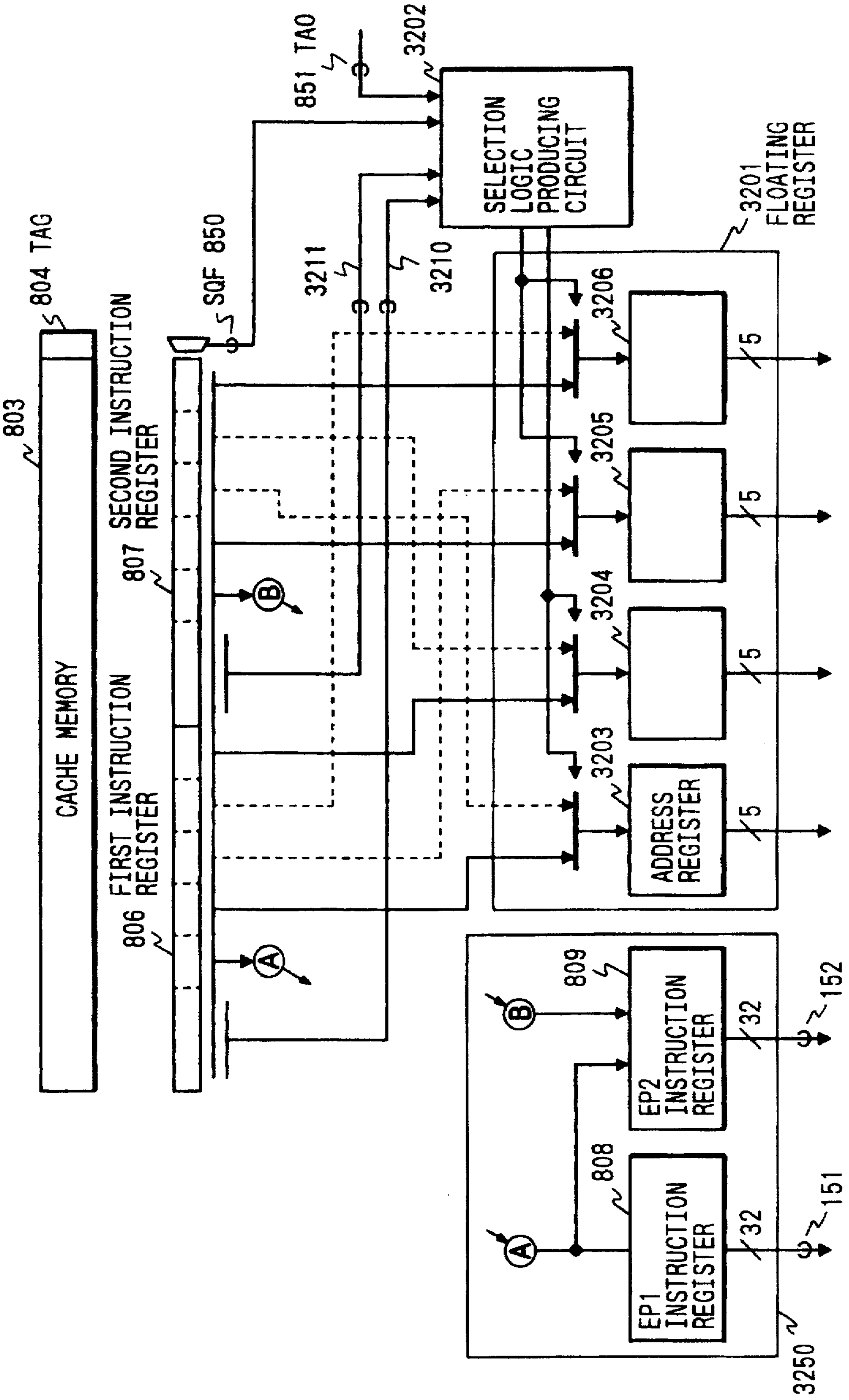
FIG. 36 is a block diagram showing a part of the instruction fetch unit 101 in FIG. 10.
Figure 37:
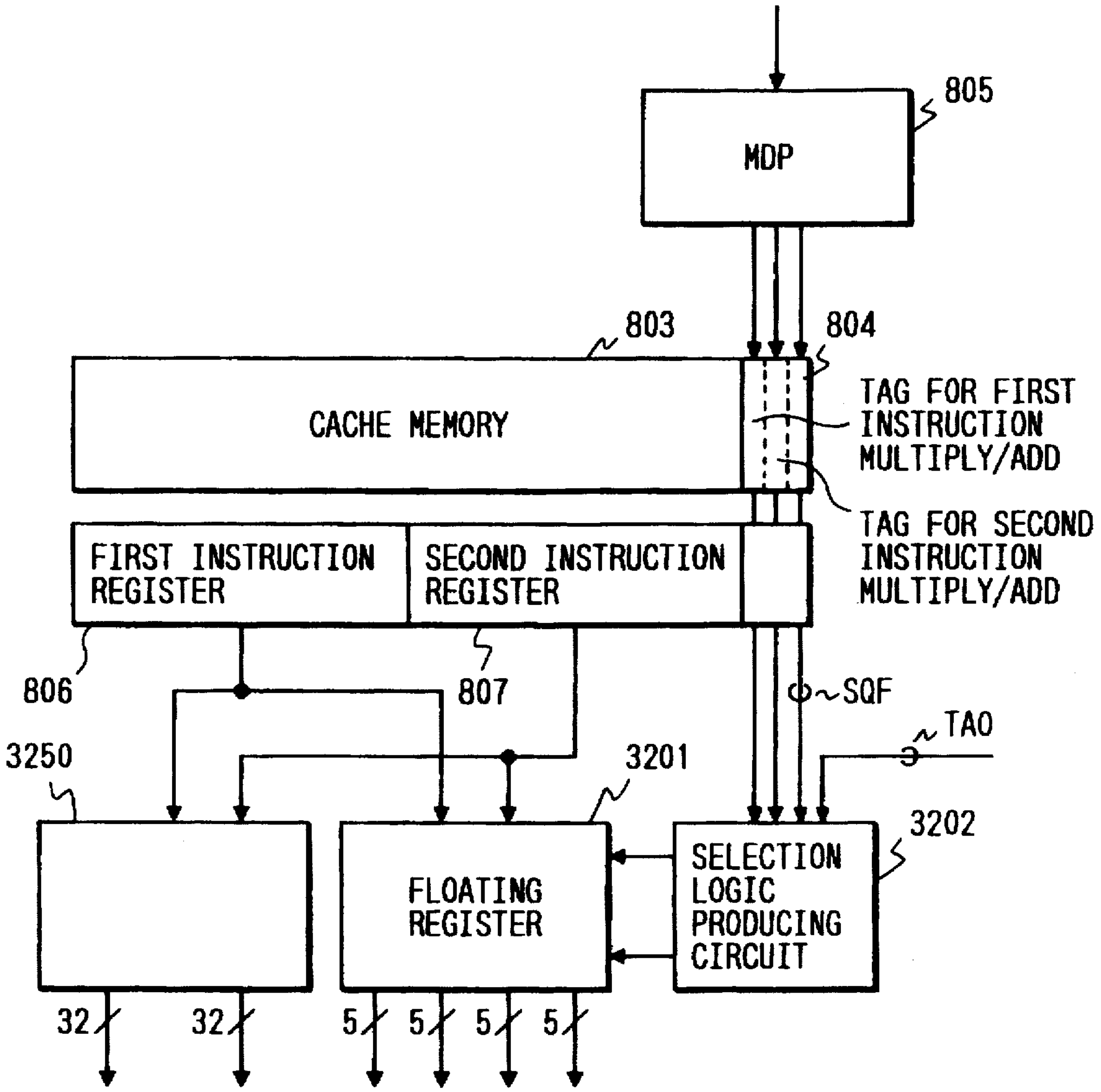
FIG. 37 is a block diagram showing the source field selecting function in the instruction fetch unit.

FIGS. 35 and 36 are diagrams illustrating a multiply/add instruction and parallel processing.

FIG. 35 shows the format of an instruction of a fixed 32 bits. The instruction using an integer instruction register has, as shown in FIG. 32, S1 and S2 indicating a source field and t indicating a target register, as well as OP code field. These fields are defined as fields fixed to common bits for each of all instructions. For the instruction using a floating register, the definition is, as indicated above, fields fixed to common bits for each of all instructions. With such common fixed fields, the content of a register can be read out with high speed without selection of a source field according to the instruction.

However, a multiply/add instruction has, as shown in FIG. 35, four source fields S1, S2, S3 and S4 in its own instruction, and executes FMUL and FADD, and then stores the results into target registers T1 and T2. Therefore, in the execution of a multiply/add instruction, selection of a source field is required.

FIG. 36 is a block diagram showing a part of the instruction fetch unit 101 in FIG. 10. A cache memory 803, a first instruction register 806, a second instruction register 807, an EP 1 instruction register 808, an EP 2 instruction register 809, an EP 1 operation code bus 151, and an EP 2 operation code iris 152 are common with FIG. 10, and the operations of these units are the same as those in FIG. 10. A floating register 3201 is controlled with a selection logic producing circuit 3202. The super scalar type microprocessor 101 in this embodiment has four ports for reading out the floating register 3201. Address registers 3203, 3204, 3205 and 3206 indicate each of the addresses of the floating register. Data is read out corresponding to the buses B1, X1 and X2 from the floating register 3201 at an address at which data is stored and then transferred to the processing unit in the floating data processing unit 117.

The operation of a multiply/add of FIG. 35 will be explained next. When a floating instruction comes to the first instruction register 806, the S1 and S2 fields of the instruction are stored in the address register 3203 and 3204. Similarly, when a floating instruction comes to the second instruction register 807, the S1 and S2 fields of the instruction are stored in the address register 3205 and 3206.

When parallel processing is possible, the floating instruction is parallelly stored in the first instruction register 806 and the second instruction register 807, and each of the S1 and the S2 fields are stored in the address registers 3203~3206. When a multiply/add instruction comes to the first instruction register 806, the operation code informs the selection logic producing circuit 3202 that the instruction is a multiply/add instruction through the signal line 3210.

When the first instruction register is effective according to the relation with the contention bit SQF 850 and the control signal TAO 851 which masks the contention bit, the selection logic production circuit 3202 provides control to store the S1 and S2 fields of FIG. 35 into the address registers 3203 and 3204, and the S3 and S4 fields into the address registers 3205 and 3206.

When a multiply/add instruction comes to the second instruction register and the second instruction register is effective according to the relation with the contention bit SQF 850 and the control signal TAO 851 which masks the contention bit, the selection logic production circuit provides control to store the S1 and S2 fields of FIG. 35 into the address registers 3205 and 3206, and the S3 and S4 fields into the address registers 3203 and 3204.

As described above, only in the case of when a multiply/add instruction, the fields are set into the four address registers 3203~3206 at the same time. Thereat, since the four floating source buses are used, the multiply/add instruction is incapable of being processed in parallel with an FADD or FMUL of this embodiment. Therefore, in the above combinations, the contention bit has to be set as SQF=1 by the signal MDP which indicates the capability to or not to carry out parallel processing. Further, parallel processing with FSTORE is also incapable due to the limitation of the number of ports in the register file, which is a particular problem of the embodiment and can be solved by increasing the port numbers in the register file.

Although, in this embodiment, the signal obtained through the signal lines 3211 and 3210 is decoded with the selection logic producing circuit 3202 to judge whether or not it is a multiply/add instruction, it may be possible, if required, that the judgement is speedily executed without decoding of the selection logic producing circuit 3202 by an improvement in which each of the instructions has attached thereto a TAG a multiply/add instruction when instructions are stored in the cache memory 803.

Figure 38:
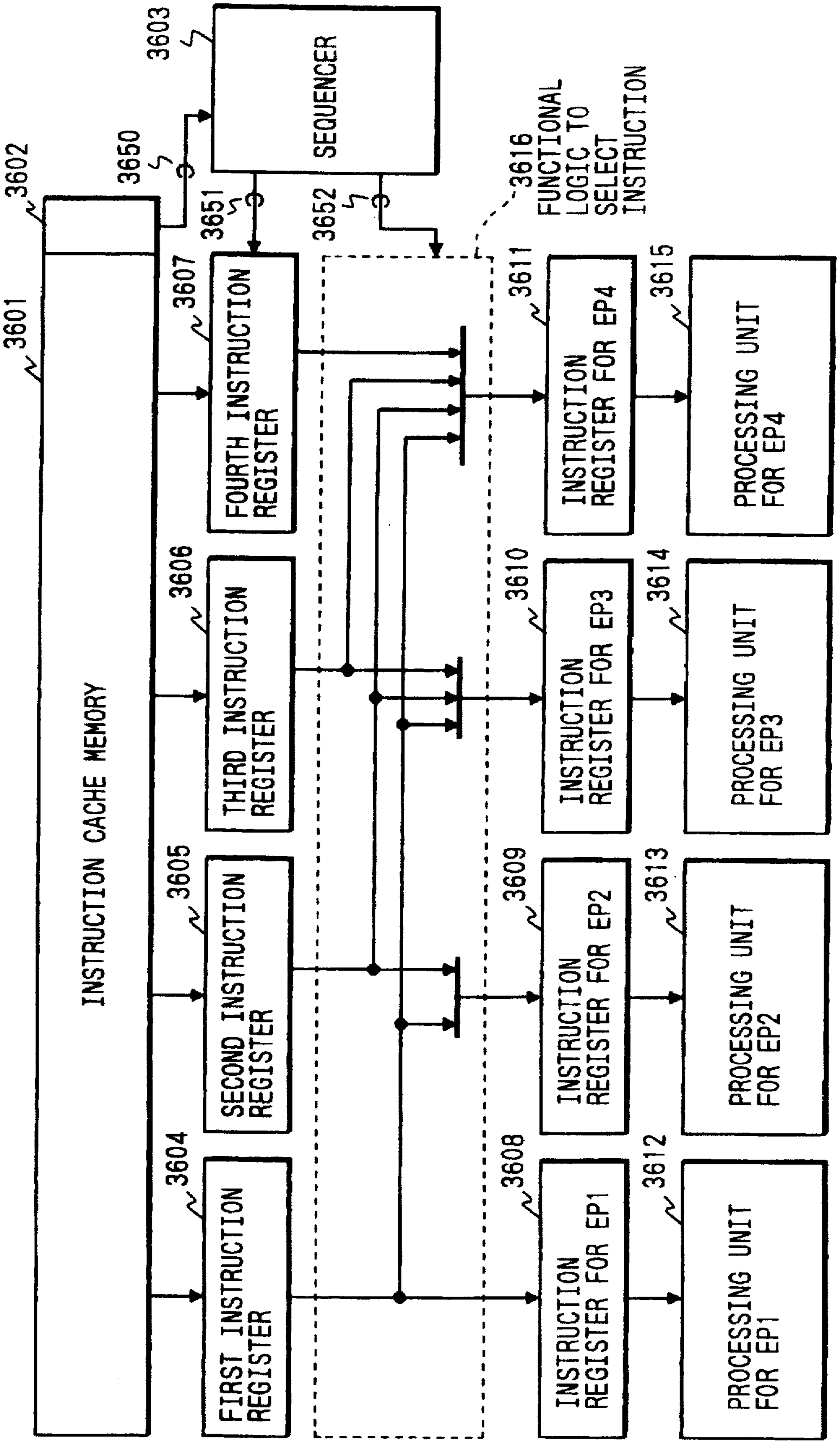
FIG. 38 is a block diagram showing the structure of an embodiment of a super scalar type microprocessor capable of being processed in parallel four instructions.

FIG. 38 is a block diagram showing the structure of an embodiment of a super scalar type microprocessor capable of being processed in parallel four instructions. The super scalar type microprocessor comprises a cache memory 3601, a TAG 3602 having pieces of contention information among four instructions, first~fourth registers 3604~3607, EP 1~4 instruction registers 3608~3611, EP 1~4 processing units 3612~3615 corresponding to the EP 1~4 instruction registers 3608~3611, instruction selection function logic 3616, and a sequencer 3603 to control the instruction selection function logic 3616 using the information of the TAG 3602.

When four instructions are capable of being processed in parallel, the four instructions are transferred from the first~fourth registers 3604~3607 to the EP 1~4 processing units 3612~3615 through the EP 1~4 instruction registers 3608~3611, and are executed in the EP 1~4 processing units 3612~3615.

When a branch instruction exists in the four instructions, the instruction selection function logic 3616 provides control such that the branch instruction comes to the EP 4 processing unit.

FIG. 39 is a table showing a relationship between the position of a branch instruction in an instruction sequence and the processing units. As shown in FIG. 39, parallel processing is most efficiently executed when the position of the branch instruction comes to the fourth instruction. The parallel processing can be efficiently improved in its performance by scheduling instructions such that the position of the branch instruction comes to the fourth instruction using a compiler or the like before executing the instruction.

When an instruction executed in plural cycles exists in the four instructions, the control is executed in the same manner as in the case of the branch instruction.

With the processing described above, it is sufficient that only the EP 4 processing unit has function logic to execute branch instructions and an instruction processed in plural cycles; thus, a super scalar type microprocessor capable of efficiently executing parallel processing can be obtained with little increase in hardware.

Generally, the relationship among the functional structures of the four processing units is expressed as follows.

EP 1<EP 2≦EP 3≦EP 4, that is, EP 1 is a part of the function logic of EP 2,

EP 2 is a part or the total of the function logic of EP 3,

EP 3 is a part or the total of the function logic of EP 4.

Adopting such a relationship makes the control of the selection function logic for instructions simple.

According to the above embodiment of the present invention, by providing a micro processor which is capable of parallelly a processing plurality of instructions with means for arranging the instruction sequential order of appearance of a branch instruction or an instruction executed in plural cycles and the position of the processing unit to execute the instruction, a super scalar type microprocessor capable of efficiently executing parallel processing of a program containing branch instruction or an instruction executed in plural cycles can be obtained with little increasing of hardware.

An escaping technique for instruction addresses when an interruption occurs in the above microprocessor will be explained hereinafter.

Figure 51:
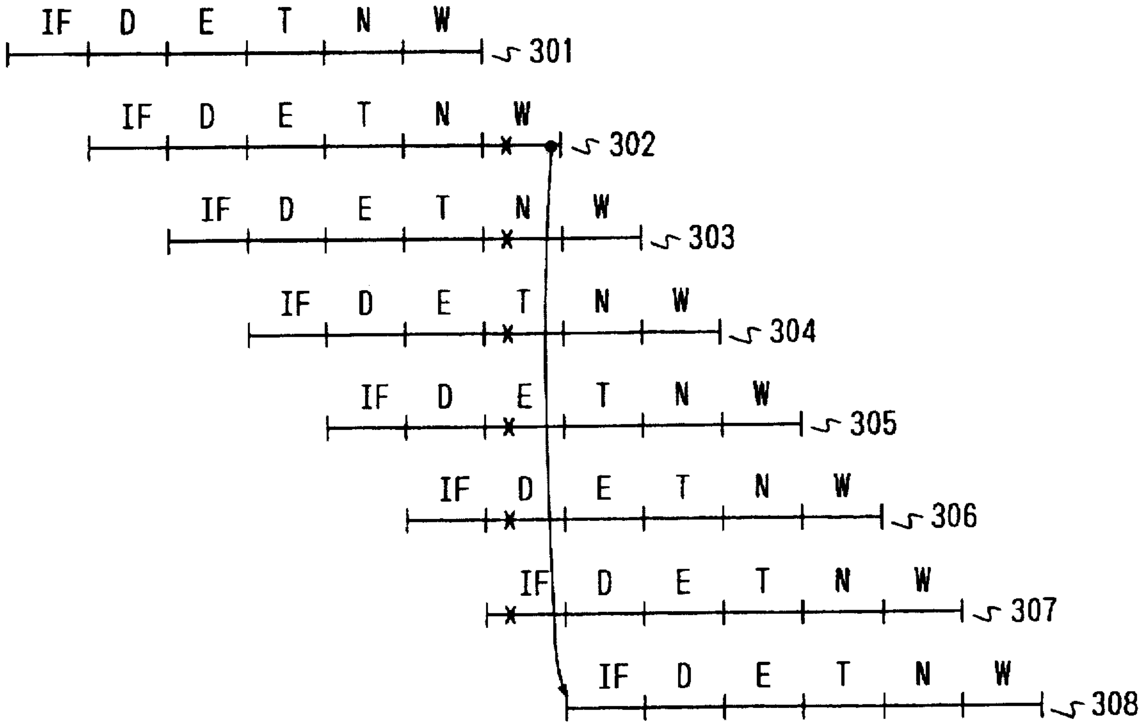
FIG. 51 is a timing chart showing operation of conventional pipe-lines at occurrence of an interruption.

FIG. 51 illustrates an escaping operation of an instruction address in a conventional processor at the occurrence of an interruption.

FIG. 51 shows the operation at a time when an interruption occurs at the final stage of instruction 302 in a pipe-line of a conventional processor which executes one of one cycle.

When an interruption occurs, the instruction executed before that time has finished its execution. On the other hand, executions of instruction 302 and instructions 303, 304, 305, 306 and 307, which have started to be executed by advanced processing with pipe-lines, are interrupted. Therein, writing to a resource without any architectural special rule on writing is interrupted.

Further, the instruction which has caused the interruption 302 is escaped so that it can returned from the instruction which has caused the interruption after finishing execution of the interruption processing, the instruction address being switched to a first address of the interruption processing, the execution starting with the first interruption processing. Then, after finishing execution of the interruption processing, the instruction address is switched to the escaped instruction 302 to effect the return.

Further, the delay branch method is, so far, known as a control method for pipe-lines.

The delay branch method is a method where an effective instruction is executed during an empty cycle produced between a branch instruction and an instruction in the branched destination, and the effective instruction is generally called a delay slot. Since the delay branch method is based on a conventional microprocessor which executes one of one cycle, the delay slot is generally fixed to one instruction.

Incidentally, when an interruption occurs in a microprocessor employing the delay branch method, it is necessary that both the address of the instruction which has caused an interruption 302 (hereinafter referred to as the "front") and the address of the instruction being about to be executed next 303 (hereinafter referred to as the "back") are escaped. The reason is that, in a case where the instruction 301 is a branch instruction and the instruction 303 is an instruction in a branch destination, the instruction which has caused the interruption may be a delay slot. However, since the branch of the instruction 301 is finished executing and the address of the instruction 302 is not connected to the address of the in the branch destination 303, the address for the instruction which is about to be executed next 303 is lost when only the address of the instruction 302 is escaped. Therefore, in a microprocessor employing the delay branch method, both the address of the instruction 302 and the address of the instruction in branch the destination 303 are escaped, and when returning from the interruption, both the front address of the instruction 302 and the back address of the instruction 303 are used to effect the return.

Furthermore, so far, there are some cases where a processor has a structure to cause an interruption when a present number of effective instructions are executed in pipe-lines for the purpose of debugging. For example, there is provided a circuit called a recovery counter which causes an interruption, called a recovery counter trap, with an effective instruction to be executed when a setting value becomes negative through successive decrementing for every execution of the effective instruction from the preset value.

An example of the microprocessor will be described in detail blow.

Figure 40:
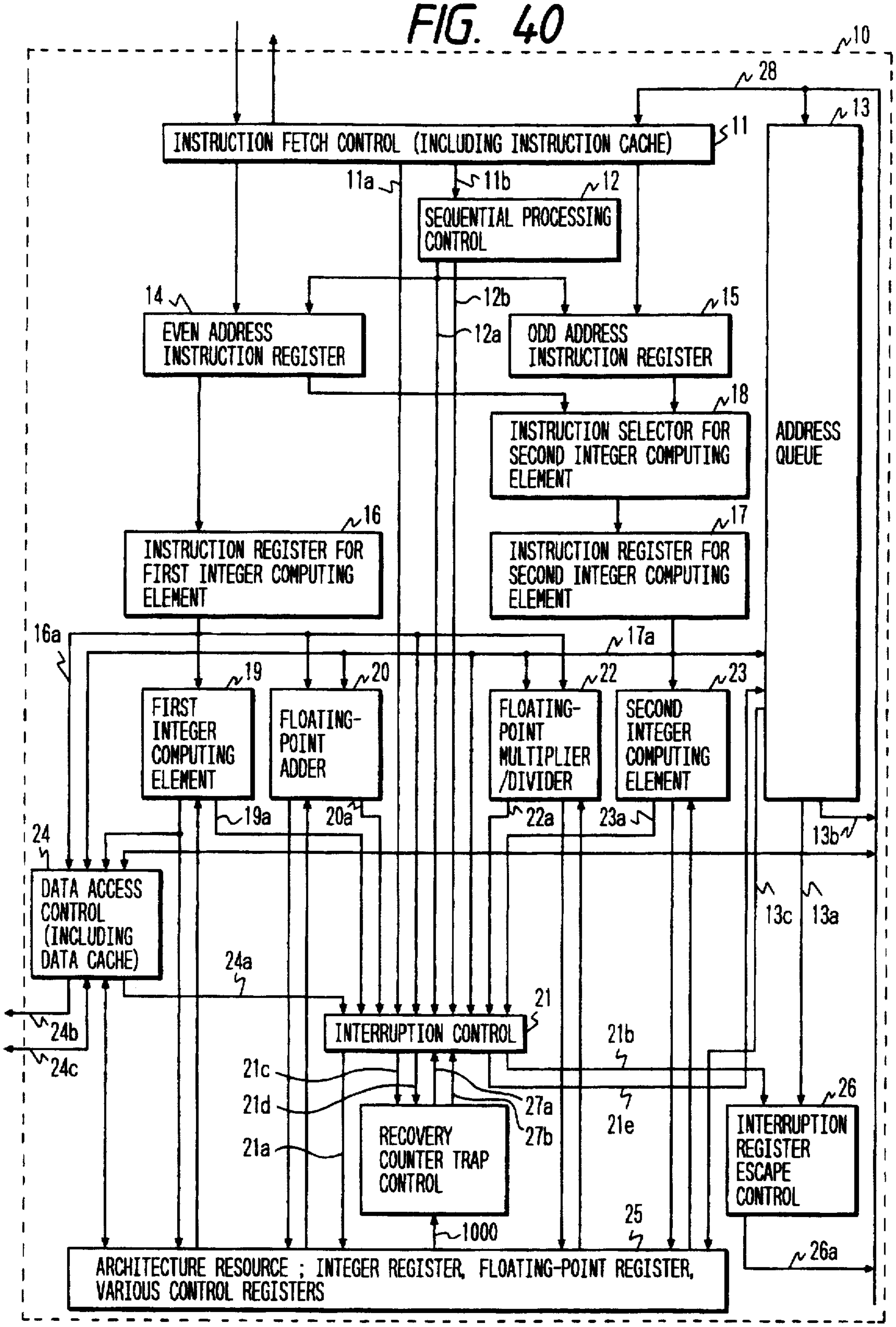
FIG. 40 is a block diagram showing a construction of a processor.

FIG. 40 shows a construction of the microprocessor, which is substantially the same as that shown in FIG. 1.

As shown in the figure, a microprocessor 10 comprises an instruction fetch control 11 including an instruction cache,a sequential stacked job control 12, an address queue 13 producing an instruction address and holding the produced instruction address until finishing the pipe-line processing corresponding to the instruction, an even address instruction register 14, an odd address instruction register 15, an instruction register 16 for a first integer computing element, an instruction register 17 for a second integer computing element, an instruction selector 18 for the second integer computing element, a first integer computing element 19, a floating-point adder 20, an interruption control 21, a floating-point multiplier/divider 22, a second integer computing element 23, a data access control 24 including a data cache, an architecture resource 25 including an integer register, a floating-point register and various kinds of control registers, an interruption register escape control 26, and a recovery counter trap control 27.

Here, the microprocessor in accordance with this example is of an RISC type, and all the instructions are 4 bytes long, while the instruction addresses of which are 32 bits long.

The address queue 13 sequentially feeds instruction addresses into the instruction fetch control 11. The instruction fetch control 11 fetches instruction addresses by 8 bytes from the addresses, the uppermost 29 bits of which agree with the uppermost 29 bits of the fed instruction address. Since the instruction is 4 bytes, this fetch by 8 bytes is equivalent to a parallel fetch of two instructions.

The instruction having a smaller instruction address (hereinafter referred to as an "even address instruction", since the bit positioned at 3 bits from the lowermost is zero) between the two instructions fetched by the instruction fetch control 11 is stored in the even address instruction register 14, and the instruction having a larger instruction address (hereinafter referred to as the "odd address instruction", since the bit positioned at 3 bits from the lowermost is one) between the two instructions is stored in the odd address instruction register 15.

Further, the instruction fetch control 11 judges whether or not the fetched pair of instructions can be parallelly processed, and the result of the judgement is supplied to the sequential processing control 12 by a sequential processing determination signal 11*b*. When the fetched two instructions are a pair capable of being processed in parallel, the sequential processing control 12 transfers the instruction stored in the even address instruction register 14 to the instruction register for first integer computing element 16 by an updated effective signal 12*a*. And, in parallel to this, the sequential processing control transfers the instruction stored in the odd address instruction register 15 to the instruction register for second integer computing element 17 by an updated effective signal 12*a*.

When the instruction stored in the instruction register for first integer computing element 16 is an arithmetic instruction, the instruction is executed with any of the first integer computing element 19, the floating-point adder 20 or the floating-point multiplier/divider 22 depending on the kind of the arithmetic calculation. The execution of the arithmetic instruction is performed with a calculation using the data read out from the architecture resource 25 and with writing of the calculated result in the architecture resource 25. On the other hand, when the instruction stored in the instruction register for second integer computing element 17 is an arithmetic instruction, the instruction is executed with any of the second integer computing element 23, the floating-point adder 20 or the floating-point multiplier/divider 22 depending on the kind of the arithmetic calculation. Further, when the instruction stored in the instruction register 16 for first integer computing element or the instruction register 18 for second integer computing element is a branch instruction, a condition judgement is executed using the first integer computing element 19 or the second integer computing element 23. Depending on the result, an offset address producing an instruction address for a branch destination is transferred to the address queue 13 through signal 16*a* from the instruction register for first integer computing element 16 or through 17*a* from the instruction register for second integer computing element 17. As described later, the address queue 13 produces an instruction address for branch destination using this offset address and also produces a return address 13*c* for the branch instruction to store in the architecture resource 25. Furthermore, when the instruction stored in the instruction register for first integer computing element 16 or the instruction register for second integer computing element 18 is a data access instruction, the instruction is transferred to the data access instruction control 24 to execute data accessing.

Figure 41:
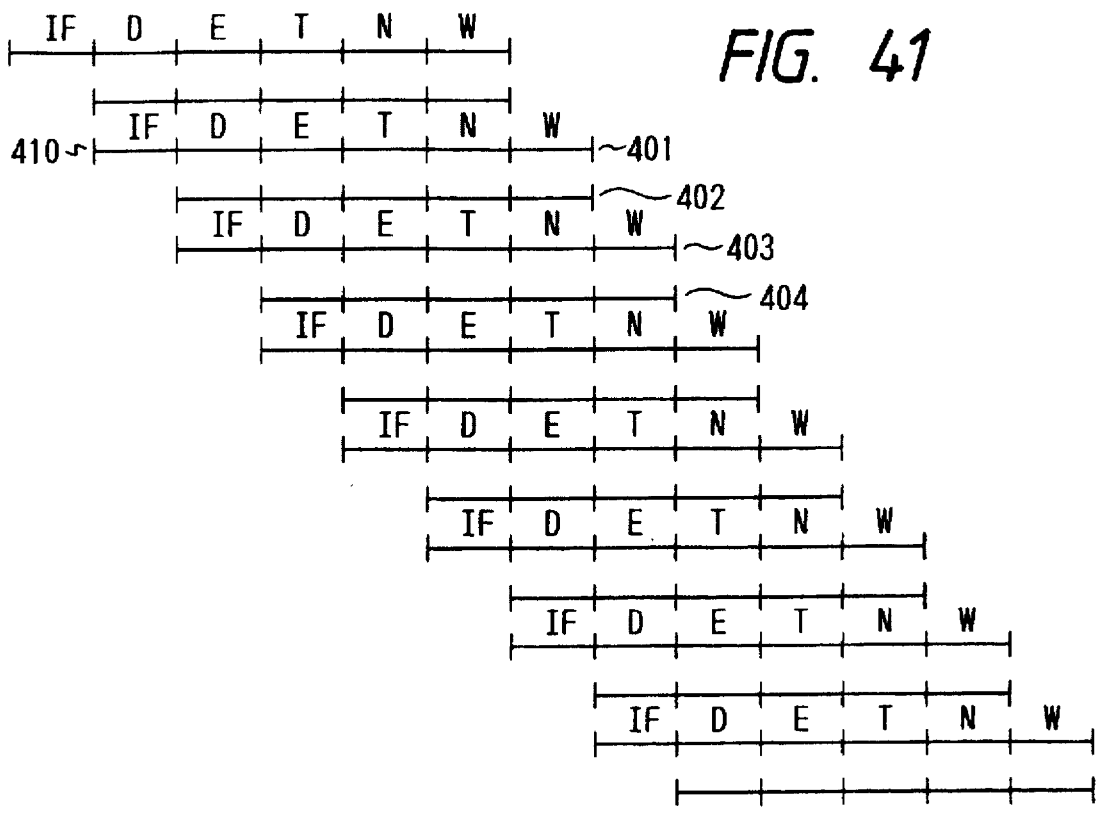
FIG. 41 is a timing chart showing operation of pipe-lines during parallel processing.

FIG. 41 shows pipe-lines when the two instructions fetched in this manner are parallelly processed.

In a pipe-line 410, the one pipe-line branches into an upper pipe-line 401 and a lower pipe-line 402, which indicates that the upper shows a pipe-line for even address instruction and the lower shows a pipe-line for odd address instruction.

On the other hand, when the fetched pair of instructions are not a pair capable of being processed in parallel, the sequential processing control 12 operates such that an even address instruction and an odd address instruction are sequentially processed by the updating effective signal 12*a*.

A pair of fetched instructions which are incapable of being processed in parallel may be, for example, a pair of data access instructions, a pair of floating-point adding instructions, a pair of floating-point multiplying/dividing instructions and so on. The reason is that the processor shown in FIG. 40 has a data access instruction control 24 which executes a data access instruction with only one of one cycle and has one floating-point adder 20 and one floating-point multiplier/divider 22, respectively. Further, there is a case where a pair of integer instructions are incapable of being processed in parallel.

The sequential processing control 12 indicating incapability of parallel processing of the fetched pair of instructions from the instruction fetch control negates the updated effective signal 12*a* from the odd address instruction register 15 by the sequential processing determination signal 11*b*, thereby leaving the odd address of the odd address instruction register 15, controlling the selector for second integer computing element 18, and transferring the even address instruction of the even address instruction register 14 to the register 17 for second integer computing element. By the negated effective signal 12*b*, the interruption control 21 is informed of negation of the odd address of this cycle.

In the next cycle, the sequential processing control 12 transfers the instruction of the odd address instruction register 15 to the register for second integer computing element 17, informing the negation of the even address of this cycle by an instruction negation signal 12*b* to the interruption control 21. The instruction stored in the register for second integer computing element 17 is executed depending on the kind of the of the same manner as described above. This embodiment, as described above, employs a theory in which when a sequential processing of two instructions fetched at one time is executed, the selector for second integer computing element 18 stores instructions into only the instruction register for second integer computing element 17 in the order of the even address instruction followed by the odd address instruction.

Figure 42:
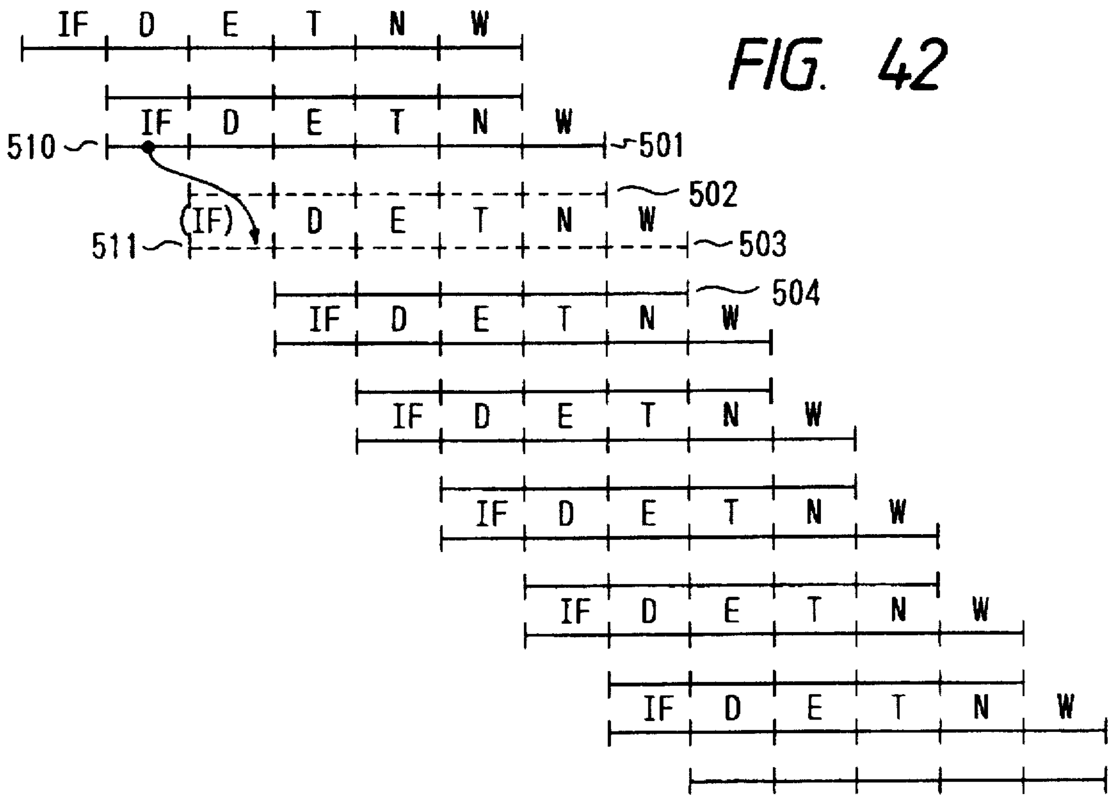
FIG. 42 is a timing chart showing operation of pipe-lines during sequential processing.

FIG. 42 shows pipe-lines of a sequential processing of this kind.

In pipe-line 510, an even address instruction 501 is effective and is executed, but an odd address instruction 502 is ineffective. In the next cycle in 511, an even address instruction 503 is ineffective, but an odd address instruction 504 is effective and is executed.

And, the instruction fetch control 11 informs the interruption control 21 of the negation of the even address instruction in this cycle, which is one of the two instructions fetched in this cycle 3 by the instruction negation signal 12*b* through the sequential processing control 12, when the instruction given by the address queue 13 is an odd instruction address (the third bit from the lowermost of instruction address is address of 1).

In a processor having such a construction, when an interruption has occurred, the operation is as follows.

Figure 43:
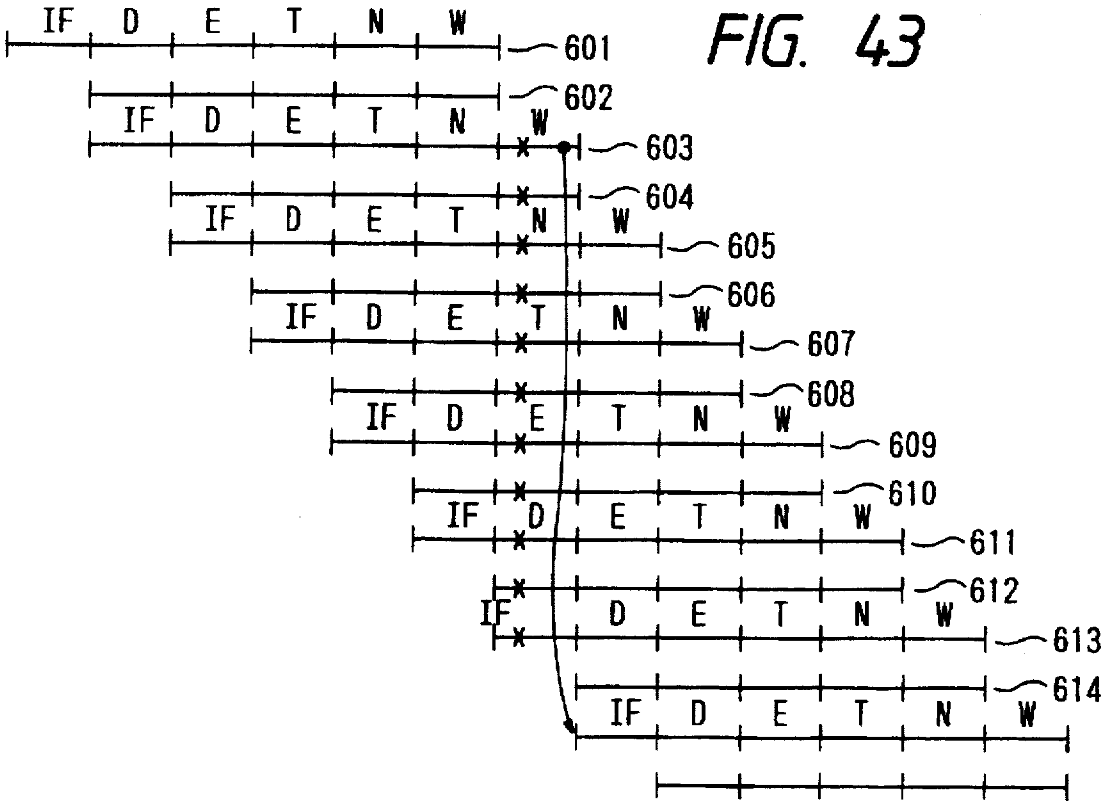
FIG. 43 is a timing chart showing operation of pipe-lines at occurrence of an interruption during parallel processing.

FIG. 43 shows pipe-lines in a case where an interruption occurs in an execution of an even address instruction during parallel processing.

In this figure, the numeral 603 indicates an instruction which has caused an interruption. In this situation, even when an interruption occurs at the same time for an odd address instruction, the interruption in the execution of an even address instruction is received with priority. And, the odd address instruction 604 being executed by parallelly is negated as well as instructions 605~614 in the following cycles.

Figure 44:
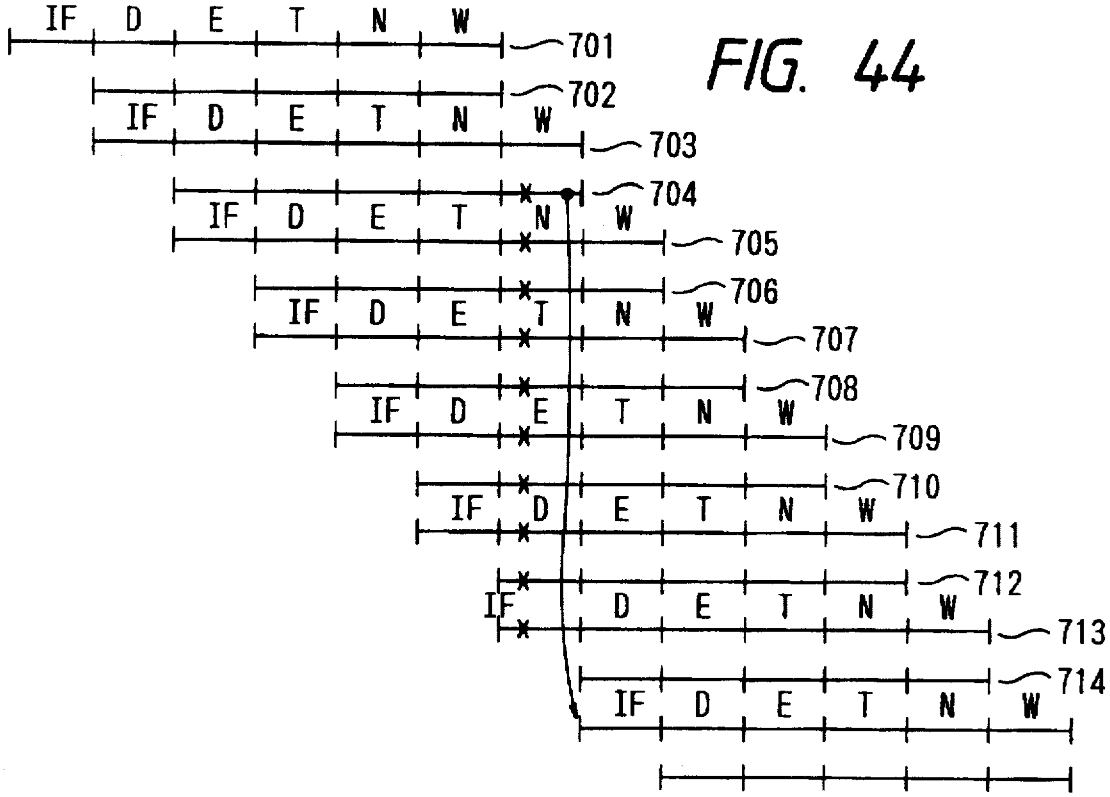
FIG. 44 is a timing chart showing operation of pipe-lines at occurrence of an interruption during sequential processing.

FIG. 44 shows pipe-lines in a case where an interruption does not occur for an even address instruction and an interruption occurs for only an odd address instruction during parallel processing.

In the figure, the numeral 704 indicates an instruction which has caused an interruption.

In this case, the even address instruction 703 being parallelly executed finishes its execution, and the odd address instruction 704 having caused an interruption and instructions 705~714 in the following cycles are negated.

The reason why the even address instruction 703 executed by parallelly is allowed to finish its execution is to provide the same operating function as and compatibility with the conventional processor executing one of one cycle, wherein an odd address instruction is always executed in a later time cycle than the cycle of the even address instruction executed parallelly therewith, and the even address instruction finishes its execution even when an interruption occurs for the odd address instruction.

Incidentally, it is the interruption control 21 in FIG. 40 what controls occurrence of an interruption in the manner described above.

Figure 45:
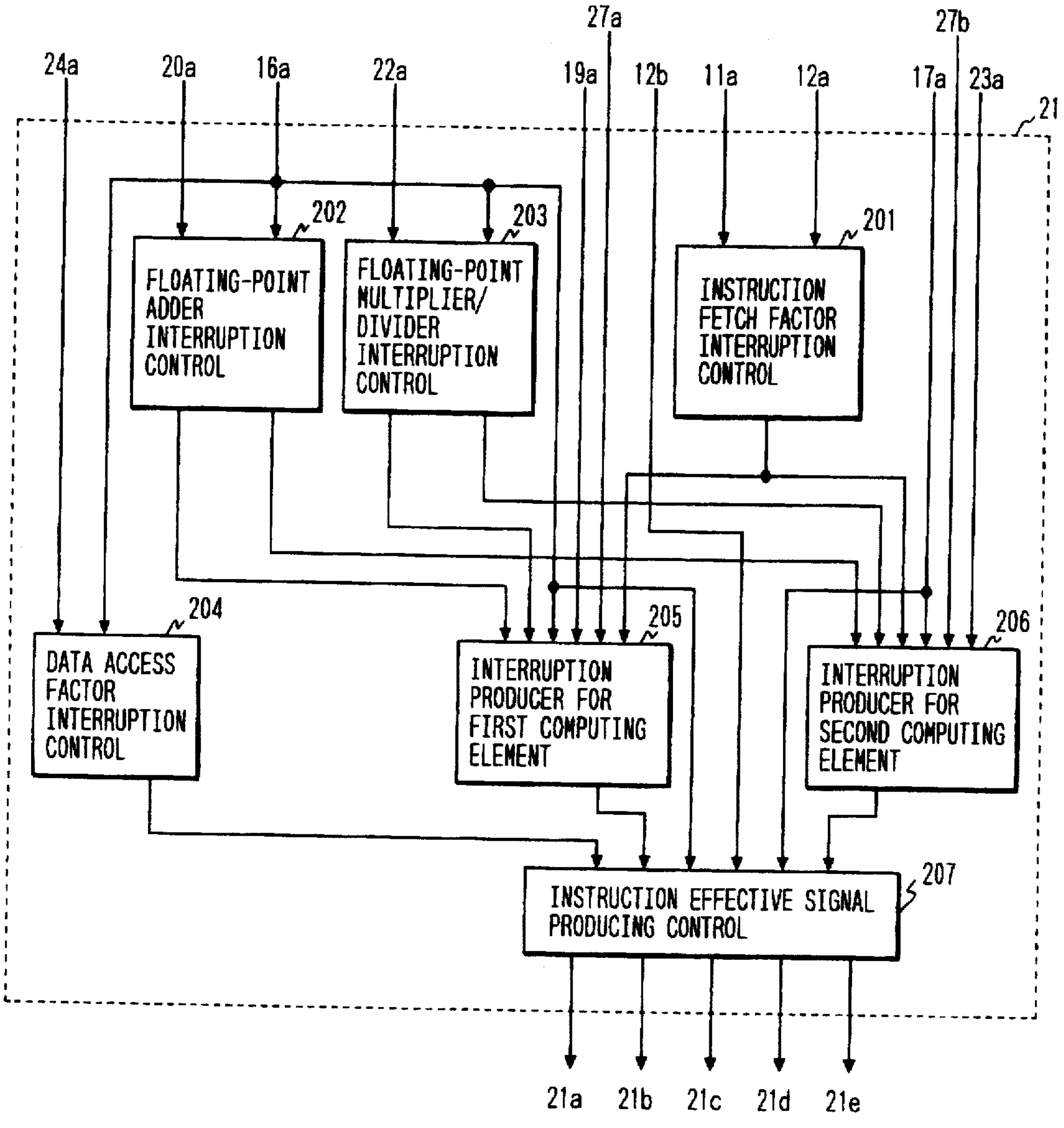
FIG. 45 is a block diagram showing a construction of an interruption control.

FIG. 45 shows a construction of an interruption control.

As shown in the figure, the interruption control 111 comprises an instruction fetch factor interruption control 201, a floating-point adder interruption control 202, a floating-point multiplier/divider interruption control 203, a data access factor interruption control 204, an interruption producer for first integer computing element 205, an interruption producer for second integer computing element 206 and an instruction effective signal producing control 207.

When the data access factor interruption control 204 is informed of the occurrence of an interruption factor in the data access control 24 by an interruption signal 24*a*, the data access factor interruption control judges for which the instruction interruption occurs, the instruction in the instruction register for first integer computing element 16 or the of the instruction register for second integer computing element 17, by using the instruction code from the instruction register for first integer computing element 16, and supplies the result to the instruction effective signal producing control 207. Here, as described above, a plurality of data access instructions are not executed by parallelly at a time.

Similarly, when the floating-point adder interruption control 202 is informed of the occurrence of an interruption factor in the floating-point adder 20 by an interruption signal 20*a*, the floating-point adder interruption control judges for which instruction the interruption occurs, the instruction in the instruction register for first integer computing element 16 or the of the instruction register for second integer computing element 17, by using the instruction code from the instruction register for first integer computing element 16. When the interruption occurs for the instruction in the register for first integer computing element 16, the floating-point adder interruption control outputs an interruption signal to the interruption producer for first computing element 205. When the interruption occurs for the instruction in the register for second integer computing element 17, the floating-point adder interruption control outputs an interruption signal to the interruption producer for second computing element 206. Similarly, when the floating-point multiplier/divider interruption control 203 is informed of occurrence of an interruption factor in the floating-point multiplier/divider 22 by an interruption signal 22*a*, the floating-point multiplier/divider interruption control judges for which instruction the interruption occurs, the instruction in the instruction register for first integer computing element 16 or the of the instruction register for second integer computing element 17, by using the instruction code from the instruction register for first integer computing element 16. When the interruption occurs for the instruction in the register for first integer computing element 16, the floating-point multiplier/divider interruption control outputs an interruption signal to the interruption producer for first computing element 205. When the interruption occurs for the instruction in the register for second integer parallelly 17, the floating-point multiplier/divider interruption control outputs an interruption signal to the interruption producer for second computing element 206. Here, as described above, neither a plurality of floating-point adding instructions nor a plurality of floating-point multiplying/dividing instructions are executed by parallelly at a time.

The instruction fetch factor interruption control 201 is informed of the occurrence of an interruption factor caused by an instruction fetch in the instruction fetch control 11 by an interruption signal 11*a*. The interruption factor may be caused by an instruction fetch, such as an instruction TLB miss, a violation of memory access right by an instruction fetch, a parity error which has occurred in an instruction cache or an instruction TLB and so on. Therein, in the processor here, since the instruction fetch control 11 fetches two instructions per one fetch at a time, the interruption of the instruction fetch factor must produce an interruption against both of the two instructions fetched at the same time.

Therefore, when the instruction fetch factor interruption control 201 is informed of the occurrence of an interruption factor caused by an instruction fetch in the instruction fetch control 11 by an interruption signal 11*a*, the instruction fetch factor interruption control judges whether or not the two instructions causing interruption of the instruction fetch factor are capable of being processed in parallel based on the value of an updated effective signal 12*a* from the sequential processing control 12. When they are capable of such parallel processing, the instruction fetch factor interruption control outputs the interruption signal to both of the first integer computing element interruption control 206 and the second integer computing element interruption control 207. And, when the two instructions causing interruption of the instruction fetch factor are sequentially processed, the instruction fetch factor interruption control outputs an interruption signal to the second integer computing element interruption control 207 and leaves the interruption factor, until one cycle later, for outputting the interruption signal once more to the second integer computing element interruption control 207.

The interruption producer for first computing element outputs an interruption signal to the instruction effective signal producing control when it is informed of the occurrence of an interruption factor in the first integer computing element 19 by an interruption signal 19*a*, when it receives an interruption signal from the instruction fetch factor interruption control 201, when it receives an interruption signal from the floating-point computing element interruption control 202, or when it receives an interruption signal 27*a* from the recovery counter trap control 27. Similarly, the interruption control for second computing element 206 outputs an interruption signal to the instruction effective signal producing control 207 when it is informed of occurrence of an interruption factor in the second integer computing element 23 by an interruption signal 23*a*, when it receives an interruption signal from the instruction fetch factor interruption control 201, when it receives an interruption signal from the floating-point computing element interruption control 202 or from the floating-point multiplier/divider interruption control 203, or when it receives an interruption signal 27*b* from the recovery counter trap control 27. And, when the instruction effective signal producing control 207 receives an interruption signal, the instruction effective signal producing control judges for which instruction the interruption occurs, the instruction register for first integer computing element 16 or the instruction register for second integer computing element 17 by using the instruction code from the instruction register for first integer computing element 106, and supplies the result to the instruction effective signal producing control 207.

The instruction effective signal producing control 207 receives the information from the data access factor interruption control 204, the interruption signal from the interruption producer for first computing element 205, the interruption signals 27*a* and 27*b* from the recovery counter trap control 27, the interruption signal from the interruption producer for second computing element and so on. By using these signals and the instruction negating signal 11*a* from the sequential processing control 12, which indicates negation of one of the two instructions fetched together during a sequential processing, the instruction effective signal producing control judges by which the interruption is caused, the data access factor, the interruption signal from the recovery counter trap control 27 or the interruption factors from the various computing elements, and judges for which instruction the interruption occurs, the even address instruction or the odd address instruction, and judges for which register the interruption occurs, the instruction register for first integer computing element 16 or the instruction register for second integer computing element 17. Then, the instruction effective signal producing control controls the architecture resource 25 according to the results of the each of these judgements, inhibiting writing to the architecture resource 25 through said instructions, negating instructions after the instruction involving the interruption caused by the signal 21*a* as shown in FIG. 43 and FIG. 44. The architecture resource 25 is controlled so as to negate the instruction which is indicated as being negated from the sequential processing control. With the signal 21*b*, the instruction effective signal producing control informs the interruption register escape control 26 of occurrence of an interruption, for which instruction the interruption occurs, the even address instruction or the odd address instruction, and whether the even address instruction and the odd address instruction are effective or ineffective. Further, the instruction effective signal producing control outputs an interruption signal corresponding to the judged interruption factor to the address queue 13, and has the address queue produce an instruction address of the instruction for interruption processing. Furthermore, the instruction effective signal producing control 207 produces a signal 21*c* showing whether the even address instruction is effective or ineffective and a signal 21*d* showing whether the odd address instruction is effective or ineffective by using the instruction negating signal 11*a* from the sequential processing control 12, and outputs the results to the recovery counter trap control In such a construction, the interruption register escape control 26 in FIG. 40 may be also constructed as follows.

That is a construction which can produce at a time instruction addresses for two instructions to be fetched from the address queue 13 at the same time.

Figure 50:
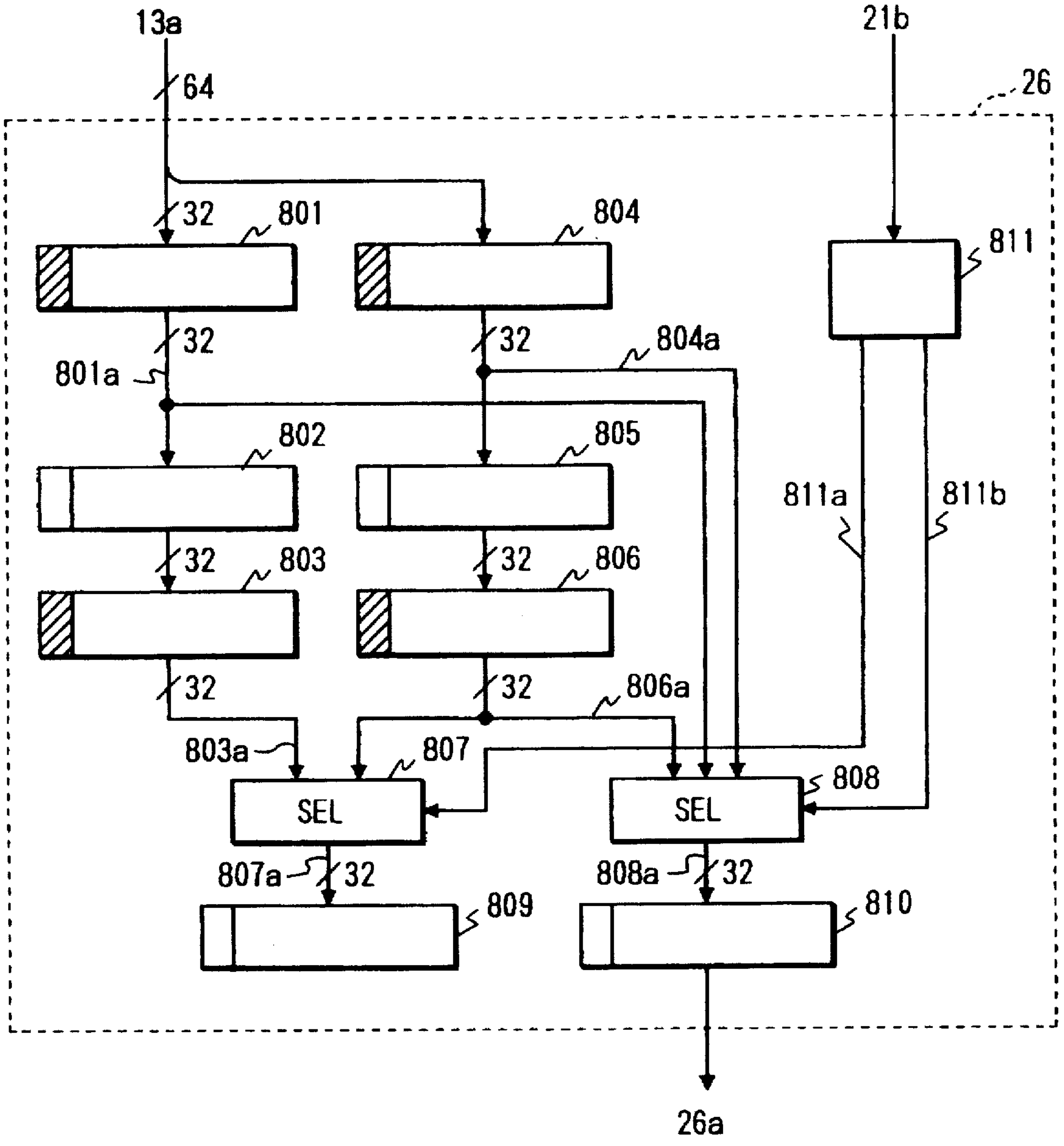
FIG. 50 is a block diagram showing another construction of an interruption register escape control.

Next, the interruption register escape control 26 is constructed as shown in FIG. 50.

The interruption register escape control 216 comprises temporary registers 801, 802, 803 storing the instruction addresses of the even address instructions among the instruction addresses produced by the address queue 13 at one time, temporary registers 804, 805, 806 storing the instruction addresses of the odd address instructions among the instruction addresses produced by the address queue 13 at one time, a selector for interruption occurrence instruction address escape 807, a selector for instruction address escape 808 for selecting the instruction to be executed next to the instruction which has caused an interruption, an interruption occurrence instruction address escape register 809, an instruction address escape register 810 for storing the instruction to be executed next to the instruction which has caused an interruption, and an interruption escape control 811.

The interruption escape control 26, which is informed of occurrence of an interruption, for which instruction the interruption occurs, the even address instruction or the odd address instruction, and whether the even address instruction and the odd address instruction are effective or ineffective, by the signal 21*b* from the interruption control 21, controls the selector 807 and the selector 808 as shown in Table 1. The front and the back addresses of which are correctly escaped to the register 809 for escaping the address of the instruction which has caused an interruption and the register 810 for escaping the address of the effective instruction next to the instruction which has caused an interruption. Here, Table 1 shows a case, as an example, where an interruption occurs either in 401 or in 402 in FIG. 4.

TABLE 1

| 401 | 402 | 403 | 404 | 807a | 808a |
|---|---|---|---|---|---|
| interrupt | effective | — | — | 803a | 806a |
| interrupt | in-effective | effective | — | 803a | 801a |
| interrupt | in-effective | in-effective | effective | 803a | 804a |
| — | interrupt | effective | — | 806a | 801a |
| — | interrupt | in-effective | effective | 806a | 804a |

That is, as a example, when an interruption occurs at 401 and 402 in an effective instruction, the selectors 807 and 808 are controlled so as to output a signal 803*a* to lines 807*a* and to output a signal 806*a* to the lines 808*a*.

However, in this construction, it is necessary that the address of the even address instruction and the address of the odd address instruction are independently stored in the address queue 13 and the interruption register escape control 26, respectively, which makes the register volume very large.

Therefore, in this embodiment, the address queue 13 and the interruption register escape control 26 are constructed as follows.

Firstly, the address queue 13 will be explained.

Figure 46:
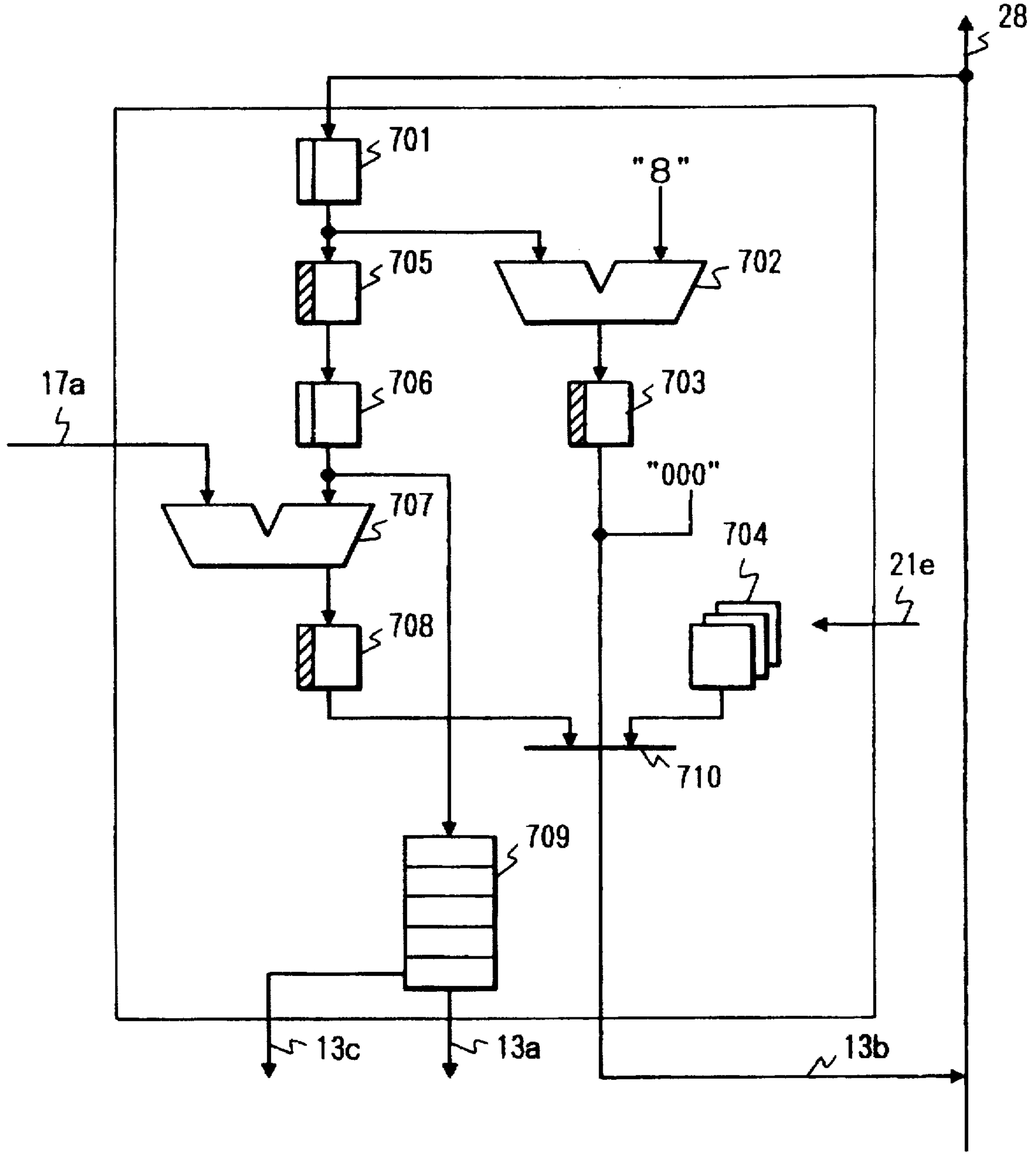
FIG. 46 is a block diagram showing a construction of an address queue.

FIG. 46 shows the construction of the address queue 13.

As shown in the figure, the address queue 13 has an address counter comprising registers 701 and 703 and an computing element 702, a set of registers 704 storing instruction addresses of the interruption processing instructions, a branch destination address producing circuit comprising registers 701, 705, 708 and an computing element 707, which produces the branch destination address by adding the offset address to the output of the address counter, a queue comprising registers 701, 705, 706 and a set of registers 709, which stores the instruction address having been input to the instruction fetch control 11, and a selector 710 selecting one from the output of the address counter, the output of the branch destination address and the instruction address output of the interruption processing as the next instruction address.

Therein, the registers 701, 703, 705, 706 and the set of registers 709 store only the uppermost 29 bits of the instruction address of 32 bits. The adder 702 adds one to the lowermost bit (the 29th bit from the uppermost) of the register 701, and adds the lowermost 3 bits "000" to the output of the register 703 to make the output address, from the address counter to the instruction fetch control 11, 32 bits.

Further, adder 707 adds 3 bits of 000 to the lowermost portion of the output of the register 706 to add it to the offset address as an address of 32 bits. It is assumed that the offset address to obtain the branch destination address has been processed in advance such that even when the branch instruction is an odd address instruction, the instruction address of the even address instruction fetched at the same time may become an offset obtained as a standard.

Incidentally, each of the registers 701, 705, 706, 703, 708 and each of the registers in the set of registers 709 in the address queue 12 are operated with a two phase clock. That is, instruction addresses of which are latched twice in one machine cycle.

In a normal operation, an instruction address, successively incrimented by 8 by an adder in the address counter, is selected by the selector 710 to be output to the instruction fetch control 101 as an instruction address. When the set of registers 704 storing instruction addresses of the interruption processing instructions receives an interruption signal 111*e*, the output from the set of resisters 704 is selected by the selector 710 to be output as an instruction address. When the set of registers 704 storing instruction addresses of the interruption processing instructions receives an offset address producing a branch destination instruction address, the computing element 707 adds the offset address to the instruction address of two advanced cycles obtained through the resisters 705 and 706 to produce a branch destination instruction address. And, the selector selects the branch destination instruction address to output as an instruction address.

The queue storing the output from the address counter, which is composed of the registers 701, 705 and 706, and the set of resisters 709, stores the instruction addresses which have been selected by the selector 701 to be given to the instruction fetch control, and the number of which corresponds to the number of the stages of the pipe-lines. When an interruption occurs, the interruption register escape control 26 receives and stores the instruction address signals on said front and said back output from the queue through a line 13*a*. When a branch destination address is produced, the output from the queue on line 13*c* is stored in the architecture resource 25 as a branch return address.

Next, the interruption register escape control 26 will be explained.

Figure 47:
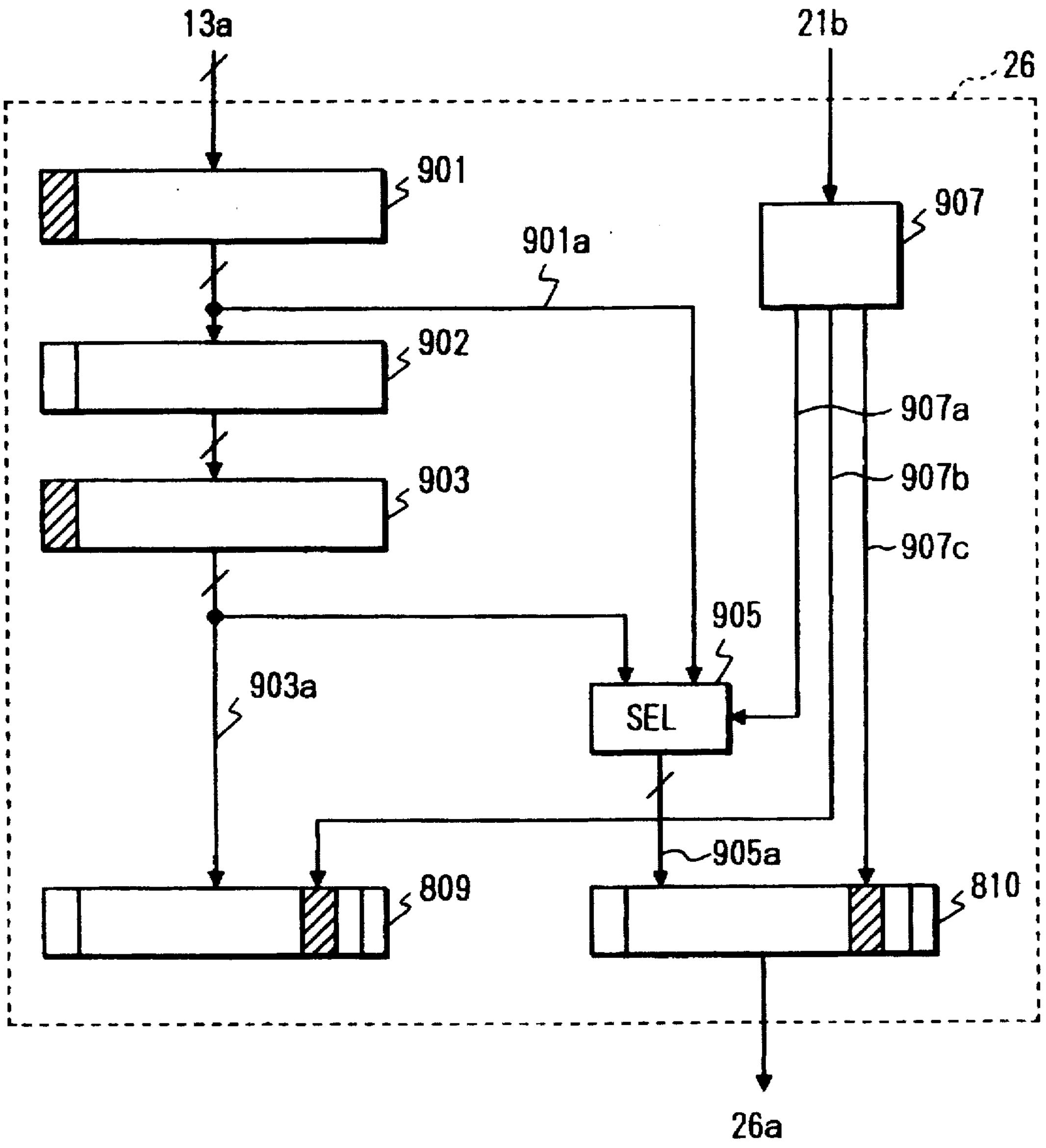
FIG. 47 is a block diagram showing a construction of an interruption register escape control.

FIG. 47 shows a structure of the interruption register escape control 26.

The interruption register escape control 26, as shown in the figure, comprises temporary registers 901, 902 and 903 storing outputs from the set of registers 709 of the address queue 13, a selector for instruction address (back) escape 905 for selecting the instruction which is about to be executed next to the instruction which has caused an interruption, an escape register 809 for an address of the instruction which has caused an interruption (front), an instruction address escape register 810 for storing the instruction which is about to be executed next to the instruction which has caused an interruption, and an interruption escape control 907.

The registers 901, 902 and 903 are registers having a capacity of 29 bits. The registers 809 and 810 are registers having a capacity of 32 bits, of which the lowermost two bits are fixed at the value 00 and the third bit from the lowermost is controlled by the interruption escape control. And, each of the registers operates synchronously with said two phase clock.

Incidentally, when the interruption escape control 907 is informed by the signal 21*b* of occurrence of an interruption from the interruption control 21, for which instruction the interruption occurs, an even address instruction or an odd address instruction, and whether the even address instruction and the odd address instruction are effective or ineffective, the interruption escape control controls the selector 905 and the third bits from the lowermost of the escape addresses 907*b* and 907*c*, and makes the front and the back addresses correctly escape to the register 809 for escaping the address of the instruction which has caused an interruption and the register 810 for escaping the address of the effective instruction next to the instruction which has caused an interruption.

TABLE 2

| 401 | 402 | 403 | 404 | 905a | 907b | 907c |
|---|---|---|---|---|---|---|
| interrupt | effective | — | — | 903a | 0 | 1 |
| interrupt | in-effective | effective | — | 901a | 0 | 0 |
| interrupt | in-effective | in-effective | effective | 901a | 0 | 1 |
| — | interrupt | effective | — | 901a | 1 | 0 |
| — | interrupt | in-effective | effective | 901a | 1 | 1 |

When an interruption occurs, for example, at the instruction 401 in FIG. 41 and 402 is an effective instruction, the selector 803 is controlled such that the selector 905 selects lines 903*a*, and the line 907*b* is set to 0, while the line 907*c* is set to 1.

Then, after finishing the interruption processing, the instruction addresses escaping in the registers 809 and 810 are sequentially transferred to the instruction fetch control 11. Therein, when the instruction address of the even address instruction is stored in the register 809 and the instruction address of the odd address instruction escapes in the register 810, the instruction fetch control 11 executes the odd address instruction fetched with an instruction address received from the register 810 in the cycle next to the cycle being processed in parallel the two fetched instructions by using the uppermost 29 bits of the address received from the register 809, which is equivalent to executing the instruction the instruction address escaping to the register 810.

Therefore, in returning from an interruption, when the instruction address stored in the register 809 is an instruction address of an even address instruction, the architecture resource 25 is controlled such that the odd address instruction fetched together with said even address instruction may be negated.

The recovery counter trap control 27 will be explained next.

Figure 48:
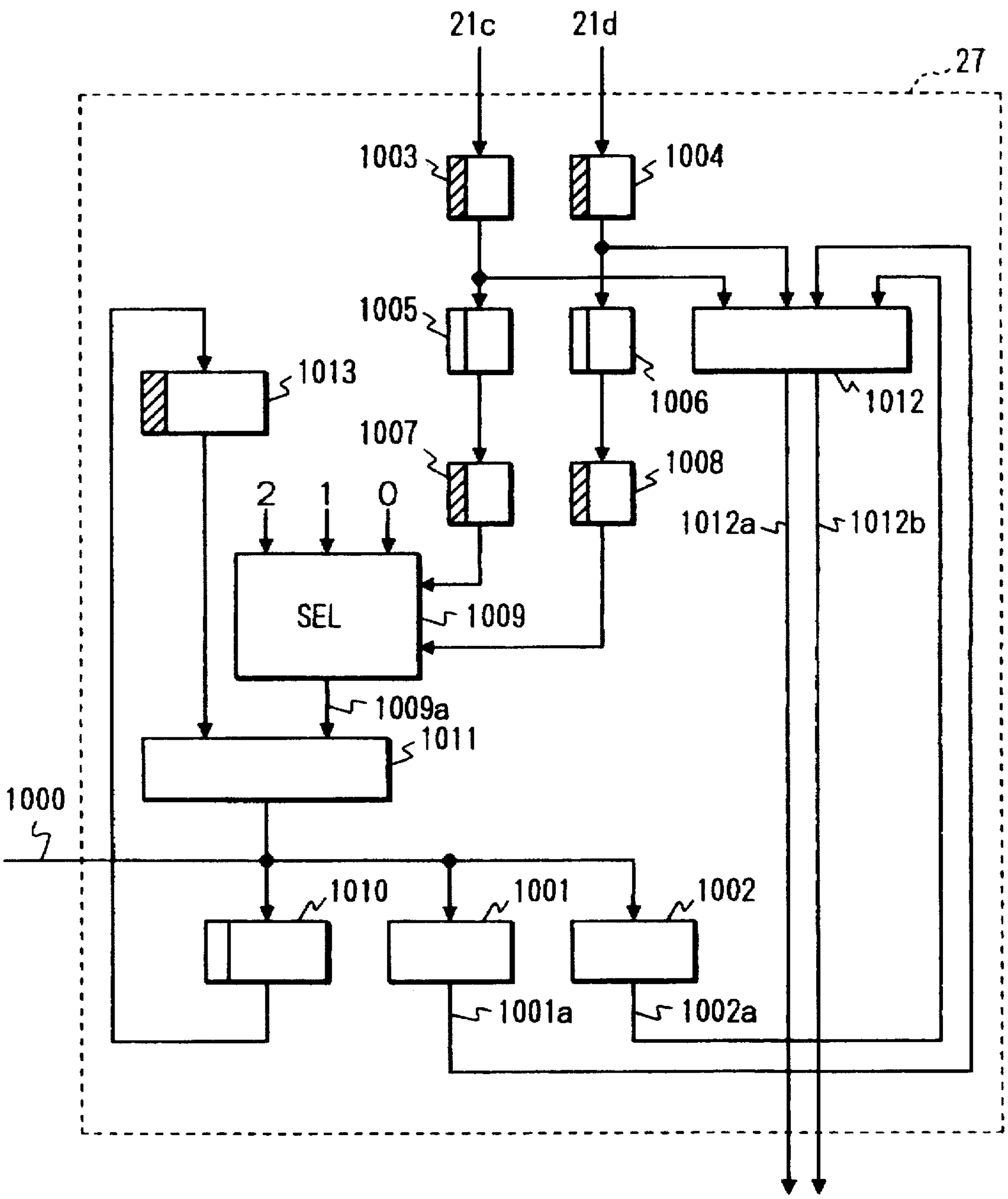
FIG. 48 is a block diagram showing a first construction of a recovery counter trap control.

FIG. 48 shows a construction of the recovery counter trap control 27.

As shown in the figure, the recovery counter trap control 27 comprises delay latches 1003, 1005 and 1007 for the even address instruction effective signal 21*c*, delay latches 1004, 1006 and 1008 for the odd address instruction effective signal 21*d*, a selector 1009, a recovery counter 1010, a recovery counter subtractor 1011, a recovery counter interruption detector 1012, a delay latch for recovery counter 1013, comparators 1001 and 1002.

Firstly, a preset value is read out from the architecture resource to set it to the recovery counter 1010. The signal 21*c* showing effectiveness or ineffectiveness of the even address instruction and the signal 21*d* showing effectiveness or ineffectiveness of the odd address instruction are stored in the delay latches 1003 and 1004 respectively. And, the value in the delay latch 1003 is successively transferred to the latches 1005 and 1007, and the value in the delay latch 1004 is successively transferred to the latches 1006 and 1008. The selector 1009 by using the values from the delay latch 1007 and 1008 outputs the value 2 when two instructions are parallelly processed in the cycle corresponding to the values from the delay latch, while outputting the value 1 when the pair of an effective instruction and an ineffective instruction are executed, such as for sequential processing, and outputting the value 0 when both instructions are ineffective. The subtractor 1011 subtracts the value output from the selector 1009 from the value received from the delay latch 1013 to set the result in the recovery counter 1010. The value in the recovery counter 1010 is transferred to the delay latch 1013. The comparator 1001 outputs a zero detection signal 1001*a* when the value in the recovery counter is 0. The comparator 1002 outputs a −1 detection signal when the value in the recovery counter is −1. The interruption detector 1012 produces the recovery counter trap of even address instruction 1012*a* and the recovery counter trap of odd address instruction 1012*b* according to Table 3.

TABLE 3

| 1001a | 1002a | 1003a | 1004a | 1012a | 1012b |
|---|---|---|---|---|---|
| 1 | 0 | 1 | 1 | 0 | 1 |
| 1 | 0 | 1 | 0 | 0 | 0 |
| 1 | 0 | 0 | 1 | 0 | 0 |
| 1 | 0 | 0 | 0 | 0 | 0 |
| 0 | 1 | 1 | 1 | 1 | 1 |
| 0 | 1 | 1 | 0 | 1 | 0 |
| 0 | 1 | 0 | 1 | 0 | 1 |
| 0 | 1 | 0 | 0 | 0 | 0 |
| 0 | 0 | — | — | 0 | 0 |

Table 3

For example, when the output 1001*a* is 1, the output 1002*a* is 0, the value 1003*a* is 1 and the value 1004*a* is 1, the line 1012*a* and the line 1012*b* are 0 and 1, respectively, since the two instructions flow under a condition that the recovery counter is 0, so that it is necessary that the recovery interruption is caused not by an odd address instruction, but by an even address instruction. Then, the judgement is executed in which the instruction corresponding to the recovery trap value of 1 is stored, the instruction register for first computing element 16 or the instruction register for second computing element 17. When it is the instruction stored in the instruction register for first computing element 16, an interruption signal 27*a* is output to the interruption control 21. When it is the instruction stored in the instruction register for second computing element 17, an interruption signal 27*b* is output to the interruption control 21. Therein, such judgement and production of an interruption signal may be executed with the interruption detector 1012.

However, when a construction as shown in FIG. 47 is employed, it is difficult to increase the operating frequency since the number of theoretical stages in the path from the delay latches 1007 and 1008 to the interruption control 21 is large, that is as a result of the subtractors 1009, the 0 and −1 detectors 1001 and 1002, and the interruption detector 1012.

Figure 49:
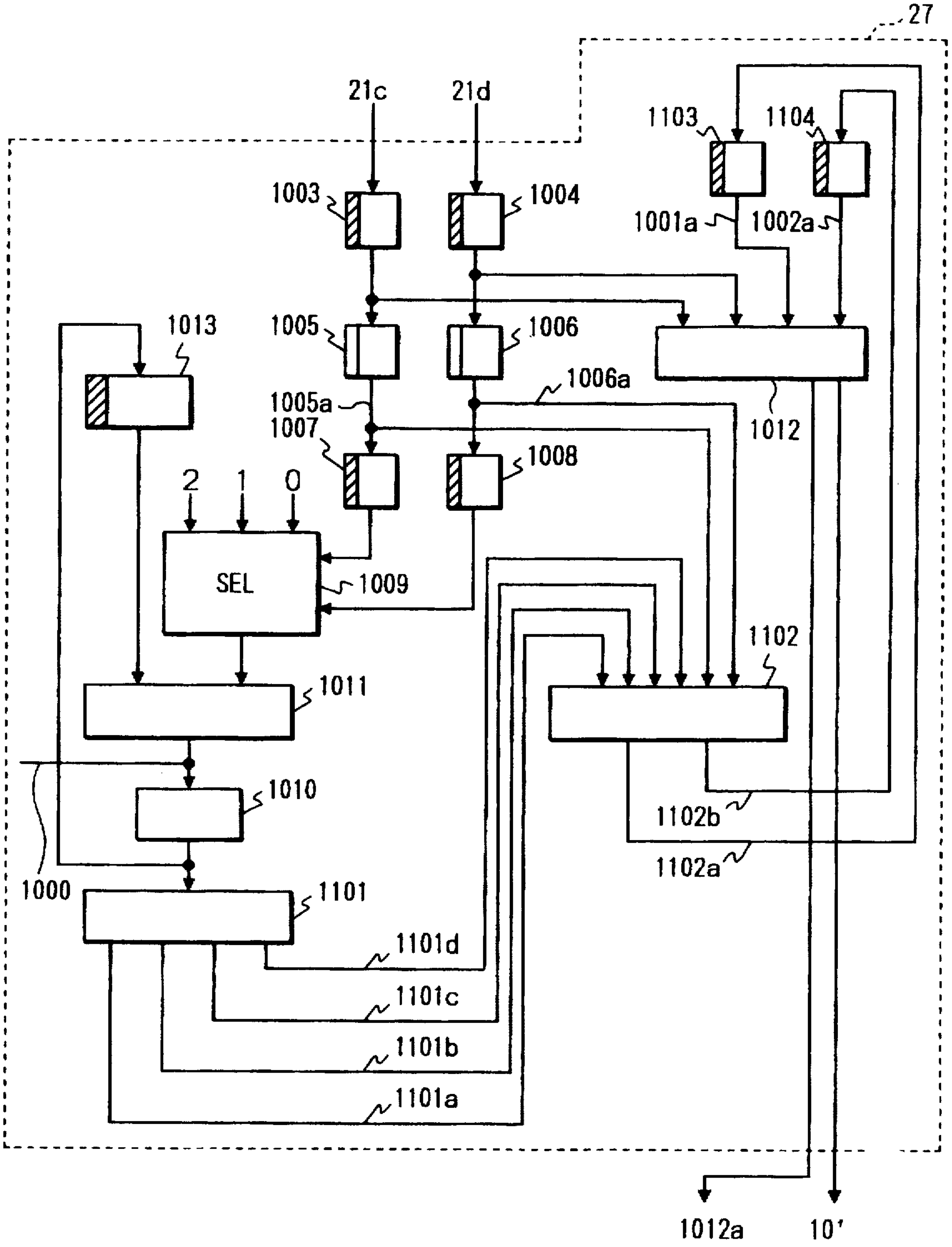
FIG. 49 is a block diagram showing a first construction of a recovery counter trap control.

Therefore, it is desirable that the recovery counter is constructed as shown in FIG. 49.

As shown in FIG. 49, the recovery counter control 27 comprises delay latches 1003, 1005 and 1007 for the even address instruction effective signal 21*c*, delay latches 1004, 1006 and 1008 for the odd address instruction effective signal 21*d*, a selector 1009, a recovery counter 1010, a recovery counter subtractor 1011, a recovery counter interruption detector 1012,a delay latch of recovery counter 1013, a recovery counter 2,1,0,−1 detector 1101, a recovery counter interruption forecaster 1102, a recovery counter 0 forecasting signal latch 1103, and a recovery counter −1 forecasting signal latch 1104. Delay latches 1003, 1005 and

1007 for the even address instruction effective signal 21*c*, delay latches 1004, 1006 and 1008 for the odd address instruction effective signal 21*d*, a selector 1009, a recovery counter 1010, a recovery counter subtractor 1011, a recovery counter interruption detector 1012, a delay latch for recovery counter 1013 are the same parts as the parts having the same numerals in FIG. 48 and perform the same operations as those of the first recovery counter trap control in FIG. 48.

The detector 1101 detects when the value of the recovery counter 1010 is 2, 1, 0 or −1, and outputs a corresponding detecting signal 1101*a*, 1101*b*, 1101*c* or 1101*d*, respectively.

The interruption occurrence forecaster 1102 operates according to Table 4.

TABLE 4

| 1101a | 1101b | 1101c | 1101d | 1105a | 1106a | 1102a | 1102b |
|---|---|---|---|---|---|---|---|
| 1 | 0 | 0 | 0 | 1 | 1 | 1 | 0 |
| 1 | 0 | 0 | 0 | 1 | 0 | 0 | 0 |
| 1 | 0 | 0 | 0 | 0 | 1 | 0 | 0 |
| 1 | 0 | 0 | 0 | 0 | 0 | 0 | 0 |
| 0 | 1 | 0 | 0 | 1 | 1 | 0 | 1 |
| 0 | 1 | 0 | 0 | 1 | 0 | 1 | 0 |
| 0 | 1 | 0 | 0 | 0 | 1 | 1 | 0 |
| 0 | 1 | 0 | 0 | 0 | 0 | 0 | 0 |
| 0 | 0 | 1 | 0 | 1 | 1 | 0 | 0 |
| 0 | 0 | 1 | 0 | 1 | 0 | 0 | 1 |
| 0 | 0 | 1 | 0 | 0 | 1 | 0 | 1 |
| 0 | 0 | 1 | 0 | 0 | 0 | 1 | 0 |
| 0 | 0 | 0 | 1 | 1 | 1 | 0 | 0 |
| 0 | 0 | 0 | 1 | 1 | 0 | 0 | 0 |
| 0 | 0 | 0 | 1 | 0 | 1 | 0 | 0 |
| 0 | 0 | 0 | 1 | 0 | 0 | 0 | 1 |
| 0 | 0 | 0 | 0 | — | — | 0 | 0 |

For example, when the line 1101*a* is 1, the line 1101*b* is 0, the line 1101*c* is 0, the line 1101*d* is 0, the line 1005*a* is 1 and the line 1006*a* is 1, it is known that the recovery counter 1010 becomes 0 in the next cycle since two instructions are flowing when the recovery counter is 2. Therein, the 0 detection signal 1102*a* is determined as 1 earlier by one of the processors which fetch and process two instructions at a time, and it is also possible that a microprocessor which fetches and processes more than two instructions at a time is obtained through extension of the examples.

We claim:

1. A microprocessor comprising:

read means for reading out N, in number, successive instructions;

parallel processing detection means for detecting whether or not said N read-out instructions can be processed in parallel;

N processing units to execute said N read-out instructions parallelly, wherein only the N-th processing unit of said processing units has function logic to execute a branch instruction and an instruction which can not be parallelly executed;

branch instruction detecting means for parallelly detecting a branch instruction or an instruction which can not be parallelly executed (k-th instruction), and which comes first in a sequence of instructions of said N read-out instructions, to determine whether or not said N read-out instructions can be executed; and a dispatcher for dispatching said N read-out instructions to said N processing units to control a sequence of execution of said N read-out instructions such that said N instructions are parallelly executed using a first through a N-th of said N processing units when said N read-out instructions executed parallelly, and such that said sequence of execution is changed so that the first through a k-th of said read-out instructions are parallelly executed with a (N−k+1)-th through a N-th of said N processing units when either a branch instruction or an instruction which can not be parallelly executed is included in the k-th sequential order of said N read-out instructions.

2. A microprocessor according to claim 1, further comprising:

means for switching the processed result of said N-th processing unit into an address of the instruction to be executed next when the instruction is a branch instruction.

3. A microprocessor comprising:

read means for reading out two successive instructions;

parallel processing detection means for detecting whether or not said two read-out instructions can be processed in parallel;

two processing units to execute said two read-out instructions parallelly, wherein only a second processing unit of said two processing units has function logic to execute a branch instruction and instruction which can not be parallelly executed;

branch instruction detecting means for parallelly detecting whether or not the first instruction of said two read out instructions is a branch instruction or an instruction which can not be parallelly executed to determine whether or not said two read-out instructions can be executed; and a dispatcher for dispatching said two read-out instructions to said two processing units to control a sequence of execution of said two read-out instructions by said two processing units such that said two instructions are parallelly executed using a first and said second of said two processing units when said two read-out instructions can be executed by parallelly, and such that said sequence of execution is changed so that said branch instruction is executed using the second processing unit when either a branch instruction which or an instruction which can not be parallelly executed is included in the k-th (k=1, 2) sequential order of said two read-out instructions.

4. A microprocessor according to claim 3, further comprising:

means for switching the processed result of said second processing unit into an address of the instruction to be executed next when the instruction is a branch instruction.

5. A microprocessor having a multiple-instruction parallel processing mechanism, comprising:

an instruction register for fetching an array of programmed successive instructions;

a parallel processing detector for detecting whether any of n successive instructions can be executed in parallel, where n is an integer and n>1;

a dispatcher for dispatching n successive instructions in said instruction register to n arithmetic units; and n arithmetic units for executing n dispatched instructions, wherein when said parallel processing detector detects that i successive instructions, where 1<i<n, can be executed in parallel among said array of n successive instructions, said dispatcher dispatches said i successive instructions to said (n−i+1)-th to n-th arithmetic units for parallel execution.

6. A microprocessor according to claim 5, wherein said dispatcher dispatches a branching instruction to said n-th arithmetic unit for execution according to a detection performed by said parallel processing detector such that upon detecting a first branching of an order of an array of said n successive instructions, said first branching instruction is arranged to be a last of an array of i instructions.

7. A microprocessor according to claim 5 wherein said dispatcher dispatches an instruction to be executed for executing a plurality of cycles to said n-th arithmetic unit according to a detection performed by said parallel processing detector such that upon detecting a first instruction for executing a plurality of cycles in an order of an array of said n successive instructions, said instruction for executing a plurality of cycles is arranged to be a last instruction in an array of i instructions.

8. A microprocessor comprising:

read means for reading out N, in number, successive instructions;

parallel processing detection means for detecting whether or not said N read-out instructions can be processed in parallel, N processing units to execute said N read-out instructions parallelly, wherein only an N-th processing unit of said processing units has function logic to execute an instruction which is to be executed in plural cycles;

plural cycle executing instruction detecting means for parallelly detecting an instruction which is to be executed in plural cycles (p-th instruction), and which comes first in a sequence of instructions of said N read-out instructions, to determine whether or not said N read-out instructions can be executed; and a dispatcher for dispatching said N read-out instructions to said N processing units to control a sequence of execution of said N read-out instructions by said N processing units such that said N read-out instructions are parallelly executed using a first through said N-th processing units of said N processing units when said N read-out instructions can be executed by parallelly, and such that said sequence of execution is changed so that said first through a p-th read-out instructions of said N read-out instructions are parallelly executed using a (N−p+1)-th through said N-th processing units of said N processing units when an instruction which is to be executed in plural cycles is included in a p-th sequential order of said N read-out instructions.

9. A microprocessor comprising:

read means for reading out two successive instructions;

parallel processing detection means for detecting whether or not said two read-out instructions can be processed in parallel;

two processing units to execute said two read-out instructions parallelly, wherein only a second processing unit of said two processing units has function logic to execute an instruction executed in plural cycles;

plural cycle executing instruction detecting means for parallelly detecting whether or not a first instruction in a sequence of instructions of said two read-out instructions is an instruction which is to be executed in plural cycles whether or not said two read-out instructions can be executed; and a dispatcher for dispatching said two read-out instructions to said two processing units to control a sequence of execution of said two read-out instructions by said two processing units such that said two instructions are parallelly executed using a first and a second of said two processing units when said two read-out instructions can be executed by parallelly, and such that said sequence of execution is changed so that an instruction which is to be executed in plural cycles is executed using said second processing unit when said instruction which is to be executed in plural cycles is included in a p-th (p=1, 2) sequential order of said two read-out instructions.

10. A microprocessor comprising:

read means for reading out N, in number, successive instructions;

parallel processing detection means for detecting whether or not said N read-out instructions can be processed in parallel;

N processing units to execute said N read-out instructions parallelly, wherein only an N-th processing unit of said processing units has function logic to execute a branch instruction, an instruction which can not be parallelly executed and an instruction which is to be executed in plural cycles;

branch instruction and plural cycle executing detecting means for parallelly detecting a branch instruction (k-th instruction) or an instruction which can not be parallelly executed (k-th instruction) or an instruction which is to be executed in plural cycles (p-th instruction), and which comes first in a sequence of instructions of said N read-out instructions to determine whether or not said N read-out instructions can be executed; and a dispatcher for dispatching said N read-out instructions to said N processing units to control a sequence of execution of said N read-out instructions by said N processing units such that said N read-out instructions are parallelly executed using a first through said N-th of said N processing units when said N read-out instructions can be executed by parallelly, and dispatching said N read-out instructions to said N processing units to control said sequence of execution such that a first through a k-th of said N read-out instructions are parallelly executed using a (N−k+1)-th through said N-th of said N processing units when either a branch instruction or an instruction which can not be parallelly executed is included in a k-th sequential order of said N read-out instructions, and such that said sequence of execution is changed such that said first through a p-th of said N read-out instructions are parallelly executed using a (N−p+1)-th through said N-th of said N processing units when an instruction which is to be executed in plural cycles is included in a p-th sequential order of said N read-out instructions.

11. A microprocessor comprising:

read means for reading out two successive instructions;

parallel processing detection means for detecting whether or not said two read-out instructions can be processed in parallel;

two processing units to execute said two read-out instructions parallelly, wherein only a second processing unit of said two processing units has function logic to execute a branch instruction and an instruction which can not be parallelly executed and an instruction which is to be executed in plural cycles;

branch instruction and plural cycle executing instruction detecting means for parallelly detecting whether or not a first instruction of said two read-out instructions is a branch instruction or an instruction which parallelly executed, or whether or not the first instructions in a sequence of instructions of said two read-out instructions is an instruction which is to be executed in plural cycles, to determine whether or not said two read-out instructions can be executed;

a dispatcher for dispatching said two read-out instructions to said two processing units to control a sequence of execution of said two read-out instructions by said two processing units such that said two instructions are parallelly executed using the first and the second of said two processing units when said two read-out instructions can be executed by parallelly, dispatching said two read-out instructions to said two processing units to control said sequence of execution such that the first instruction is executed using the second processing unit when either a branch instruction or an instruction which can not be parallelly executed is included in a k-th (k=1, 2) sequential order of said two read-out instructions, and such that said sequence of execution is changed so that an instruction which is to be executed in plural cycles is executed using the second processing unit when the instruction which is to be executed in plural cycles is included in a p-th (p=1, 2) sequential order of said two read-out instructions.

12. A microprocessor comprising:

read means for reading out N, in number, successive instructions;

parallel processing detection means for detecting whether or not said N read-out instructions can be processed in parallel;

N processing units to execute said N read-out instructions parallelly, wherein at least a n-th processing unit among said processing units having sequential numbers equal to or larger than n (n=1) have function logic to execute a branch instruction and an instruction which can not be parallelly executed;

branch instruction detecting means for parallelly detecting a branch instruction (k-th instruction) or an instruction which can not be parallelly executed (k-th instruction), and which comes first in a sequence of instructions of said N read-out instructions, to determine whether or not said N read-out instructions can be executed; and a dispatcher for dispatching said N read-out instructions to said N processing units to control a sequence of execution of said N read-out instructions by said N processing units such that said N instructions are parallelly executed using a first through the N-th of said N processing units when said N read-out instructions can be executed parallelly, and such that said sequence of execution is changed so that the first through a (k−1)-th of said N read-out instructions are executed using the processing units having the same sequential numbers as the instructions being executed and a k-th instruction is executed using the processing unit having a number equal to or larger than n when either a branch instruction or an instruction which can not be parallelly executed is included in the k-th sequential order of said N read-out instructions.

13. A microprocessor comprising:

read means for reading out N, in number, successive instructions;

parallel processing detection means for detecting whether or not said N read-out instructions can be processed in parallel;

N processing units to execute said N read-out instructions parallelly, wherein at least a n-th processing unit among said processing units having sequential numbers equal to or larger than n (n=1) has function logic to execute an instruction which is to be executed in plural cycles;

plural cycle executing instruction detecting means for parallelly detecting an instruction which is to be executed in plural cycles (p-th instruction), and which comes first in a sequence of instructions of said N read-out instructions, to determine whether or not said N read-out instructions can be executed; and a dispatcher for dispatching said N read-out instructions to said N processing units to control a sequence of execution of said N read-out instructions by said N processing units such that said N instructions are parallelly executed using a first through a N-th of said N processing units when said N read-out instructions can be executed parallelly, and such that said sequence of execution is changed so that the first through a (p−1)-th of said N read-out instructions are executed using the processing units having the same sequential numbers as the instructions being executed and a p-th instruction is executed using the processing units having sequential numbers equal to or larger than n when an instruction which is to be executed in plural cycles is included in the p-th sequential order of said N read-out instructions.

14. A microprocessor comprising:

read means for reading out N, in number, successive instructions;

parallel processing detection means for detecting whether or not said N read-out instructions can be processed in parallel;

N processing units to execute said N read-out instructions parallelly, wherein at least a n-th processing unit among said processing units having sequential numbers equal to or larger than n (n=1) has function logic to execute a branch instruction, an instruction which can not be parallelly executed and an instruction which is to be executed in plural cycles;

branch instruction detecting means for parallelly detecting a branch instruction (k-th instruction) or an instruction which can not be parallelly executed (k-th instruction) or an instruction which is to be executed in plural cycles (p-th instruction), and which comes first in an instruction sequence of said N read-out instructions, to determine whether or not said N read-out instructions can be executed; and a dispatcher for dispatching said N read-out instructions to said N processing units to control a sequence of execution of said N read-out instructions by said N processing units such that said N instructions are parallelly executed using a first through a N-th of said N processing units when said N read-out instructions can be executed parallelly, such that said sequence of execution is changed so that the first through a (k−1)-th of said N read-out instructions are executed with the processing units having the same sequential numbers as the instructions being executed and a k-th instruction is executed using a processing unit having a sequential number equal to or larger than n when either a branch instruction or an instruction which can not be parallelly executed is included in a k-th sequential order of said N read-out instructions, and such that said sequence of execution is changed so that the first through a (p−1)-th instructions are executed using the processing units having the same sequential numbers as the instructions being executed and the p-th instruction is executed using the processing units having sequential numbers equal to or larger than n when an instruction which is to be executed in plural cycles is included in the p-th sequential order of said N read-out instructions.

* * * * *